US009265136B2

(12) United States Patent
Hori et al.

(10) Patent No.: US 9,265,136 B2
(45) Date of Patent: Feb. 16, 2016

(54) SYSTEM AND METHOD FOR GENERATING EXTREME ULTRAVIOLET LIGHT

(75) Inventors: Tsukasa Hori, Hiratsuka (JP); Kouji Kakizaki, Hiratsuka (JP); Tatsuya Yanagida, Hiratsuka (JP); Osamu Wakabayashi, Hiratsuka (JP); Hakaru Mizoguchi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 416 days.

(21) Appl. No.: 13/572,484
(22) Filed: Aug. 10, 2012
(65) Prior Publication Data

US 2012/0307851 A1  Dec. 6, 2012

Related U.S. Application Data

(63) Continuation-in-part of application No. 13/492,067, filed on Jun. 8, 2012, now Pat. No. 9,113,540.

(30) Foreign Application Priority Data

Feb. 19, 2010 (JP) ................................. 2010-034889
Nov. 29, 2010 (JP) ................................. 2010-265789
Jan. 27, 2011 (JP) ................................. 2011-015691
Jun. 15, 2011 (JP) ................................. 2011-133111
Apr. 27, 2012 (JP) ................................. 2012-103580
Jun. 22, 2012 (JP) ................................. 2012-141079

(51) Int. Cl.
  *H05G 2/00* (2006.01)
  *H01S 3/102* (2006.01)
  (Continued)

(52) U.S. Cl.
  CPC .............. *H05G 2/005* (2013.01); *H01S 3/2391* (2013.01); *H05G 2/008* (2013.01); *H01S 3/005* (2013.01);
  (Continued)

(58) Field of Classification Search
  CPC ...... H05G 2/005; H05G 2/008; H01S 3/2391; H01S 3/2366; H01S 3/005; H01S 3/102; H01S 3/104; H01S 3/1611; H01S 3/2232
  USPC ...................................................... 250/504 R
  See application file for complete search history.

(56) References Cited

U.S. PATENT DOCUMENTS 4,042,848 A  8/1977  Lee
6,339,634 B1  1/2002  Kandaka et al.
(Continued)

FOREIGN PATENT DOCUMENTS

EP  2538759 A1  12/2012
JP  2000-091095 A  3/2000
(Continued)

OTHER PUBLICATIONS

International Search Report PCT/JP/2012/065179 dated Feb. 5, 2013.

(Continued)

*Primary Examiner* — Michael Maskell
(74) *Attorney, Agent, or Firm* — Studebaker & Brackett PC

(57) ABSTRACT

A system includes a chamber, a laser beam apparatus configured to generate a laser beam to be introduced into the chamber, a laser controller for the laser beam apparatus to control at least a beam intensity and an output timing of the laser beam, and a target supply unit configured to supply a target material into the chamber, the target material being irradiated with the laser beam for generating extreme ultraviolet light.

17 Claims, 50 Drawing Sheets

(51) Int. Cl.

| | | |
|---|---|---|
| H01S 3/104 | (2006.01) | |
| H01S 3/16 | (2006.01) | |
| H01S 3/223 | (2006.01) | |
| H01S 3/23 | (2006.01) | |
| H01S 3/00 | (2006.01) | |

(52) U.S. Cl.
CPC ............... *H01S 3/102* (2013.01); *H01S 3/104* (2013.01); *H01S 3/1611* (2013.01); *H01S 3/2232* (2013.01); *H01S 3/2366* (2013.01)

(56) References Cited

U.S. PATENT DOCUMENTS

| | | | |
|---|---|---|---|
| 6,404,542 | B1 | 6/2002 | Ziari et al. |
| 7,317,196 | B2 | 1/2008 | Partlo et al. |
| 7,576,343 | B2 | 8/2009 | Tomie |
| 8,395,133 | B2 | 3/2013 | Moriya et al. |
| 8,669,543 | B2 | 3/2014 | Yanagida et al. |
| 9,072,153 | B2 * | 6/2015 | Wakabayashi ......... H05G 2/008 250/504 R |
| 2003/0006383 | A1 | 1/2003 | Melnychuk et al. |
| 2004/0159802 | A1 | 8/2004 | Ziener et al. |
| 2004/0246871 | A1 | 12/2004 | Kim et al. |
| 2005/0167618 | A1 | 8/2005 | Hoshino et al. |
| 2005/0205811 | A1 | 9/2005 | Partlo et al. |
| 2005/0279934 | A1 | 12/2005 | Stewart et al. |
| 2006/0215712 | A1 | 9/2006 | Ziener et al. |
| 2006/0249698 | A1 | 11/2006 | Endo et al. |
| 2007/0007469 | A1 | 1/2007 | Murakami et al. |
| 2007/0064747 | A1 | 3/2007 | Feve et al. |
| 2007/0114470 | A1 | 5/2007 | Bowering |
| 2008/0087847 | A1 | 4/2008 | Bykanov et al. |
| 2008/0149862 | A1 | 6/2008 | Hansson et al. |
| 2008/0180029 | A1 | 7/2008 | Hergenhan et al. |
| 2008/0197299 | A1 | 8/2008 | Hoshino et al. |
| 2008/0233719 | A1 | 9/2008 | Omata |
| 2009/0232171 | A1 | 9/2009 | Abe et al. |
| 2009/0250637 | A1 | 10/2009 | Akins et al. |
| 2009/0250641 | A1 | 10/2009 | Moriya et al. |
| 2009/0261242 | A1 | 10/2009 | Ueno et al. |
| 2009/0314967 | A1 | 12/2009 | Moriya et al. |
| 2010/0078577 | A1 | 4/2010 | Moriya et al. |
| 2010/0117009 | A1 | 5/2010 | Moriya et al. |
| 2010/0171049 | A1 | 7/2010 | Moriya et al. |
| 2010/0327192 | A1 | 12/2010 | Fomenkov et al. |
| 2011/0057126 | A1 | 3/2011 | Hoshino et al. |
| 2011/0176310 | A1 | 7/2011 | Lin et al. |
| 2011/0180734 | A1 | 7/2011 | Moriya et al. |
| 2011/0220816 | A1 | 9/2011 | Kakizaki et al. |
| 2011/0261844 | A1 | 10/2011 | Abe et al. |
| 2012/0243566 | A1 | 9/2012 | Hori et al. |
| 2012/0248344 | A1 | 10/2012 | Wakabayashi et al. |
| 2012/0305811 | A1 | 12/2012 | Wakabayashi et al. |
| 2012/0307851 | A1 | 12/2012 | Hori et al. |
| 2013/0032735 | A1 | 2/2013 | Nowak et al. |
| 2013/0119232 | A1 | 5/2013 | Moriya et al. |
| 2013/0148677 | A1 | 6/2013 | Moriya et al. |
| 2014/0098830 | A1 | 4/2014 | Yabu et al. |

FOREIGN PATENT DOCUMENTS

| | | | |
|---|---|---|---|
| JP | 2000-299197 | A | 10/2000 |
| JP | 2003-270551 | A | 9/2003 |
| JP | 2004-247293 | A | 9/2004 |
| JP | 2006-013033 | A | 1/2006 |
| JP | 2006-303461 | A | 11/2006 |
| JP | 2007-033437 | A | 2/2007 |
| JP | 2007-033437 | A | 2/2007 |
| JP | 2008-071547 | A | 3/2008 |
| JP | 2008-071547 | A | 3/2008 |
| JP | 2008-226462 | A | 9/2008 |
| JP | 2008-277204 | A | 11/2008 |
| JP | 2008-277204 | A | 11/2008 |
| JP | 2008-293738 | A | 12/2008 |
| JP | 2009-105006 | A | 5/2009 |
| JP | 2009-260019 | A | 11/2009 |
| JP | 2010-003548 | A | 1/2010 |
| JP | 2010-003548 | A | 1/2010 |
| JP | 2010-21543 | A | 1/2010 |
| JP | 2010-076268 | A | 4/2010 |
| JP | 2010-186735 | A | 8/2010 |
| JP | 5722061 | B2 | 5/2015 |
| WO | WO2006/093693 | A1 | 9/2006 |
| WO | 2009/123733 | A1 | 10/2009 |

OTHER PUBLICATIONS

Björn A M Hansson et al., "Liquid-jet laser-plasma extreme ultraviolet sources: from droplets to filaments", J. Phys. D. Appl. Phys. 37 (2004) 3233-3243.

U.S. Office Action issued in U.S. Appl. No. 13/492,067, dated May 8, 2014.

A.V. Nesterov et al., "Laser Beams with Axially Symmetric Polarization," Journal of Physics D Applied Physics vol. 33, (2000) pp. 1817-1822.

Y. Mairesse et al., "Electron wavepacket control with elliptically polarized laser light in hgh harmonic generation from aligned molecules," New Journal of physics 10 (2008) 025015, 13 pages.

P.F. Moulton, "Spectroscopic and laser characteristics of Ti:Al2O3," vol. 3, No. 1, Jan. 1986, J. Opt. Soc. Am. B., p. 125-133.

U.S. Office Action issued in U.S. Appl. No. 14/201,671, dated Jul. 2, 2014.

Office Action Japanese Patent Application No. 2011-015691 dated Jul. 8, 2014 with English translation.

An Office Action; "Notice of Reasons for Rejection," issued by the Japanese Patent Office on Apr. 7, 2015, which corresponds to Japanese Patent Application No. 2011-133111 and is related to U.S. Appl. No. 13/572,484; with English language translation.

An Office Action; "Notice of Reasons for Rejection," issued by the Japanese Patent Office on Aug. 25, 2015, which corresponds to Japanese Patent Application No. 2014-180843 and is related to U.S. Appl. No. 14/201,671 and U.S. Appl. No. 13/572,484; with English language translation.

* cited by examiner

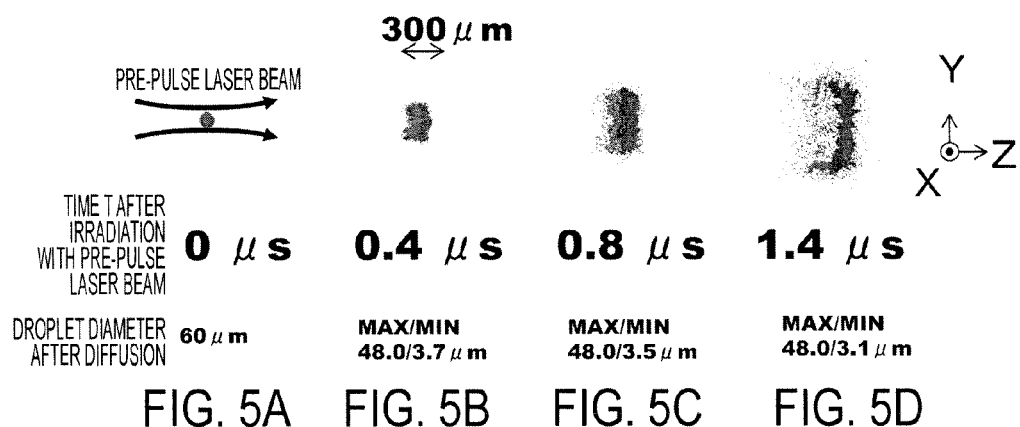
FIG. 5A   FIG. 5B   FIG. 5C   FIG. 5D
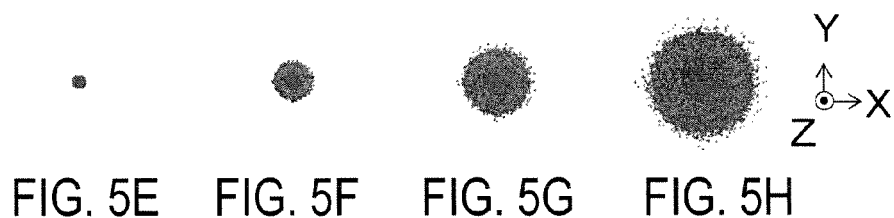
FIG. 5E   FIG. 5F   FIG. 5G   FIG. 5H
FIG. 5I

IRRADIATION CONDITIONS OF PRE-PULSE LASER BEAM

| | CASE 1 | CASE 2 | CASE 3 | CASE 4 |
|---|---|---|---|---|
| IRRADIATION PULSE ENERGY E (mJ) | 1.9 | 0.17 | 0.15 | 0.1 |
| PULSE DURATION T (ns) | 15 | 15 | 1 | 0.05 |
| IRRADIATION SPOT SIZE Dm (μm) | 100 | 30 | 30 | 30 |
| BEAM INTENSITY W (W/cm$^2$) | $1.61 \times 10^9$ | $1.60 \times 10^9$ | $2.12 \times 10^{10}$ | $2.83 \times 10^{11}$ |

FIG. 17A

IRRADIATION CONDITIONS OF MAIN PULSE LASER BEAM

| | CASE 1 | CASE 2 | CASE 3 | CASE 4 |
|---|---|---|---|---|
| IRRADIATION PULSE ENERGY E (mJ) | 100 | 150 | 200 | 200 |
| PULSE DURATION T (ns) | 20 | 30 | 25 | 50 |
| IRRADIATION SPOT SIZE Dm (μm) | 250 | 250 | 300 | 200 |
| BEAM INTENSITY W (W/cm$^2$) | $1.02 \times 10^{10}$ | $1.02 \times 10^{10}$ | $1.13 \times 10^{10}$ | $1.27 \times 10^{10}$ |

FIG. 17B

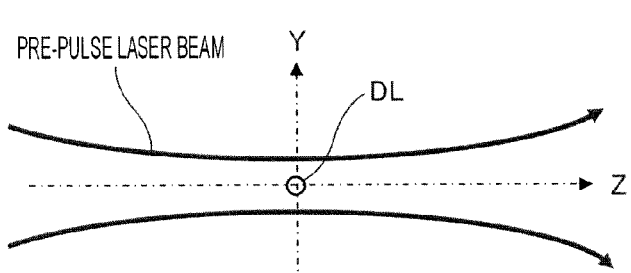
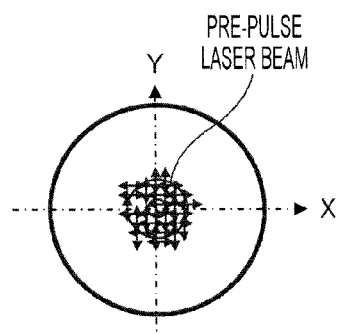
FIG. 23A  FIG. 23B
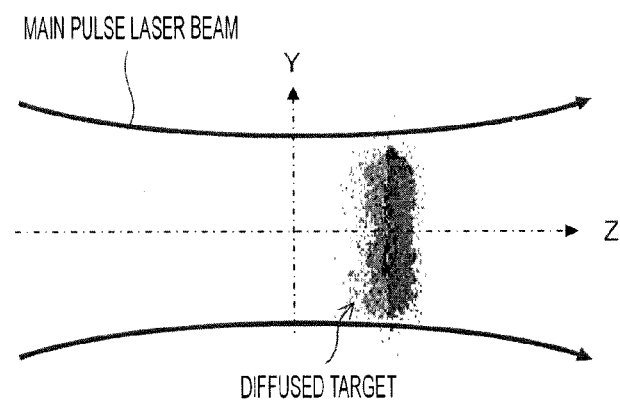
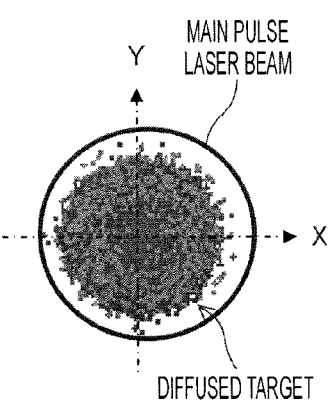
FIG. 23C  FIG. 23D
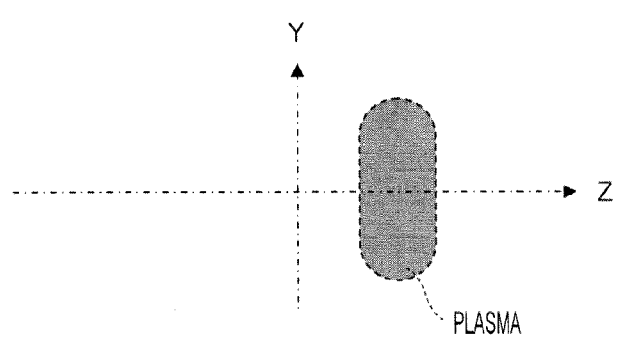
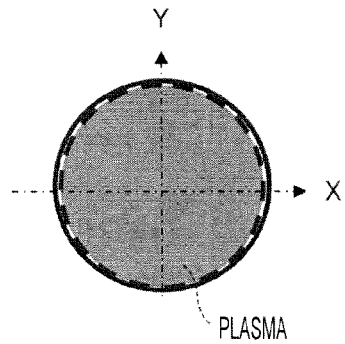
FIG. 23E  FIG. 23F

SYSTEM AND METHOD FOR GENERATING EXTREME ULTRAVIOLET LIGHT

CROSS-REFERENCE TO RELATED APPLICATIONS

The present application is a continuation-in-part of U.S. patent application Ser. No. 13/492,067, filed Jun. 8, 2012 now U.S. Pat. No. 9,113,540, which claims priority from Japanese Patent Application No. 2010-034889 filed Feb. 19, 2010, Japanese Patent Application No. 2010-265789 filed Nov. 29, 2010, Japanese Patent Application No. 2011-015691 filed Jan. 27, 2011, and Japanese Patent Application No. 2011-133111 filed Jun. 15, 2011. The present application further claims priority from Japanese Patent Application No. 2012-103580 filed Apr. 27, 2012, and Japanese Patent Application No. 2012-141079 filed Jun. 22, 2012.

BACKGROUND

1. Technical Field

This disclosure relates to a system and a method for generating extreme ultraviolet (EUV) light.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication with feature sizes of 32 nm or less, for example, an exposure apparatus is needed in which a system for generating EUV light at a wavelength of approximately 13 nm is combined with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used to generate plasma.

SUMMARY

A system according to one aspect of this disclosure may include a chamber, a laser beam apparatus configured to generate a laser beam to be introduced into the chamber, a laser controller for the laser beam apparatus to control at least a beam intensity and an output timing of the laser beam, and a target supply unit configured to supply a target material into the chamber. The target material may be irradiated with the laser beam for generating extreme ultraviolet light.

A system according to another aspect of this disclosure may include a chamber, a laser beam apparatus configured to output a laser beam into the chamber, a laser controller for the laser beam apparatus to control energy of the laser beam to achieve a predetermined fluence, and a target supply unit configured to supply a target material into the chamber. The target material may be irradiated with the laser beam for generating extreme ultraviolet light.

A method according to yet another aspect of this disclosure for generating extreme ultraviolet light in a system that includes a laser beam apparatus, a laser controller, a chamber, and a target supply unit may include supplying a target material into the chamber in a form of a droplet, irradiating the target material with a pre-pulse laser beam from the laser beam apparatus, and irradiating the target material having been irradiated with the pre-pulse laser beam with a main pulse laser beam from the laser beam apparatus in a range of 0.5 μs to 3 μs after the target material is irradiated with the pre-pulse laser beam.

BRIEF DESCRIPTION OF THE DRAWINGS

FIGS. 5A through 5H show the simulation results of diffusion when a molten tin droplet having a diameter of 60 μm is irradiated with a pre-pulse laser beam.

FIG. 5I shows the spot size of a main pulse laser beam.

FIG. 17A is a table showing irradiation conditions of a pre-pulse laser beam in the EUV light generation system of any one of the embodiments.

FIG. 17B is a table showing irradiation conditions of a main pulse laser beam in the EUV light generation system of any one of the embodiments.

FIGS. 23A through 23F show a droplet being irradiated with an unpolarized pre-pulse laser beam and a diffused target being irradiated with a main pulse laser beam according to the seventh embodiment.

DETAILED DESCRIPTION

Figure 1:
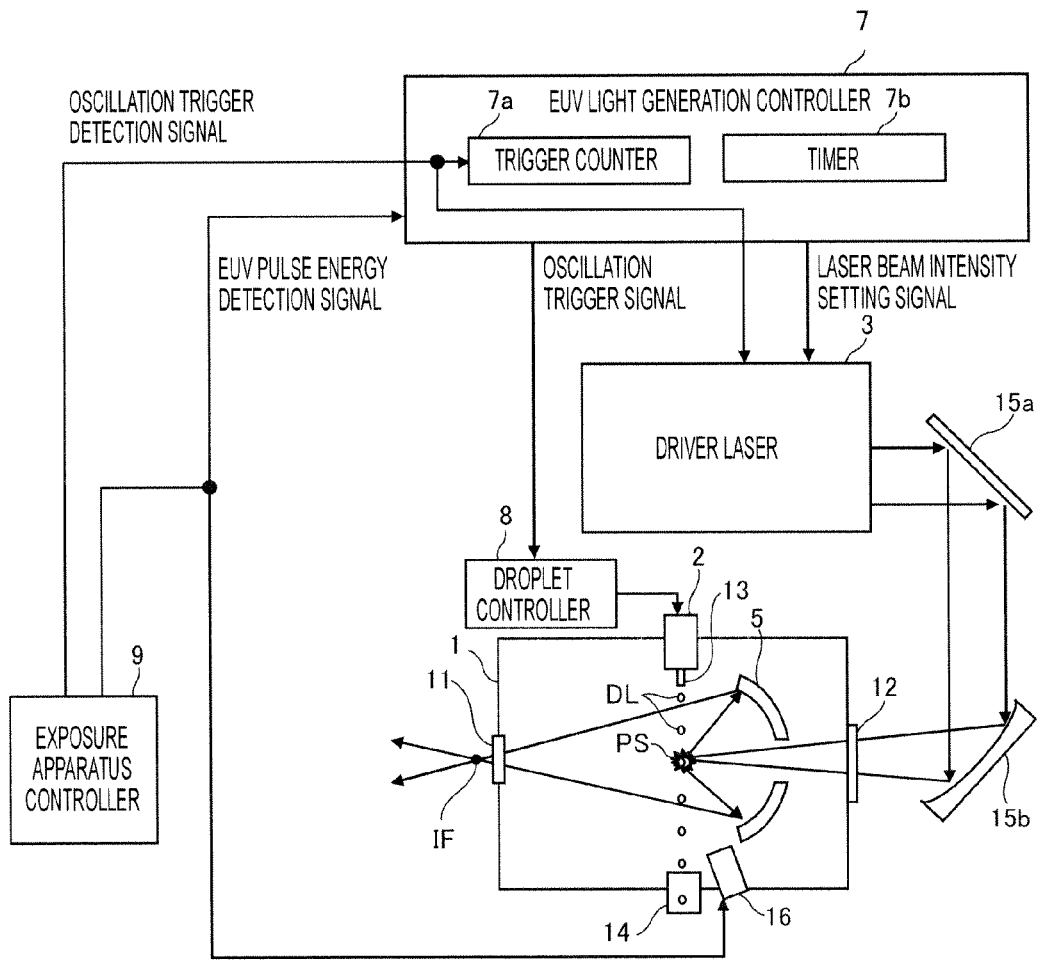
FIG. 1 schematically illustrates an exemplary configuration of an EUV light generation system according to one embodiment of this disclosure.

Hereinafter, selected embodiments of this disclosure will be described in detail with reference to the accompanying drawings. The embodiments to be described below are merely illustrative in nature and do not limit the scope of this disclosure. Further, the configuration(s) and operation(s) described in each embodiment are not all essential in implementing this disclosure. Note that like elements are referenced by like reference numerals and characters, and duplicate descriptions thereof will be omitted herein.

Contents
1. General Configuration
2. Diffusion of Droplet
2.1 Disc-Shaped or Dish-Shaped Diffusion
2.2 Torus-Shaped Diffusion
2.3 Diffusion of Large Droplet
2.4 Diffusion of Small Droplet
3. First Embodiment
4. Second Embodiment
5. Third Embodiment
6. Fourth Embodiment
7. Fifth Embodiment
8. Sixth Embodiment
9. Irradiation Conditions of Laser Beams
10. Seventh Embodiment
10.1 Overview of Polarization Control
10.2 Examples of Polarization Control
10.3 Examples of Polarization Converter
11. Eighth Embodiment
12. Ninth Embodiment
13. Control of Fluence
14. Control of Delay Time
15. Tenth Embodiment
15.1 Configuration
15.2 Operation
15.3 Parameters of Pre-pulse Laser Beam
15.3.1 Relationship between Pulse Duration and CE
15.3.2 Relationship between Pulse Duration and Fluence, and Relationship between Pulse Duration and Beam Intensity
15.3.3 Relationship between Pulse Duration and State of Diffused Target
15.3.4 Generation Process of Diffused Target
15.3.5 Range of Pulse Duration
15.3.6 Range of Fluence
15.4 Pre-pulse Laser Apparatus
15.4.1 General Configuration
15.4.2 Mode-Locked Laser Device
15.4.3 Regenerative Amplifier
15.4.3.1 When Voltage Is Not Applied to Pockels Cell
15.4.3.2 When Voltage Is Applied to Pockels Cell
15.4.4 Timing Control
15.4.5 Examples of Laser Medium
15.5 Main Pulse Laser Apparatus
16. Eleventh Embodiment

1. General Configuration

FIG. 1 schematically illustrates an exemplary configuration of an EUV light generation system according to an embodiment of this disclosure. The EUV light generation system of this embodiment may be of an LPP type. As shown in FIG. 1, the EUV light generation system may include a chamber 1, a target supply unit 2, a driver laser 3, an EUV collector mirror 5, and an EUV light generation controller 7.

The chamber 1 may be a vacuum chamber, and the EUV light is generated inside the chamber 1. The chamber 1 may be provided with an exposure apparatus connection port 11 and a window 12. The EUV light generated inside the chamber 1 may be outputted to an external processing apparatus, such as an exposure apparatus (reduced projection reflective optical system), through the exposure apparatus connection port 11. A laser beam outputted from the driver laser 3 may enter the chamber 1 through the window 12.

The target supply unit 2 may be configured to supply a target material, such as tin (Sn) and lithium (Li), used to generate the EUV light, into the chamber 1 at a timing specified by a droplet controller 8. The target material inside the target supply unit 2 may be outputted through a target nozzle 13 in the form of droplets DL. The droplet DL may, for example, be 10 μm to 100 μm inclusive in diameter. Of a plurality of droplets DL supplied into the chamber 1, ones that are not irradiated with a laser beam may be collected into a target collection unit 14.

The driver laser 3 is configured to output a laser beam used to excite the target material. The driver laser 3 may be a master oscillator power amplifier type laser apparatus. The laser beam from the driver laser 3 may be a pulse laser beam with a pulse duration of a few to a few tens of nanoseconds and a repetition rate of 10 kHz to 100 kHz. In this embodiment, the driver laser 3 may be configured to output a pre-pulse laser beam and a main pulse laser beam. As the driver laser 3, a combination of a Yttrium Aluminum Garnet (YAG) laser apparatus for outputting a pre-pulse laser beam and a $CO_2$ laser apparatus for outputting a main pulse laser beam may be used. However, this embodiment is not limited thereto, and any suitable laser apparatus may be used.

Each of the pre-pulse laser beam and the main pulse laser beam from the driver laser 3 may be reflected by a laser beam focusing optical system that includes a high-reflection mirror 15a and an off-axis paraboloidal mirror 15b, and enter the chamber 1 through the window 12. Inside the chamber 1, each of the pre-pulse laser beam and the main pulse laser beam may be focused in a plasma generation region PS.

When the droplet DL is irradiated with the pre-pulse laser beam, the droplet DL may be diffused into fine particles. In this specification, a target material in a state where fine particles of a droplet DL are diffused may be referred to as a diffused target. The diffused target may be irradiated with the main pulse laser beam. Upon being irradiated with the main pulse laser beam, the target material constituting the diffused target may be excited by the energy of the main pulse laser beam. With this, the target material may be turned into plasma, and rays of light at various wavelengths including the EUV light may be emitted from the plasma.

The EUV collector mirror 5 may be configured to selectively reflect light at a predetermined wavelength (e.g., EUV light at a central wavelength of approximately 13.5 nm) among rays of light at various wavelengths emitted from the plasma. The EUV collector mirror 5 may have a spheroidal concave surface on which a multilayer reflective film formed of a molybdenum (Mo) layer and a silicon (Si) layer laminated alternately is formed. The EUV collector mirror 5 may be positioned such that a first focus of the spheroidal surface lies in the plasma generation region PS and a second focus thereof lies in an intermediate focus region IF. With this, the EUV light reflected by the EUV collector mirror 5 may be focused at the second focus, and outputted to an external exposure apparatus.

The EUV light generation controller 7 may be configured to output an oscillation trigger signal and a laser beam intensity setting signal to the driver laser 3. With this, the EUV light generation controller 7 may control the beam intensity and the generation timing of the pre-pulse laser beam such that a droplet supplied into the chamber 1 is transformed into a desired diffused target. Further, the EUV light generation controller 7 may control the beam intensity and the generation timing of the main pulse laser beam such that plasma in a desired condition may be generated from the diffused target upon being irradiated with the main pulse laser beam.

The oscillation trigger signal may be outputted based on an oscillation trigger detection signal from an exposure apparatus controller 9, and the generation timing of the laser beams by the driver laser 3 may be controlled accordingly. The laser beam intensity setting signal may be outputted based on the oscillation trigger detection signal from the exposure apparatus controller 9 and an EUV pulse energy detection signal from either an EUV light detector 16 or the exposure apparatus controller 9. The laser beam intensity setting signal may be outputted to the driver laser 3 in order to control the beam intensity of the laser beams. The EUV light generation controller 7 may include a trigger counter 7a and a timer 7b, and may count the number of oscillation trigger detection signals per unit time. The laser beam intensity setting signal may be outputted based on the EUV pulse energy detection signal and the number of counted oscillation trigger detection signals.

2. Diffusion of Droplet

Figure 2:
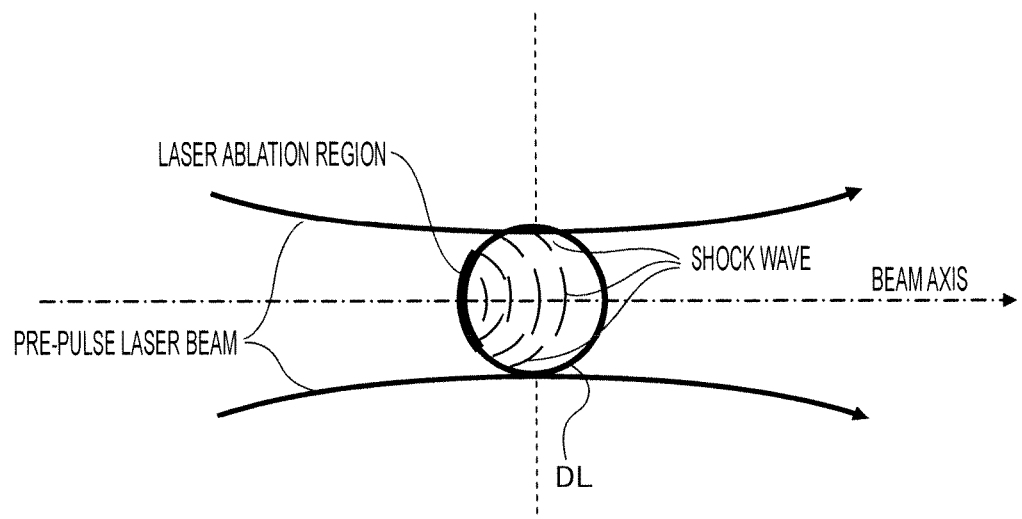
FIG. 2 is a conceptual diagram showing a droplet being irradiated with a pre-pulse laser beam.

Diffusion of a droplet upon being irradiated with a pre-pulse laser beam will now be discussed. FIG. 2 is a conceptual diagram showing a droplet being irradiated with a pre-pulse laser beam. In FIG. 2, the droplet is viewed in a direction perpendicular to the beam axis (Z-direction) of the pre-pulse laser beam.

As shown in FIG. 2, when the pre-pulse laser beam is focused on the droplet DL, laser ablation may occur at a surface of the droplet DL that has been irradiated with the pre-pulse laser beam. As a result, a shock wave or sonic wave may occur from the surface of the droplet DL irradiated with the pre-pulse laser beam toward the interior of the droplet DL due to the energy by the laser ablation. This shock wave or sonic wave may propagate throughout the droplet DL. The droplet DL may not be broken up when the beam intensity of the pre-pulse laser beam is weak. However, when the beam intensity of the pre-pulse laser beam is equal to or greater than a first predetermined value (e.g., $1 \times 10^9$ W/cm$^2$), the droplet DL may be broken up.

2.1 Disc-Shaped or Dish-Shaped Diffusion

Figures 3A, 3B, 3C:
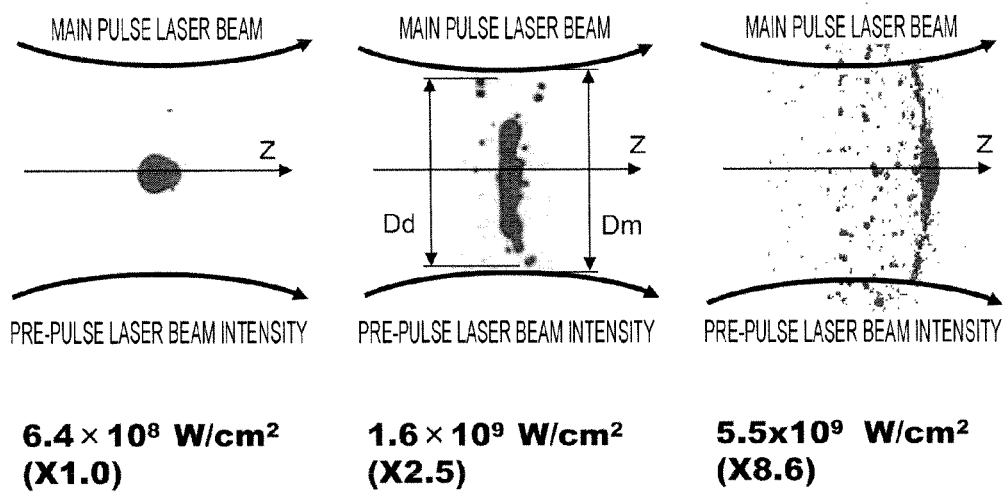
FIGS. 3A through 3C show simulation results of diffusion when a molten tin droplet is irradiated with a pre-pulse laser beam.
Figure 3D:
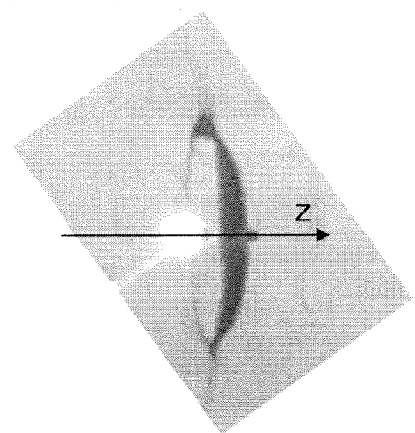
FIG. 3D is a photograph capturing a molten tin droplet being irradiated with a pre-pulse laser beam.

FIGS. 3A through 3C show the simulation results of diffusion of a molten tin droplet being irradiated with a pre-pulse laser beam. FIG. 3D is a photograph capturing a molten tin droplet being irradiated with a pre-pulse laser beam under the condition that is identical to that in the simulation shown in FIG. 3C. In each of FIGS. 3A through 3D, the droplet is viewed in a direction perpendicular to the beam axis of the pre-pulse laser beam (Z-direction). Further, in FIGS. 3A through 3C, the spot size of the main pulse laser beam and the beam intensity of the pre-pulse laser beam striking the droplet DL are indicated. In FIG. 3B, a diffusion diameter De of the diffused target and an irradiation spot size Dm of the main pulse laser beam are indicated.

As shown in FIG. 3A, when the beam intensity of the pre-pulse laser beam is $6.4 \times 10^8$ W/cm$^2$, the droplet is hardly diffused. On the other hand, as shown in FIG. 3B, when the beam intensity of the pre-pulse laser beam is $1.6 \times 10^9$ W/cm$^2$ (2.5 times greater than the beam intensity in the simulation shown in FIG. 3A), the droplet is broken up. The broken-up droplet is turned into numerous minute particles and forms a diffused target. These minute particles may be diffused in a disc-shape as viewed in the Z-direction. Further, as shown in FIG. 3C, when the beam intensity of the pre-pulse laser beam is $5.5 \times 10^9$ W/cm$^2$ (8.6 times greater than the beam intensity in the simulation shown in FIG. 3A), the droplet is broken up, and the minute particles of the broken-up droplet may be diffused in a dish-shape. As can been seen from the comparison between FIG. 3C and FIG. 3D, the state of the actual diffusion of the minute particles were similar to the simulation result.

In the case shown in FIG. 3A, it is speculated that even when the droplet is irradiated with the main pulse laser beam, a large portion of the energy of the main pulse laser beam is not absorbed by the droplet, whereby a high CE may not be obtained. That is, with respect to the size of the target material after being irradiated with the pre-pulse laser beam, the irradiation spot size of the main pulse laser beam is too large. Accordingly, a large portion of the main pulse laser beam may not strike the droplet and may not be used to generate plasma. On the other hand, in the cases shown in FIGS. 3B and 3C, the droplet is diffused in the irradiation spot of the main pulse laser beam, whereby a large portion of the main pulse laser beam may be used to generate plasma. Further, a diffused target may have a greater total surface area than a single droplet. As shown below, when a single droplet is broken into $n^3$ smaller pieces, the radius of a smaller piece may become $(1/n)$ of the radius of the original droplet. Here, the total surface area of the smaller pieces may be n times greater than the surface area of the original droplet.

When the radius of an undiffused droplet is r, a volume $V_1$ of the undiffused droplet may be expressed in Expression (1) below.

$$V_1 = 4\pi r^3/3 \tag{1}$$

A total volume $V_2$ of $n^3$ smaller pieces each having a radius $(r/n)$ may be expressed in Expression (2) below.

$$V_2 = n^3 \times 4\pi (r/n)^3/3 \tag{2}$$

The total volume $V_2$ of $n^3$ smaller pieces each having the radius $(r/n)$ may be equal to the volume $V_1$ of the undiffused droplet having the radius r ($V_2 = V_1$).

A surface area $S_1$ of the undiffused droplet having the radius r may be expressed in Expression (3) below.

$$S_1 = 4\pi r^2 \tag{3}$$

A total surface area $S_2$ of $n^3$ smaller pieces each having the radius (r/n) may be expressed in Expression (4) below.

$$S_2 = n^3 \times 4\pi (r/n)^2 = n \times 4\pi r^2 \qquad (4)$$

Accordingly, the total surface area $S_2$ of $n^3$ smaller pieces each having the radius (r/n) is n times greater than the surface area $S_1$ of the undiffused droplet having the radius r.

In this way, in the cases shown in FIGS. 3B and 3C, the droplet may be diffused, and the total surface area may be increased. As a result, the energy of the main pulse laser beam may be absorbed efficiently by the diffused small particles. With this, a larger portion of the diffused small particles may be turned into plasma, and EUV light with higher energy may be obtained. Accordingly, a high CE may be obtained.

In either of the cases shown in FIGS. 3B and 3C, the diffused target has such a shape that the length in the direction of the beam axis of the pre-pulse laser beam is shorter than the length in the direction perpendicular to the beam axis of the pre-pulse laser beam. The diffused target having such a shape may be irradiated with the main pulse laser beam traveling substantially along the same path as the pre-pulse laser beam. Since the diffused target may be irradiated with the main pulse laser beam more uniformly, the main pulse laser beam may be absorbed efficiently by the target material.

The diffusion diameter De of the diffused target may be equal to or smaller than the irradiation spot size Dm of the main pulse laser beam. Because of this size, the entire diffused target may be irradiated with the main pulse laser beam, and thus a larger portion of the diffused target may be turned into plasma. As a result, generation of debris of the target material may be suppressed.

Further, the diffusion diameter De of the diffused target may be equal to or closer to the irradiation spot size Dm of the main pulse laser beam. With this, a larger portion of the energy of the main pulse laser beam may be absorbed by the diffused target, whereby a higher CE may be obtained. Although FIG. 3B shows that the position of the beam waist of the main pulse laser beam substantially coincides with the position of the diffused target, this disclosure is not limited thereto. That is, the position of the beam waist of the main pulse laser beam and the position of the diffused target do not necessarily have to coincide with each other. In this disclosure, the irradiation spot size Dm may be interpreted as a diameter of a cross-section of the main pulse laser beam at or around the position at which the diffused target is irradiated with the main pulse laser beam.

Although a case where the main pulse laser beam has a circular cross-section and the cross-section of the diffused target is circular has been described, this disclosure is not limited thereto. For example, a cross-section area of the main pulse laser beam may be larger than a maximum cross-section area of the diffused target.

2.2 Torus-Shaped Diffusion

Figure 4A:
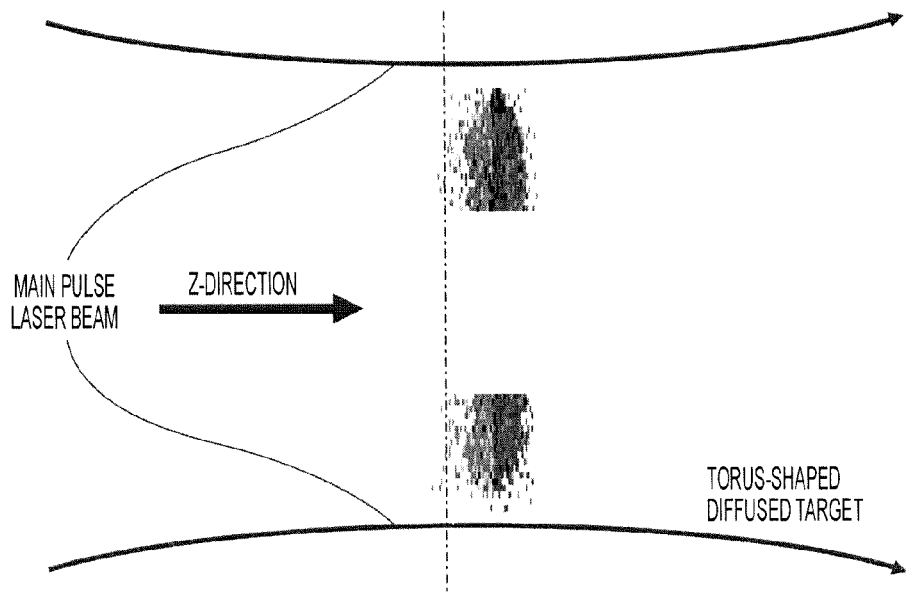
FIG. 4A schematically shows a molten tin droplet being irradiated with a pre-pulse laser beam, as viewed in the direction perpendicular to the beam axis.
Figure 4B:
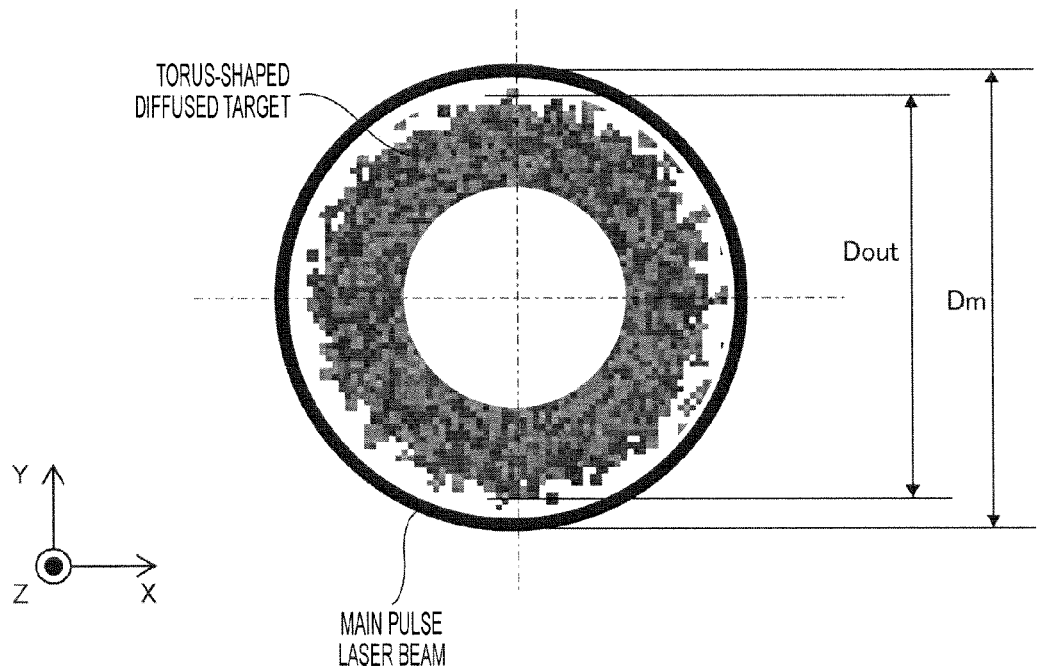
FIG. 4B schematically shows a molten tin droplet being irradiated with a pre-pulse laser beam, as viewed in the direction of the beam axis.

FIGS. 4A and 4B schematically show a molten tin droplet having been irradiated with the pre-pulse laser beam. In FIG. 4A, the diffused target is viewed in a direction perpendicular to the beam axes of the pre-pulse laser beam and the main pulse laser beam (Z-direction). In FIG. 4B, the diffused target is viewed in a direction of the beam axes of the pre-pulse laser beam and the main pulse laser beam. In FIG. 4B, an outer diameter Dout of a torus-shaped diffused target and the irradiation spot size Dm of the main pulse laser beam are indicated.

As described with reference to FIG. 2, when the pre-pulse laser beam is focused on the droplet DL, laser ablation may occur at the surface of the droplet DL. Here, when the beam intensity of the pre-pulse laser beam is equal to or greater than a second predetermined value (e.g., $6.4 \times 10^9$ W/cm$^2$), the droplet DL may be broken up, and a torus-shaped diffused target as shown in FIGS. 4A and 4B may be formed. The torus-shaped diffused target may be diffused symmetrically about the beam axis of the pre-pulse laser beam and into a torus-shape.

For example, for generating a torus-shaped diffused target, the beam intensity of the pre-pulse laser beam may be in the range of $6.4 \times 10^9$ W/cm$^2$ to $3.2 \times 10^{10}$ W/cm$^2$ inclusive, and the diameter of the droplet may be in the range of 12 μm and 40 μm inclusive.

Irradiation of the torus-shaped diffused target with the main pulse laser beam will now be described. A torus-shaped diffused target may be formed in 0.5 μs to 2.0 μs after a droplet is irradiated with a pre-pulse laser beam. Accordingly, the diffused target may be irradiated with the main pulse laser beam in the above time span after the droplet is irradiated with the pre-pulse laser beam.

Further, as shown in FIGS. 4A and 4B, the torus-shaped diffused target has such a shape that the length in the direction of the beam axis of the pre-pulse laser beam is shorter than the length in the direction perpendicular to the beam axis of the pre-pulse laser beam. The diffused target having such a shape may be irradiated with the main pulse laser beam traveling substantially along the same path as the pre-pulse laser beam. With this, the diffused target may be irradiated with the main pulse laser beam more efficiently, and thus the main pulse laser beam may be absorbed efficiently by the target material. Accordingly, the CE in the LPP type EUV light generation system may be improved. The CE of approximately 3% was obtained through an experiment under the above conditions.

For example, it is speculated that when a torus-shaped diffused target is irradiated with a main pulse laser beam of a Gaussian beam intensity distribution, plasma is emitted cylindrically from the torus-shaped diffused target. Then, the plasma diffused toward the inner portion of the cylinder may be trapped therein. Accordingly, high-temperature, high-density plasma may be generated, and the CE may be improved. Here, "torus-shape" means an annular shape, but the diffused target does not necessarily have to be perfectly annular in shape, and may be substantially annular in shape.

Further, the irradiation spot size Dm of the main pulse laser beam may be in the following relationship with the outer diameter Dout of the torus-shaped diffused target.

$$Dm \geq Dout$$

With this relationship, the entire torus-shaped diffused target may be irradiated with the main pulse laser beam, and a larger portion of the diffused target may be turned into plasma. As a result, generation of debris of the target material may be reduced.

2.3 Diffusion of Large Droplet

FIGS. 5A through 5H show the simulation result of diffusion when a molten tin droplet having a diameter of 60 μm is irradiated with a pre-pulse laser beam. In each of FIGS. 5A through 5D, the droplet or the diffused target is viewed in a direction (X-direction) perpendicular to the beam axis of the pre-pulse laser beam (Z-direction). FIGS. 5A through 5D respectively show the states of the target material at timings where a time T is 0 μs, 0.4 μs, 0.8 μs, and 1.4 μs after the droplet DL is irradiated with the pre-pulse laser beam. In each of FIGS. 5E through 5H, the droplet or the diffused target is viewed in the direction (Z-direction) of the beam axis of the pre-pulse laser beam. FIGS. 5E through 5H respectively show the states of the target material at timings where a time T is 0 μs, 0.4 μs, 0.8 μs, and 1.4 μs after the droplet DL is irradiated with the pre-pulse laser beam. FIG. 5I shows the irradiation spot size of the main pulse laser beam at a position where the diffused target is irradiated with the main pulse laser beam. Here, the beam intensity of the pre-pulse laser beam is $1.5 \times 10^9$ W/cm$^2$.

With reference to the simulation results shown in FIGS. 5A through 5H along with the irradiation spot size of the main pulse laser beam shown in FIG. 5I, the following can be found. A large portion of the diffused target may be irradiated with the main pulse laser beam in approximately 0.4 μs after a droplet is irradiated with the pre-pulse laser beam. Accordingly, generation of debris may be reduced if the diffused target is irradiated with the main pulse laser beam at the above timing.

A droplet having a diameter of 60 μm may be broken into small particles and diffused upon being irradiated with a pre-pulse laser beam. In each of FIGS. 5A through 5D, the maximum value and the minimum value of a diameter of a small particle in the diffused target are indicated. With the beam intensity of the pre-pulse laser beam in this simulation, the maximum value of a diameter of a small particle in the diffused target is 48.0 μm. That is, the droplet has not been broken up sufficiently by the pre-pulse laser beam, and a large portion of the diffused target may not be turned into plasma even when the diffused target is irradiated with the main pulse laser beam. This may suggest that a large amount of debris may be generated. The minimum value of a diameter of a small particle in the diffused target is 3.7 μm in 0.4 μs, 3.5 μm in 0.8 μs, and 3.1 μm in 1.4 μs, respectively, after a droplet is irradiated with a pre-pulse laser beam. This suggests that the more the time T elapses after a droplet is irradiated with a pre-pulse laser beam, the smaller the diameter of a small particle becomes, and the number of small particles may increase. This in turn suggests that in the case where a molten tin droplet having a diameter of 60 μm is irradiated with a pre-pulse laser beam, if a diffused target is irradiated with a main pulse laser beam within a range where the time T after the droplet is irradiated with the pre-pulse laser beam is between 0.4 μs and 1.4 μs, the CE may be improved further with a longer time T.

Figure 6:
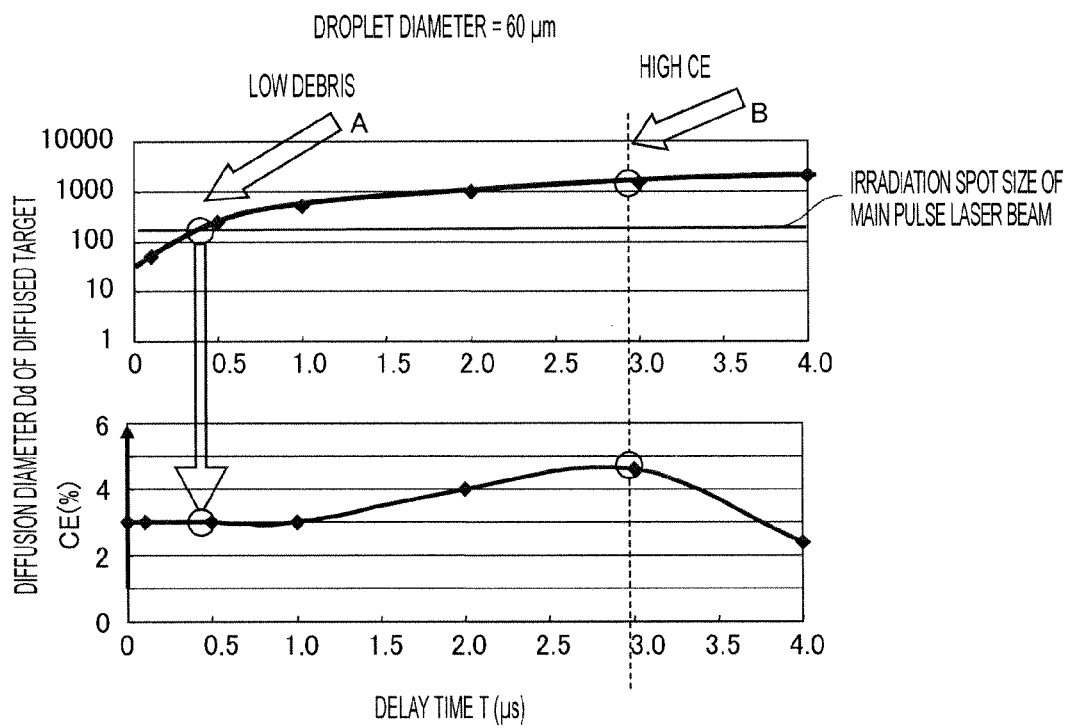
FIG. 6 shows a diffusion diameter of a diffused target generated when a molten tin droplet having a diameter of 60 μm is irradiated with a pre-pulse laser beam and a conversion efficiency (CE) corresponding to a timing at which the diffused target is irradiated with a main pulse laser beam.

FIG. 6 shows a change over time in the diffusion diameter De of the diffused target when a molten tin droplet having a diameter of 60 μm is irradiated with the pre-pulse laser beam and a conversion efficiency when the diffused target is irradiated with a main pulse laser beam at a given point in time. As shown in FIGS. 5F and 6, the diffusion diameter De of the diffused target may substantially coincide with the irradiation spot size of the main pulse laser beam in approximately 0.4 μs after the droplet is irradiated with the pre-pulse laser beam. Accordingly, generation of debris may be reduced if the diffused target is irradiated with the main pulse laser beam in 0.4 μs after the droplet is irradiated with the pre-pulse laser beam (see a white arrow A in FIG. 6). On the other hand, with reference to FIG. 6, a high CE may be obtained if the diffused target is irradiated with the main pulse laser beam in approximately 3 μs after the droplet is irradiated with the pre-pulse laser beam (see a white arrow B in FIG. 6). This simulation results suggest that a delay time for the main pulse laser beam from the irradiation with the pre-pulse laser beam to reduce generation of debris may differ from a delay time to obtain a high CE. That is, when a molten tin droplet having a diameter of 60 μm is irradiated sequentially with a pre-pulse laser beam and then a main pulse laser beam, it may be difficult to reduce debris and obtain a high CE at the same time.

2.4 Diffusion of Small Droplet

FIGS. 7A through 7H show the simulation results of diffusion when a molten tin droplet having a diameter of 10 μm is irradiated with the pre-pulse laser beam. In each of FIGS. 7A through 7D, the droplet or the diffused target is viewed in a direction (X-direction) perpendicular to the beam axis of the pre-pulse laser beam (Z-direction). FIGS. 7A through 7D respectively show the states of the target material at timings where a time T is 0 μs, 0.1 μs, 0.25 μs, and 0.5 μs after the droplet is irradiated with the pre-pulse laser beam. In each of FIGS. 7E through 7H, the droplet or the diffused target is viewed in the direction of the beam axis of the pre-pulse laser beam (Z-direction). FIGS. 7E through 7H respectively show the states of the target material at timings where a time T is 0 μs, 0.1 μs, 0.25 μs, and 0.5 μs after the droplet is irradiated with the pre-pulse laser beam. FIG. 7I shows the irradiation spot size of the main pulse laser beam at a position where the diffused target is irradiated with the main pulse laser beam. Here, the beam intensity of the pre-pulse laser beam is $1.5 \times 10^9$ W/cm$^2$.

Figure 7:
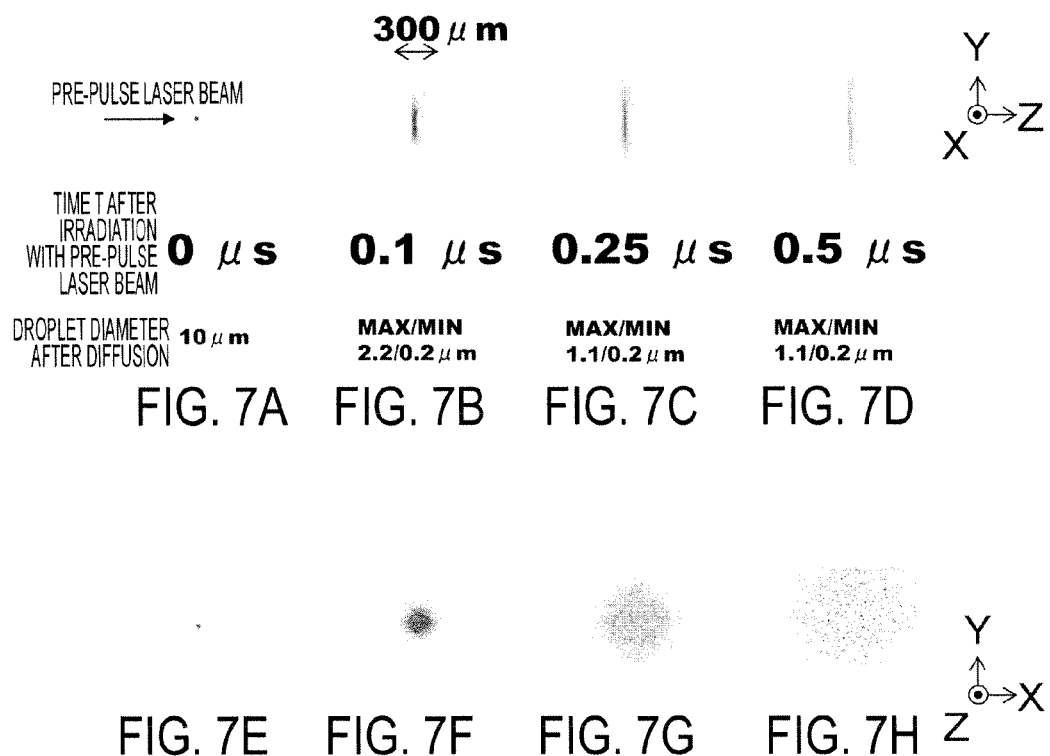
FIGS. 7A through 7H show the simulation results of diffusion when a molten tin droplet having a diameter of 10 μm is irradiated with a pre-pulse laser beam.
FIG. 7I shows the spot size of a main pulse laser beam.

With reference to the simulation results shown in FIGS. 7A through 7H along with the irradiation spot size of the main pulse laser beam shown in FIG. 7I, it can be said that a large portion of the diffused target may be irradiated with the main pulse laser beam in 0.1 μs after the droplet is irradiated with the pre-pulse laser beam. Accordingly, generation of debris may be reduced if the diffused target is irradiated with the main pulse laser beam at the above timing.

As shown in FIGS. 7A through 7D, the maximum value of a diameter of a small particle in a diffused target is 2.2 μm in 0.1 μs, 1.1 μm in 0.25 μs, and 1.1 μs in 0.5 μs after the droplet is irradiated with the pre-pulse laser beam. This suggests that the maximum value of a diameter of a small particle in a diffused target becomes constant in 0.25 μs after the droplet is irradiated with the pre-pulse laser beam. The minimum value of a diameter of a small particle in the diffused target is 0.2 μm in 0.1 μs, 0.2 μm in 0.25 μs, and 0.2 μm in 0.5 μs after the droplet is irradiated with the pre-pulse laser beam. This suggests that a small particle in a diffused target is sufficiently small in 0.1 μs after the droplet is irradiated with the pre-pulse laser beam. This in turn suggests that a higher CE may be obtained if the diffused target is irradiated with the main pulse laser beam in 0.1 μs after the droplet is irradiated with the pre-pulse laser beam.

Figure 8:
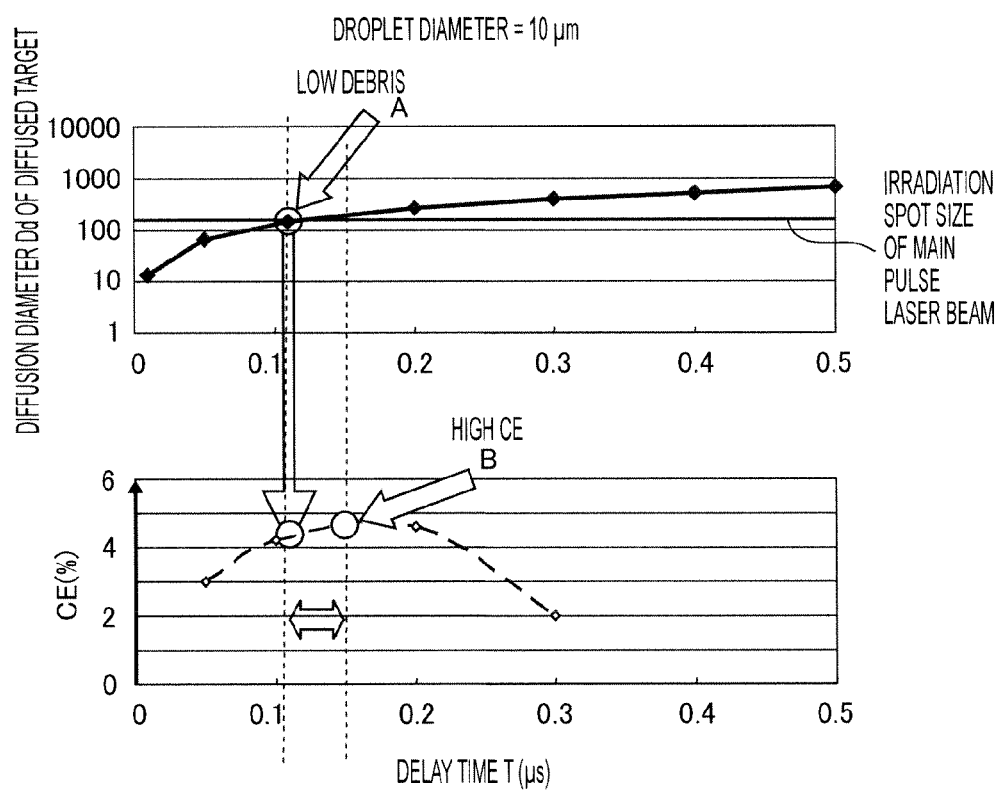
FIG. 8 shows a diffusion diameter of a diffused target generated when a molten tin droplet having a diameter of 10 μm is irradiated with a pre-pulse laser beam and a conversion efficiency (CE) corresponding to a timing at which the diffused target is irradiated with a main pulse laser beam.

FIG. 8 shows a change over time in the diffusion diameter De of the diffused target when a molten tin droplet having a diameter of 10 μm is irradiated with the pre-pulse laser beam and a conversion efficiency when the diffused target is irradiated with the main pulse laser beam at a given point in time. As shown in FIGS. 7F and 8, the diffusion diameter De of the diffused target may substantially coincide with the irradiation spot size of the main pulse laser beam in 0.1 μs after the droplet is irradiated with the pre-pulse laser beam. Accordingly, generation of debris may be reduced if the diffused target is irradiated with the main pulse laser beam in 0.1 μs after the droplet is irradiated with the pre-pulse laser beam (see a white arrow A in FIG. 8). On the other hand, with reference to FIG. 8, a high CE may be obtained if the diffused target is irradiated with the main pulse laser beam in approximately 0.15 μs after the droplet is irradiated with the pre-pulse laser beam (see a white arrow B in FIG. 8). The simulation results suggest that a gap between a delay time for the main pulse laser beam to reduce debris and a delay time for the main pulse laser beam to obtain a high CE is relatively small. That is, when a molten tin droplet having a diameter of 10 μm is irradiated sequentially with the pre-pulse laser beam and then the main pulse laser beam, it may be possible to reduce debris and obtain a high CE at the same time. A molten tin droplet having a diameter of 10 μm may be referred to as a mass-limited target since it is a target with a minimum mass required for generating desired EUV light.

3. First Embodiment

Figure 9:
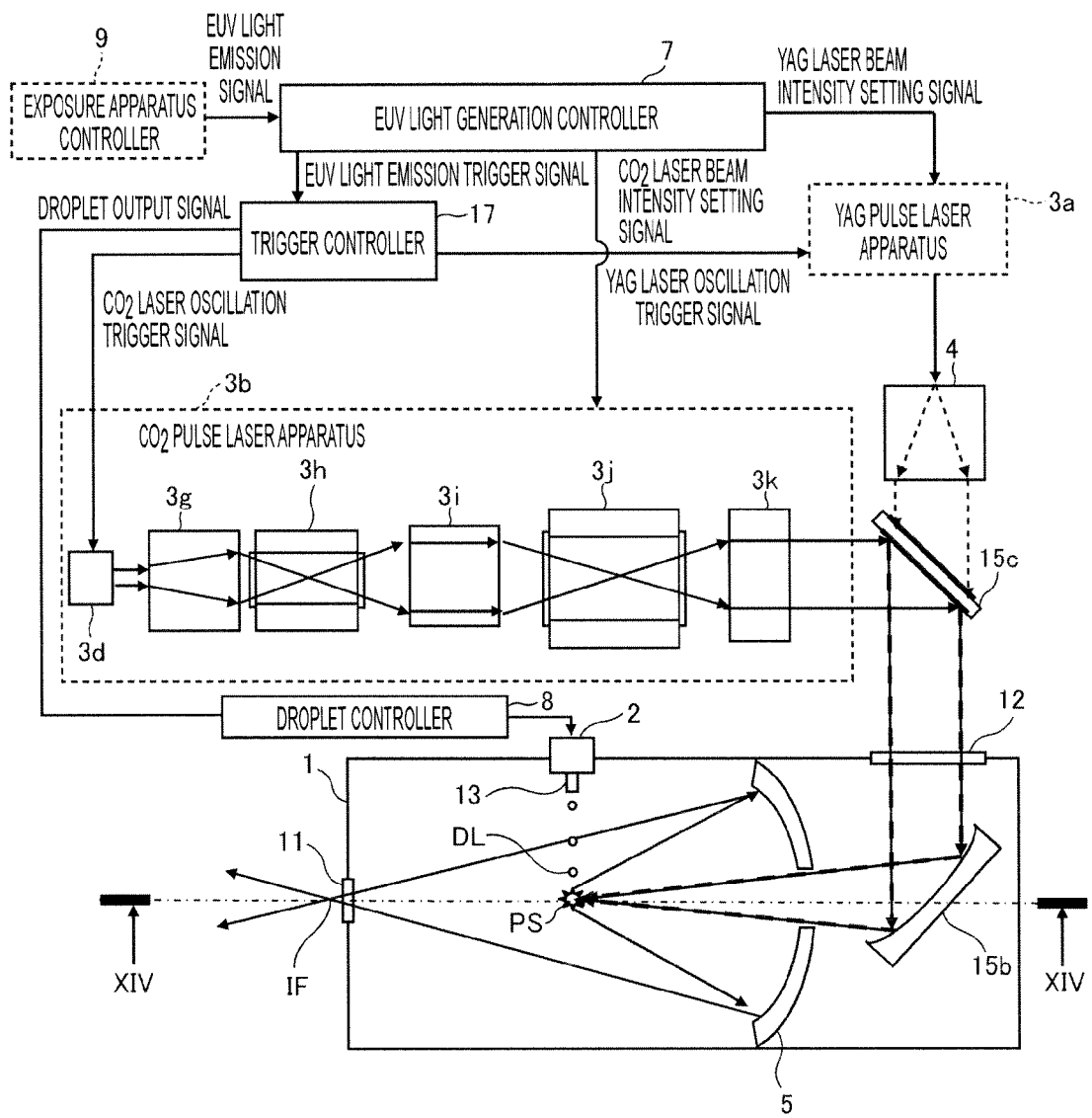
FIG. 9 schematically illustrates an exemplary configuration of an EUV light generation system according to a first embodiment.

FIG. 9 schematically illustrates an exemplary configuration of an EUV light generation system according to a first embodiment. In the EUV light generation system according to the first embodiment, a beam path of a pre-pulse laser beam from a YAG pulse laser apparatus 3a and a beam path of a main pulse laser beam from a $CO_2$ pulse laser apparatus 3b may be made to substantially coincide with each other by a beam combiner 15c. That is, in the first embodiment, the pre-pulse laser beam and the main pulse laser beam are guided into the chamber 1 along substantially the same path.

First, an EUV light emission signal may be inputted to the EUV light generation controller 7 from the exposure apparatus controller 9. The EUV light generation controller 7 may be configured to output a YAG laser beam intensity setting signal to the YAG pulse laser apparatus 3a. Further, the EUV light generation controller 7 may be configured to output a $CO_2$ laser beam intensity setting signal to the $CO_2$ pulse laser apparatus 3b.

In addition, the EUV light generation controller 7 may be configured to output an EUV light emission trigger signal to a trigger controller 17. The trigger controller 17 may be configured to output a droplet output signal to a droplet controller 8. The droplet controller 8 may input the droplet output signal to the target supply unit 2, and upon receiving the droplet output signal, the target supply unit 2 may output a droplet DL through the target nozzle 13. The trigger controller 17 may be configured to output a YAG laser oscillation trigger signal to the YAG pulse laser apparatus 3a. The YAG laser oscillation trigger signal may be outputted such that the droplet DL is irradiated with the pre-pulse laser beam at a timing at which the droplet DL reaches the plasma generation region PS. Further, the trigger controller 17 may be configured to output a $CO_2$ laser oscillation trigger signal to a master oscillator 3d in the $CO_2$ pulse laser apparatus 3b. The $CO_2$ laser oscillation trigger signal may be outputted such that the diffused target is irradiated with the main pulse laser beam after a delay time T from the timing at which the droplet DL is irradiated with the pre-pulse laser beam. Here, the delay time T is a time required for a desired diffused target to be formed.

The YAG pulse laser apparatus 3a may be configured to output the pre-pulse laser beam at a first wavelength based on the YAG laser beam intensity setting signal from the EUV light generation controller 7 and the YAG laser oscillation trigger signal from the trigger controller 17. The pre-pulse laser beam from the YAG pulse laser apparatus 3a may be expanded in diameter by a beam expander 4 and then be incident on the beam combiner 15c.

The $CO_2$ pulse laser apparatus 3b may include the master oscillator 3d, a preamplifier 3h, a main amplifier 3j, and relay optical systems 3g, 3i, and 3k respectively disposed downstream from the master oscillator 3d, the preamplifier 3h, and the main amplifier 3j. The master oscillator 3d may be configured to output a seed beam at a second wavelength based on the $CO_2$ pulse laser oscillation trigger signal. The seed beam from the master oscillator 3d may be amplified to a desired beam intensity by the preamplifier 3h and the main amplifier 3j based on the $CO_2$ laser beam intensity setting signal. The amplified laser beam may be outputted from the $CO_2$ pulse laser apparatus 3b as the main pulse laser beam and be incident on the beam combiner 15c.

The beam combiner 15c may be configured to transmit the pre-pulse laser beam at the first wavelength (e.g., 1.06 μm) and reflect the main pulse laser beam at the second wavelength (e.g., 10.6 μm). More specifically, the beam combiner 15c may include a diamond substrate on which a multilayer film having the aforementioned reflection/transmission properties for the pre-pulse laser and the main pulse laser is formed. Accordingly, the beam combiner 15c may serve to make the beam path of the pre-pulse laser beam and the beam path of the main pulse laser beam coincide with each other and supply the pre-pulse laser beam and the main pulse laser beam into the chamber 1 along the same path. Alternatively, a beam combiner configured to reflect the pre-pulse laser beam at the first wavelength and transmit the main pulse laser beam at the second wavelength may be used to make the respective beam paths coincide with each other.

The droplet controller 8, the YAG pulse laser apparatus 3a, and the $CO_2$ pulse laser apparatus 3b may operate in synchronization with one another based on the various signals from the trigger controller 17. With this, the YAG pulse laser apparatus 3a may output the pre-pulse laser beam in synchronization with the timing at which the droplet supplied into the chamber 1 from the target supply unit 2 reaches a predetermined region. Then, the $CO_2$ pulse laser apparatus 3b may output the main pulse laser beam in synchronization with the timing at which a desired diffused target is formed after the droplet is irradiated with the pre-pulse laser beam.

According to the first embodiment, the pre-pulse laser beam and the main pulse laser beam may be guided to the plasma generation region PS in substantially the same direction (substantially the same path). Thus, a through-hole formed in the EUV collector mirror 5 may be made small and need not be formed in plurality.

Further, the wavelength (e.g., 1.06 μm) of the pre-pulse laser beam from the YAG pulse laser apparatus 3a is equal to or shorter than one-tenth of the wavelength (e.g., 10.6 μm) of the main pulse laser beam from the $CO_2$ pulse laser apparatus 3b. When the wavelength of the pre-pulse laser beam is sufficiently shorter than the wavelength of the main pulse laser beam, the following advantages may be speculated.

(1) The absorptivity of the pre-pulse laser beam by the target material, such as tin, may be higher than that of the main pulse laser beam.

(2) The irradiation spot size of the pre-pulse laser beam focused on the droplet may be reduced.

As a result, a small droplet DL may be irradiated efficiently with the pre-pulse laser beam having small pulse energy and be diffused.

4. Second Embodiment

Figure 10:
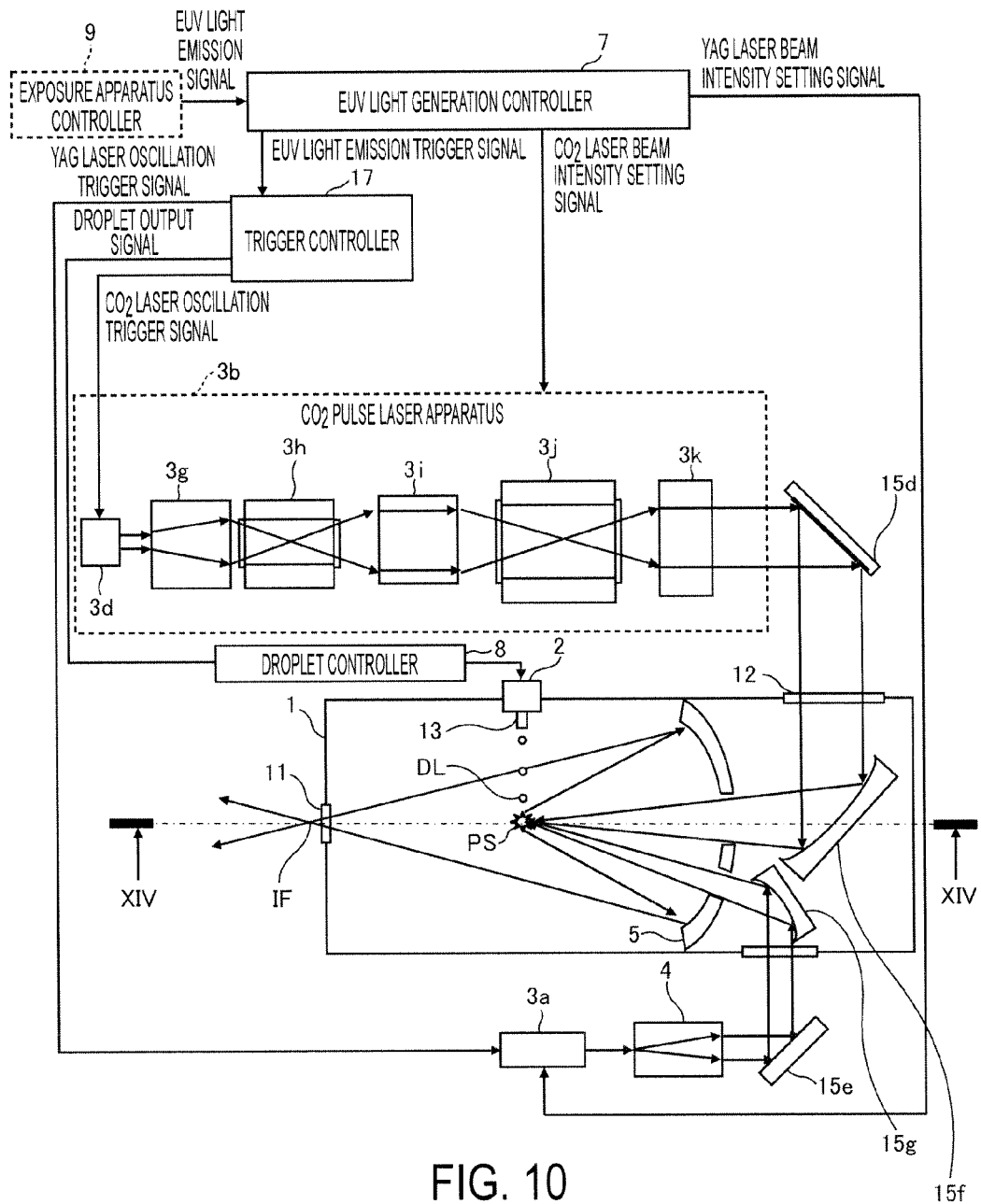
FIG. 10 schematically illustrates an exemplary configuration of an EUV light generation system according to a second embodiment.

FIG. 10 schematically illustrates an exemplary configuration of an EUV light generation system according to a second embodiment. In the EUV light generation system according to the second embodiment, the pre-pulse laser beam from the YAG pulse laser apparatus 3a and the main pulse laser beam from the $CO_2$ pulse laser apparatus 3b are guided into the chamber 1 along separate beam paths.

The pre-pulse laser beam outputted from the YAG pulse laser apparatus 3a may be reflected by a high-reflection mirror 15e and an off-axis paraboloidal mirror 15g. Then, the pre-pulse laser beam may pass through a through-hole formed in the EUV collector mirror 5, and be focused on a droplet inside the chamber 1 to form a diffused target.

The main pulse laser beam outputted from the $CO_2$ pulse laser apparatus 3b may be reflected by a high-reflection mirror 15d and an off-axis paraboloidal mirror 15f. Then, the main pulse laser beam may pass through another through-hole formed in the EUV collector mirror 5, and be focused on the diffused target inside the chamber 1.

According to the second embodiment, the pre-pulse laser beam and the main pulse laser beam may be guided through separate optical systems to the plasma generation region PS. Accordingly, each of the pre-pulse laser beam and the main pulse laser beam may be focused to have a desired beam spot with ease. Further, an optical element, such as a beam combiner, for making the beam paths of the pre-pulse laser beam and the main pulse laser beam need not be used. Still, the pre-pulse laser beam and the main pulse laser beam may strike the droplet DL and the diffused target respectively in substantially the same direction.

5. Third Embodiment

Figure 11:
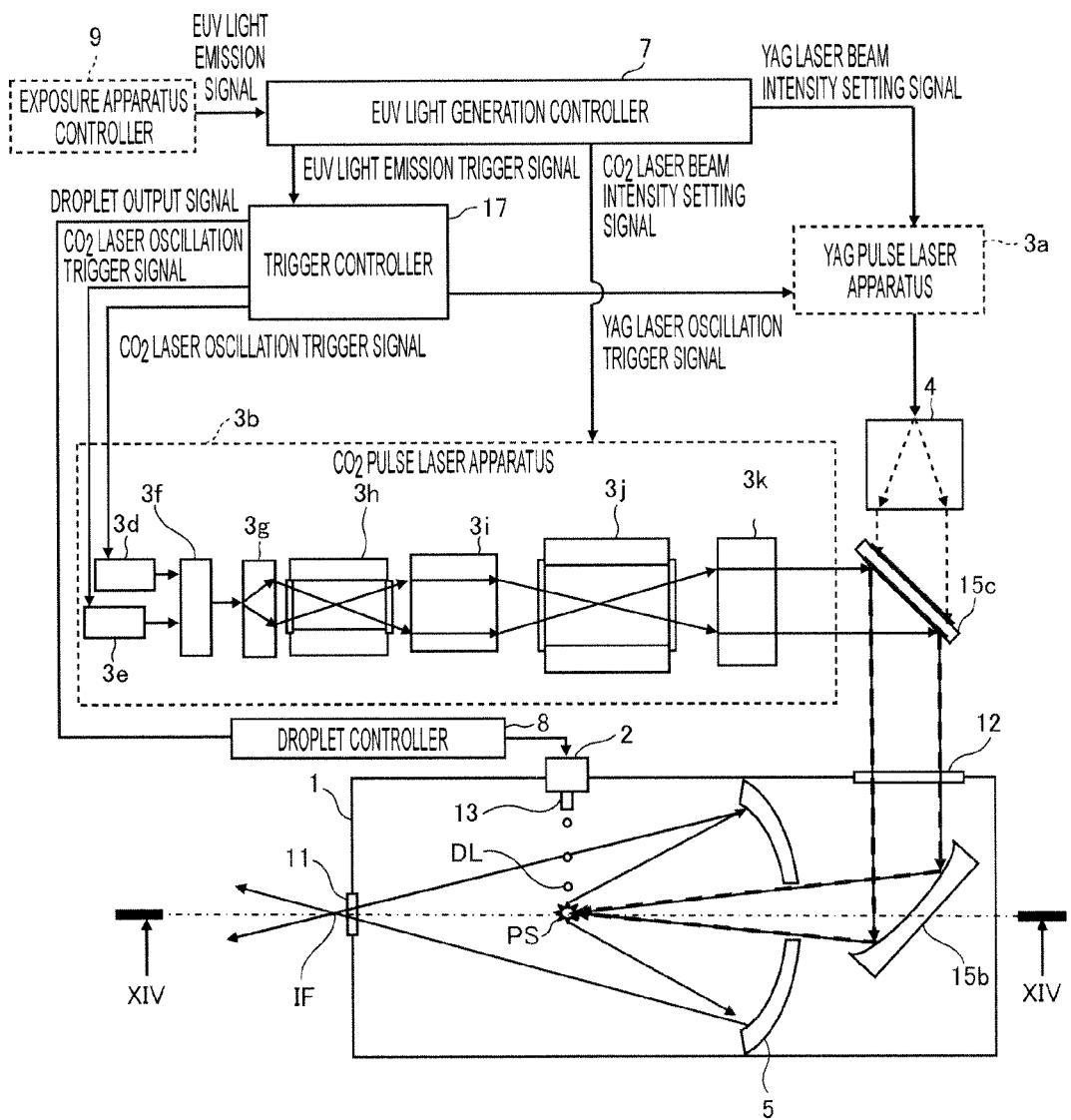
FIG. 11 schematically illustrates an exemplary configuration of an EUV light generation system according to a third embodiment.

FIG. 11 schematically illustrates an exemplary configuration of an EUV light generation system according to a third embodiment. In the EUV light generation system according to the third embodiment, a first pre-pulse laser beam from the YAG pulse laser apparatus 3a and a second pre-pulse laser beam and the main pulse laser beam from the $CO_2$ pulse laser apparatus 3b may be guided into the chamber 1.

The $CO_2$ pulse laser apparatus 3b may include the master oscillator 3d configured to output the seed beam of the main pulse laser beam and a master oscillator 3e configured to output a seed beam of the second pre-pulse laser beam. The seed beam of the second pre-pulse laser beam from the master oscillator 3e may be amplified by the preamplifier 3h and the main amplifier 3j to desired beam intensity. The amplified seed beam may be outputted from the $CO_2$ pulse laser apparatus 3b as the second pre-pulse laser beam, and then be incident on the beam combiner 15c. The seed beam of the main pulse laser beam from the master oscillator 3d may also be amplified by the preamplifier 3h and the main amplifier 3j to desired beam intensity. The amplified seed beam may be outputted from the $CO_2$ pulse laser apparatus 3b as the main pulse laser beam, and then be incident on the beam combiner 15c.

Each of the master oscillators 3d and 3e may be a semiconductor laser configured to oscillate in a bandwidth that can be amplified by a $CO_2$ gain medium. More specifically, each of the master oscillators 3d and 3e may include a plurality of quantum cascade lasers (QCL).

Figures 12A, 12B, 12C, 12D, 12E, 12F:
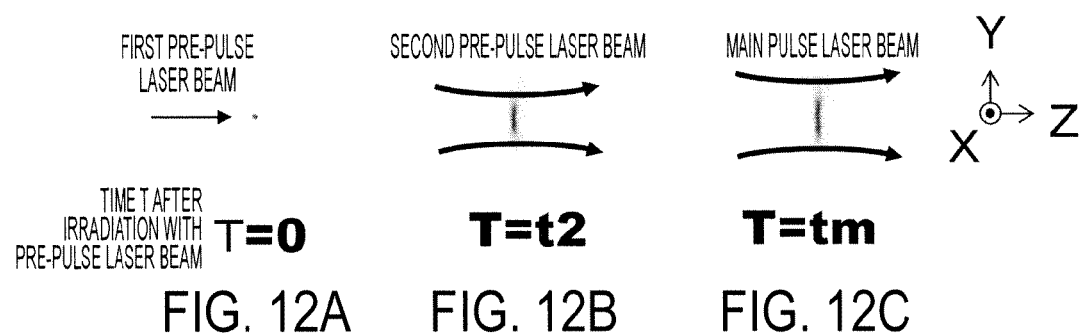
FIGS. 12A through 12F show a droplet being irradiated with a first pre-pulse laser beam and a diffused target being irradiated with a second pre-pulse laser beam.

FIGS. 12A through 12F show a droplet DL being irradiated with a first pre-pulse laser beam and a diffused target being irradiated with a second pre-pulse laser beam in the third embodiment. In each of FIGS. 12A through 12C, the droplet or the diffused target is viewed in a direction (X-direction) perpendicular to the beam axes of the first and second pre-pulse laser beams (Z-direction). FIGS. 12A through 12C respectively show the states of the target material at delay times T=0, T=t2, and T=tm (where, 0<t2<tm) after the droplet is irradiated with the first pre-pulse laser beam. In each of FIGS. 12D through 12F, the droplet or the diffused target is viewed in the direction of the beam axes of the first and second pre-pulse laser beams (Z-direction). FIGS. 12D through 12F respectively show the states of the target material at delay times T=0, T=t2, and T=tm (where, 0<t2<tm) after the droplet is irradiated with the first pre-pulse laser beam.

When a droplet of the target material shown in FIGS. 12A and 12D is irradiated with the first pre-pulse laser beam, the droplet may be diffused as shown in FIGS. 12B and 12E so that a first diffused target may be formed. The first diffused target may be irradiated with the second pre-pulse laser beam when the first diffused target is diffused to a desired size that is substantially the same as or smaller than the irradiation spot size of the second pre-pulse laser beam.

When the first diffused target is irradiated with the second pre-pulse laser beam, the first diffused target may be broken into even smaller particles and be diffused to form a second diffused target. The second diffused target may be irradiated with the main pulse laser beam when the second diffused target is diffused to a desired size that is substantially the same as or smaller than the irradiation spot size of the main pulse laser beam.

Since the second diffused target, which includes smaller particles than those in the first diffused target, is irradiated with the main pulse laser beam, the energy of the main pulse laser beam may be absorbed by the second diffused target efficiently. Because a large portion of the second diffused target may be turned into plasma, a high CE may be obtained. Further, by controlling the irradiation spot size of the main pulse laser beam to substantially coincide with the diffusion diameter of the second diffused target, a high CE and debris reduction may both be achieved.

Note that, in the third embodiment, a mass limited target (e.g., a molten tin droplet having a diameter of 10 μm) may be used.

In the third embodiment, the target material is irradiated with the first and second pre-pulse laser beams, and then the diffused target is irradiated with the main pulse laser beam. However, this disclosure is not limited thereto, and the target material may be irradiated with three or more pre-pulse laser beams.

Further, in the third embodiment, the first pre-pulse laser beam is outputted from the YAG pulse laser apparatus 3a, and the second pre-pulse laser beam and the main pulse laser beam are outputted from the $CO_2$ pulse laser apparatus 3b. However, this disclosure is not limited thereto, and all the laser beams may be outputted, for example, from a $CO_2$ laser apparatus.

Alternatively, the first and second pre-pulse laser beams may be outputted from a first laser apparatus, and the main pulse laser beam may be outputted from a second laser apparatus. Here, the first laser apparatus may be a YAG laser apparatus or a fiber laser apparatus, and the second laser apparatus may be a $CO_2$ laser apparatus.

Figure 13:
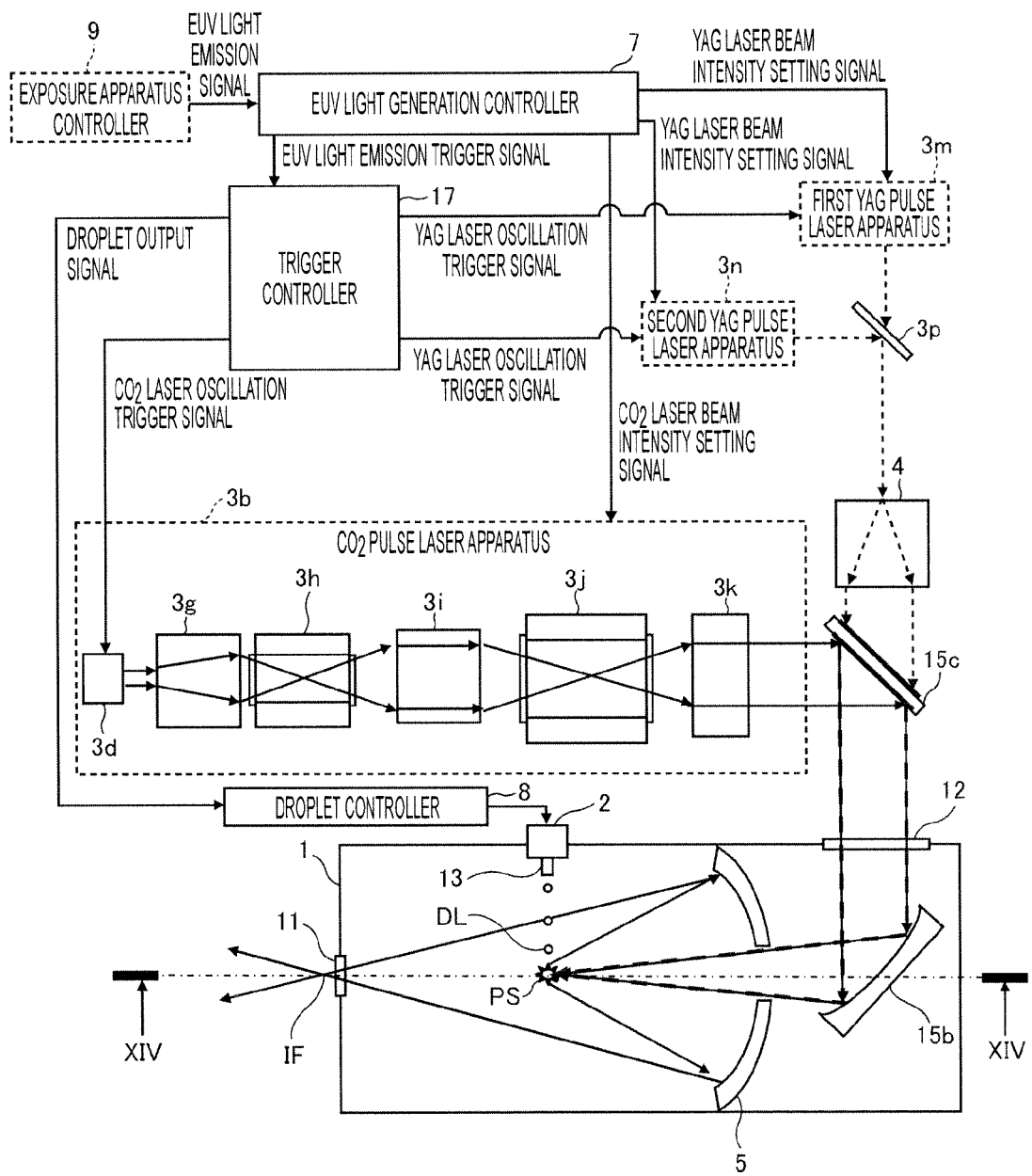
FIG. 13 schematically illustrates an exemplary configuration of an EUV light generation system according to a modification of the third embodiment.

FIG. 13 schematically illustrates an exemplary configuration of an EUV light generation system according to a modification of the third embodiment. The EUV light generation system shown in FIG. 13 may include a first YAG pulse laser apparatus 3m, a second YAG pulse laser apparatus 3n, and a beam combiner 3p.

The first and second YAG pulse laser apparatuses 3m and 3n may each receive the YAG laser beam intensity setting signal from the EUV light generation controller 7 and the YAG laser oscillation trigger signal from the trigger controller 17. The first YAG pulse laser apparatus 3m may be configured to output the first pre-pulse laser beam, and the first pre-pulse laser beam may be incident on the beam combiner 3p. The second YAG pulse laser apparatus 3n may be configured to output the second pre-pulse laser beam, and the second pre-pulse laser beam may also be incident on the beam combiner 3p. The beam combiner 3p may be positioned to make the beam paths of the first and second pre-pulse laser beams coincide with each other and output the first and second pre-pulse laser beams toward the beam expander 4.

Even with this configuration, as in the third embodiment described with reference to FIG. 11, the first and second pre-pulse laser beams and the main pulse laser beam may be guided into the chamber 1. Here, the first and second pre-pulse laser beams may respectively be outputted from first and second fiber laser apparatuses.

6. Fourth Embodiment

Figure 14:
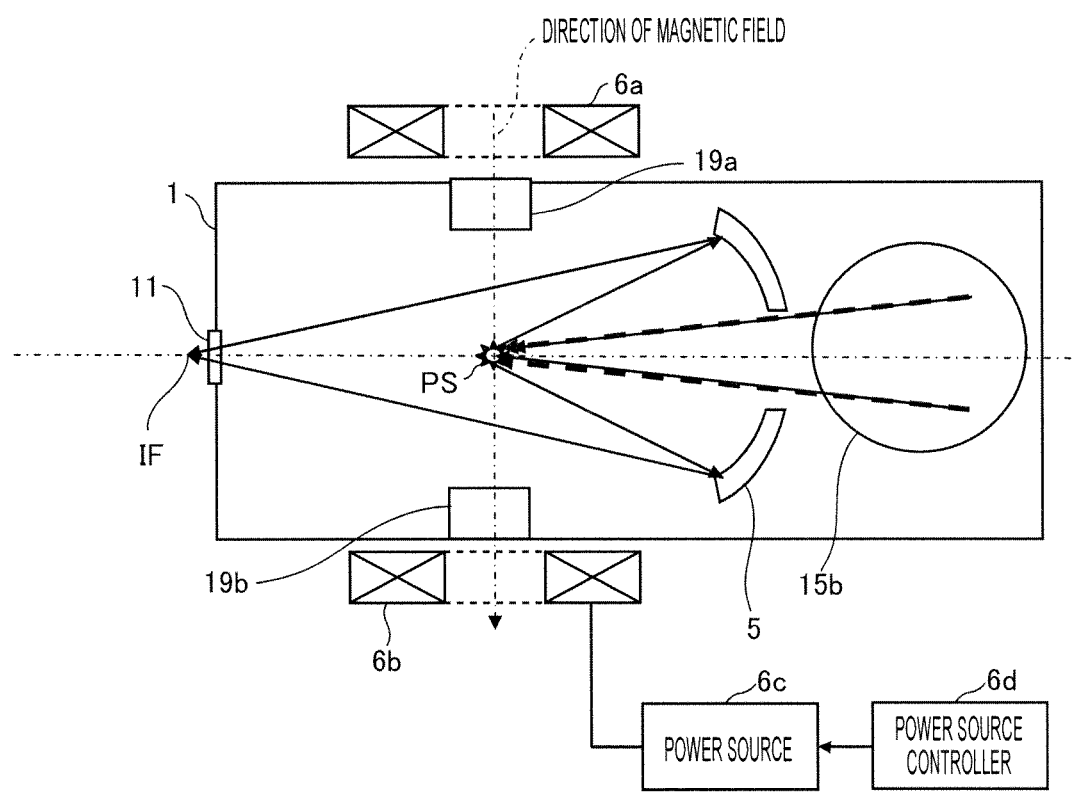
FIG. 14 schematically illustrates an exemplary configuration of an EUV light generation system according to a fourth embodiment.

FIG. 14 schematically illustrates an exemplary configuration of an EUV light generation system according to a fourth embodiment. FIG. 14 shows a sectional view taken along XIV-XIV plane in any of FIGS. 9 through 11 and 13. An EUV light generation system according to the fourth embodiment may be similar in configuration to any one of the first through third embodiments but may differ in that the EUV light generation system of the fourth embodiment may further include magnets $6a$ and $6b$. A magnetic field may be generated with the magnets $6a$ and $6b$ inside the chamber 1 and ions generated inside the chamber 1 may be collected by the magnetic field.

Each of the magnets $6a$ and $6b$ may be an electromagnet that includes a coil winding and a cooling mechanism of the coil winding. A power source $6c$ that is controlled by a power source controller $6d$ may be connected to each of the magnets $6a$ and $6b$. The power source controller $6d$ may regulate current to be supplied to the magnets $6a$ and $6b$ from the power source $6c$ so that a magnetic field in a predetermined direction may be generated in the chamber 1. A superconductive magnet, for example, may be used as each of the magnets $6a$ and $6b$. Although two magnets $6a$ and $6b$ are used in this embodiment, a single magnet may be used. Alternatively, a permanent magnet may be provided in the chamber 1.

Plasma generated when a target material is irradiated with a main pulse laser beam may include positive ions and negative ions (or electrons). The positive and negative ions moving inside the chamber 1 may be subjected to Lorentz force in the magnetic field, and thus the ions may move in spiral along magnetic lines of force. With this, the ionized target material may be trapped in the magnetic field and collected into ion collection units $19a$ and $19b$ provided in the magnetic field. Accordingly, debris inside the chamber 1 may be reduced, and deterioration in optical element, such as the EUV collector mirror 5, due to the debris adhering to the optical element may be suppressed. In FIG. 14, the magnetic field is in the direction shown by an arrow, but a similar function can be achieved even when the magnetic field is oriented in the opposite direction.

A mitigation technique for reducing debris adhering to the optical element is not limited to the use of the magnetic field. Alternatively, a substance deposited onto the EUV collector mirror 5 may be etched using an etching gas. Debris may be made to react with hydrogen gas ($H_2$) or a hydrogen radical (H) in the magnetic field, and the debris may be removed as a vaporized compound.

7. Fifth Embodiment

Figure 15:
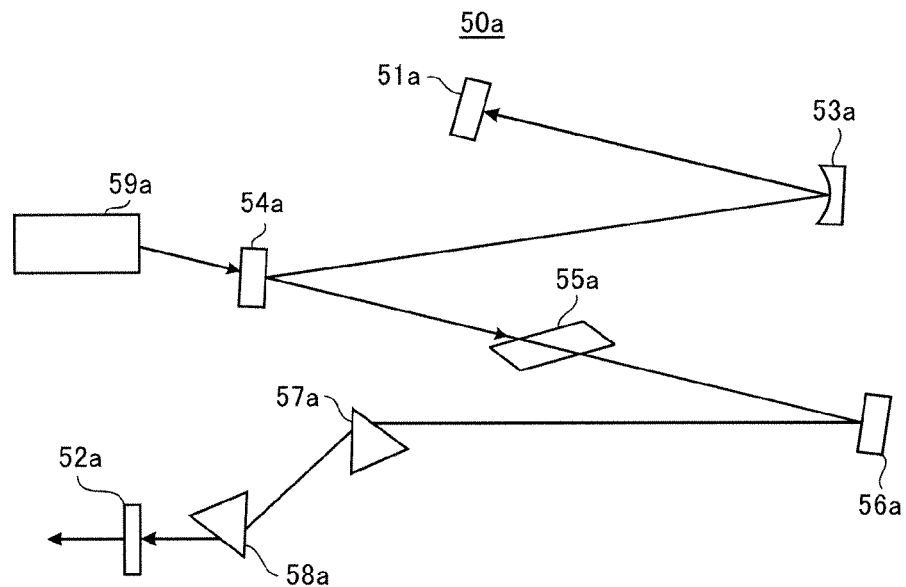
FIG. 15 schematically illustrates an exemplary configuration of a Ti:sapphire laser configured to output a pre-pulse laser beam in an EUV light generation system according to a fifth embodiment.

FIG. 15 schematically illustrates an exemplary configuration of a Ti:sapphire laser configured to output the pre-pulse laser beam in an EUV light generation system according to a fifth embodiment. A Ti:sapphire laser $50a$ of the fifth embodiment may be provided outside the chamber 1 as a driver laser for outputting the pre-pulse laser beam in any one of the first through fourth embodiments.

The Ti:sapphire laser $50a$ may include a laser resonator formed by a semiconductor saturable absorber mirror $51a$ and an output coupler $52a$. A concave mirror $53a$, a first pumping mirror $54a$, a Ti:sapphire crystal $55a$, a second pumping mirror $56a$, and two prisms $57a$ and $58a$ are provided in this order from the side of the semiconductor saturable absorber mirror $51a$ in the optical path in the laser resonator. Further, the Ti:sapphire laser $50a$ may include a pumping source $59a$ for introducing a pumping beam into the laser resonator.

The first pumping mirror $54a$ may be configured to transmit the pumping beam from the outside of the laser resonator with high transmittance and reflect the laser beam inside the laser resonator with high reflectance. The Ti:sapphire crystal $55a$ may serve as a laser medium that undergoes stimulated emission with the pumping beam. The two prisms $57a$ and $58a$ may selectively transmit a laser beam at a predetermined wavelength. The output coupler $52a$ may transmit a part of the laser beam amplified in the laser resonator and output the amplified laser beam from the laser resonator, and reflect the remaining part of the laser beam back into the laser resonator. The semiconductor saturable absorber mirror $51a$ may have a reflective layer and a saturable absorber layer laminated thereon. A part of an incident laser beam of low beam intensity may be absorbed by the saturable absorber layer, and another part of the incident laser beam of high beam intensity may be transmitted through the saturable absorber layer and reflected by the reflective layer. With this, the pulse duration of the incident laser beam may be shortened.

A semiconductor pumped Nd:YVO$_4$ laser may, for example, be used as the pumping source $59a$. The second harmonic wave from the pumping source $59a$ may be introduced into the laser resonator through the first pumping mirror $54a$. The position of the semiconductor saturable absorber mirror $51a$ may be adjusted so as to adjust the resonator length for predetermined longitudinal modes. With this mode-locking of the Ti:sapphire laser $50a$, a picosecond pulse laser beam may be outputted through the output coupler $52a$. Here, when the pulse energy is small, the pulse laser beam may be amplified by a regenerative amplifier.

According to the fifth embodiment, a target material may be irradiated with a picosecond pulse laser beam or a pulse laser beam having a shorter pulse duration. When the target material is irradiated with a short pulse laser beam, thermal diffusion at the irradiation portion may be made extremely small. Accordingly, energy that may be diffused can be used for the ablation effect. As a result, according to the fifth embodiment, compared to the nanosecond pulse laser beam, a droplet may be diffused with smaller pulse energy.

8. Sixth Embodiment

Figure 16:
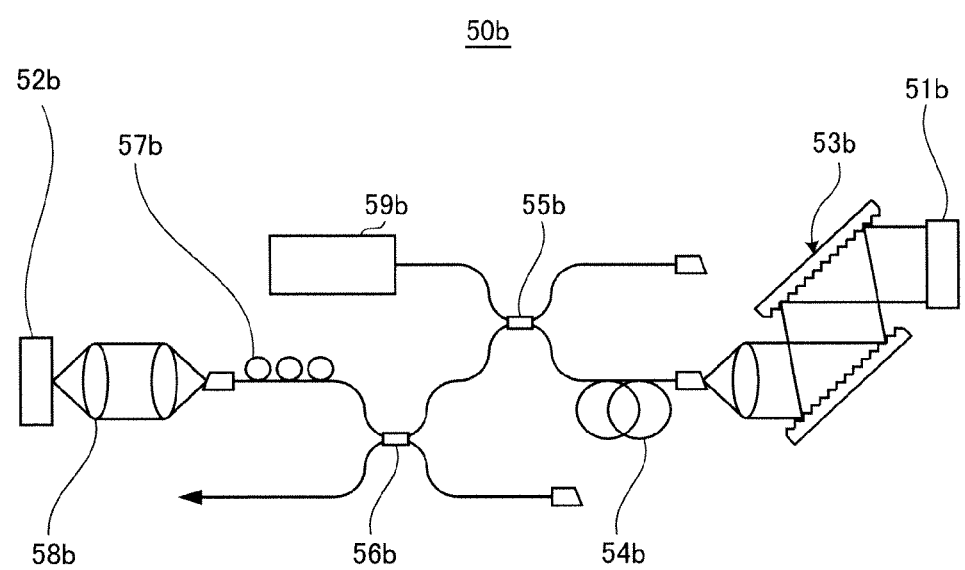
FIG. 16 schematically illustrates an exemplary configuration of a fiber laser configured to output a pre-pulse laser beam in an EUV light generation system according to a sixth embodiment.

FIG. 16 schematically illustrates an exemplary configuration of a fiber laser configured to output the pre-pulse laser beam in an EUV light generation system according to a sixth embodiment. A fiber laser $50b$ of the sixth embodiment may be provided outside the chamber 1 as a driver laser for outputting the pre-pulse laser beam in any one of the first through fourth embodiments.

The fiber laser $50b$ may include a laser resonator formed by a high-reflection mirror $51b$ and a semiconductor saturable absorber mirror $52b$. A grating pair $53b$, a first polarization maintenance fiber $54b$, a multiplexer $55b$, a separation element $56b$, a second polarization maintenance fiber $57b$, and a focusing optical system $58b$ may be provided in this order from the side of the high-reflection mirror $51b$ in the beam path in the laser resonator. Further, the fiber laser $50b$ may include a pumping source $59b$ for introducing a pumping beam into the laser resonator.

The multiplexer $55b$ may be configured to introduce the pumping beam from the pumping source $59b$ to the first polarization maintenance fiber $54b$ and may transmit a laser beam traveling back and forth between the first polarization maintenance fiber $54b$ and the second polarization maintenance fiber 57b. The first polarization maintenance fiber 54b may be doped with ytterbium (Yb), and may undergo stimulated emission with the pumping beam. The grating pair 53b may selectively reflect a laser beam at a predetermined wavelength. The semiconductor saturable absorber mirror 52b may be similar in configuration and function to the semiconductor saturable absorber mirror 51b in the fifth embodiment. The separation element 56b may separate a part of the laser beam amplified in the laser resonator and output the separated laser beam from the laser resonator and return the remaining part of the laser beam back into the laser resonator. This configuration may lead to mode-locking of the fiber laser 50b. When the pumping beam from the pumping source 59b is introduced into the multiplexer 55b through an optical fiber, a picosecond pulse laser beam may be outputted through the separation element 56b.

According to the sixth embodiment, in addition to the effect similar to that of the fifth embodiment, the target material may be irradiated with the pre-pulse laser beam with high precision since the pre-pulse laser beam is introduced through an optical fiber. Further, generally, in a fiber laser, the $M^2$ value that expresses deviation from an ideal Gaussian distribution of the laser beam intensity distribution is approximately 1.2. The $M^2$ value being closer to 1 means that the focusing performance is high. Accordingly, when a fiber laser is used, a small target may be irradiated with a pre-pulse laser beam with high precision.

The shorter the wavelength of a laser beam, the higher the absorptivity of the laser beam by tin. Accordingly, when the priority is placed on the absorptivity of the laser beam by tin, a laser beam at a shorter wavelength may be advantageous. For example, compared to the fundamental harmonic wave outputted from an Nd:YAG laser apparatus at a wavelength of 1064 nm, the absorptivity may increase with the second harmonic wave (a wavelength of 532 nm), further with the third harmonic wave (a wavelength of 355 nm), and even further with the fourth harmonic wave (a wavelength of 266 nm).

Here, an example where a picosecond pulse laser beam is used is shown. However, similar effects can be obtained even with a femtosecond pulse laser beam. Further, a droplet can be diffused even with a nanosecond pulse laser beam. For example, a fiber laser with such specifications as a pulse duration of approximately 15 ns, a repetition rate of 100 kHz, pulse energy of 1.5 mJ, a wavelength of 1.03 μm, and the $M^2$ value of below 1.5 may be used as a pre-pulse laser apparatus.

9. Irradiation Conditions of Laser Beam

FIGS. 17A and 17B are tables showing irradiation conditions of the laser beams in the EUV light generation system in any one of the embodiments. When irradiation pulse energy is E (J), a pulse duration is Tp (s), and an irradiation spot size is Dm (m), beam intensity W (W/m$^2$) of the laser beam may be expressed in Expression (5) below.

$$W = E/(Tp(Em/2)^2\pi) \quad (5)$$

FIG. 17A shows four examples (case 1 through case 4) of irradiation conditions of the pre-pulse laser beam. In the case 1, the diameter of a molten tin droplet is 60 μm. The irradiation conditions for diffusing such a droplet and generating a desired diffused target may be as follows. For example, when the irradiation spot size Dm is 100 μm, the beam intensity W of the laser beam at $1.6 \times 10^9$ W/cm$^2$ is required. In that case, the irradiation pulse energy E may be set to 1.9 mJ, and the pulse duration Tp may be set to 15 ns. With such a pre-pulse laser beam, a diffused target as shown in FIG. 3B may be generated.

In the case 2 shown in FIG. 17A, the diameter of a molten tin droplet is 10 μm (i.e., a mass-limited target). The irradiation conditions for diffusing such a droplet and generating a desired diffused target may be as follows. For example, when the irradiation spot size Dm is 30 μm, the beam intensity W of the laser beam at $1.6 \times 10^9$ W/cm$^2$ is required. In that case, the irradiation pulse energy E may be set to 0.17 mJ, and the pulse duration Tp may be set to 15 ns. With such a pre-pulse laser beam, a diffused target as shown in FIG. 7B may be generated.

In the cases 3 and 4 shown in FIG. 17A, the laser apparatus as shown in FIG. 15 or 16 is used for outputting the pre-pulse laser beam. Further, in the cases 3 and 4, the droplet is a mass-limited target, and the beam intensity W of the laser beam at $1 \times 10^{10}$ W/cm$^2$ is required.

FIG. 17B shows four examples (case 1 through case 4) of irradiation conditions of the main pulse laser beam. In the case 1, the diffusion diameter of a diffused target is 250 μm. Irradiation conditions for turning such a diffused target into plasma may be as follows. For example, when the irradiation spot size Dm is 250 μm, the beam intensity W of the laser beam at $1.0 \times 10^{10}$ W/cm$^2$ is required. In that case, the irradiation pulse energy E may be set to 100 mJ, and the pulse duration Tp may be set to 20 ns. Accordingly, energy required to turn the diffused target into plasma may be supplied to the diffused target.

In the case 2 shown in FIG. 17B, the diffusion diameter of the diffused target, the irradiation spot size Dm, and the beam intensity W of the laser beam are the same as in the case 1 shown in FIG. 17B. In that case, the irradiation pulse energy E may be set to 150 mJ, and the pulse duration Tp may be set to 30 ns. With this, energy required to turn the diffused target into plasma may be supplied to the diffused target.

In the case 3 shown in FIG. 17B, the diffusion diameter of a diffused target is 300 μm. Irradiation conditions for turning such a diffused target into plasma may be as follows. For example, when the irradiation spot size Dm is 300 μm, the beam intensity W of the laser beam at $1.1 \times 10^{10}$ W/cm$^2$ is required. In that case, the irradiation pulse energy E may be set to 200 mJ, and the pulse duration Tp may be set to 25 ns. Thus, energy required to turn the diffused target into plasma may be supplied to the diffused target.

In the case 4 shown in FIG. 17B, the diffusion diameter of a diffused target is 200 μm. Irradiation conditions for turning such a diffused target into plasma may be as follows. For example, when the irradiation spot size Dm is 200 μm, the beam intensity W of the laser beam at $1.2 \times 10^{10}$ W/cm$^2$ is required. In that case, the irradiation pulse energy E may be set to 200 mJ, and the pulse duration Tp may be set to 50 ns. With this, energy required to turn the diffused target into plasma may be supplied to the diffused target.

As described above, the beam intensity of the pre-pulse laser beam and the main pulse laser beam may be set by setting the irradiation pulse energy E and the pulse duration Tp of the laser beam.

10. Seventh Embodiment

Figure 18:
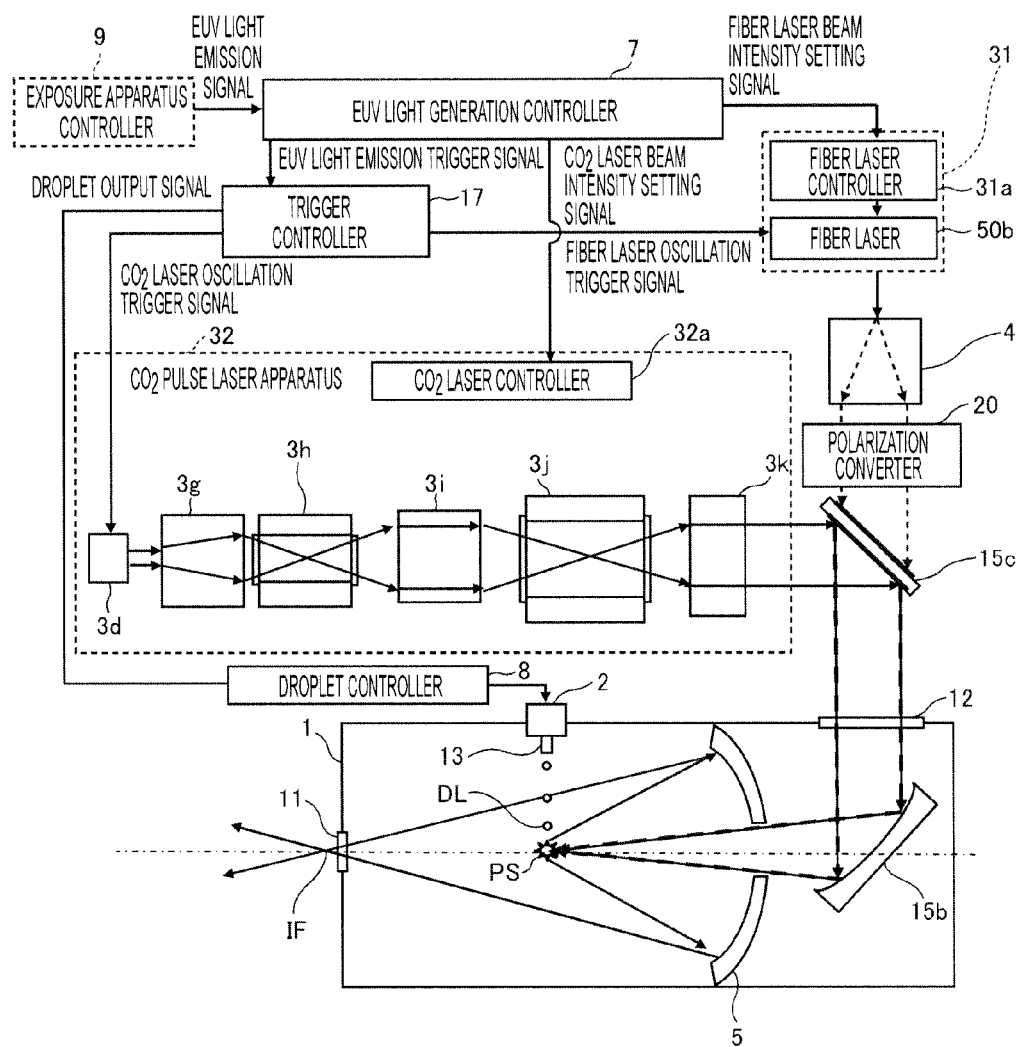
FIG. 18 schematically illustrates an exemplary configuration of an EUV light generation system according to a seventh embodiment.

FIG. 18 schematically illustrates an exemplary configuration of an EUV light generation system according to a seventh embodiment. In the EUV light generation system according to the seventh embodiment, the polarization state of the pre-pulse laser beam from a fiber laser apparatus 31 may be controlled by a polarization converter 20. The polarization converter 20 may be configured to change the polarization state of the pre-pulse laser beam into a state other than the linear polarization. The polarization converter 20 may be provided at a predetermined position in a beam path between the driver laser and the plasma generation region PS. In this disclosure, a polarization retarder is also included in the polarization converter.

In the seventh embodiment, the fiber laser apparatus 31 may include a fiber laser controller 31a and the fiber laser 50b described with reference to FIG. 16 (the sixth embodiment). A $CO_2$ pulse laser apparatus 32 may include a $CO_2$ laser controller 32a, the master oscillator 3d, the preamplifier 3h, the main amplifier 3j, and the relay optical systems 3g, 3i, and 3k as described with reference to FIG. 9 (the first embodiment).

The EUV light generation controller 7 may output a fiber laser beam intensity setting signal to the fiber laser controller 31a. Further, the EUV light generation controller 7 may output a $CO_2$ laser beam intensity setting signal to the $CO_2$ laser controller 32a.

The trigger controller 17 may output a fiber laser oscillation trigger signal to the fiber laser 50b. Further, the trigger controller 17 may output a $CO_2$ laser oscillation trigger signal to the master oscillator 3d.

The fiber laser 50b may be configured to output a pre-pulse laser beam at a first wavelength based on the fiber laser oscillation trigger signal. The fiber laser controller 31a may be configured to control the output intensity of the fiber laser 50b based on the fiber laser beam intensity setting signal. The pre-pulse laser beam from the fiber laser 50b may be expanded in diameter by the beam expander 4. Thereafter, the polarization state of the pre-pulse laser beam may be changed by the polarization converter 20, and then the pre-pulse laser beam may be incident on the beam combiner 15c.

The master oscillator 3d may be configured to output a seed beam at a second wavelength based on the $CO_2$ laser oscillation trigger signal. The $CO_2$ laser controller 32a may be configured to control the output intensity of the preamplifier 3h and the main amplifier 3j based on the $CO_2$ laser beam intensity setting signal. The seed beam from the master oscillator 3d may be amplified by the preamplifier 3h and the main amplifier 3j to desired beam intensity.

In the seventh embodiment, the fiber laser 50b is used to output the pre-pulse laser beam. This disclosure, however, is not limited thereto. For example, a YAG laser or a Ti:sapphire laser may be used to output the pre-pulse laser beam. Alternatively, in a configuration where two-stage irradiation with the first and second pre-pulse laser beams is employed, the first pre-pulse laser beam may be outputted from a fiber laser apparatus capable of achieving a small spot, and the second pre-pulse laser beam may be outputted from a YAG laser apparatus or a Ti:sapphire laser apparatus capable of outputting an ultrashort pulse laser beam. Then, the main pulse laser beam may be outputted from a $CO_2$ laser apparatus capable of achieving high power laser beam. That is, a desired number of pre-pulse laser beams may be outputted from a plurality of separate laser apparatuses. Further, in accordance with the state of the diffused target at the time of being irradiated with the second pre-pulse laser beam, the diffused target may be irradiated with a plurality of pre-pulse laser beams respectively at different wavelengths, and with difference spot sizes, energy, and pulse durations.

10.1 Overview of Polarization Control

Figure 19A:
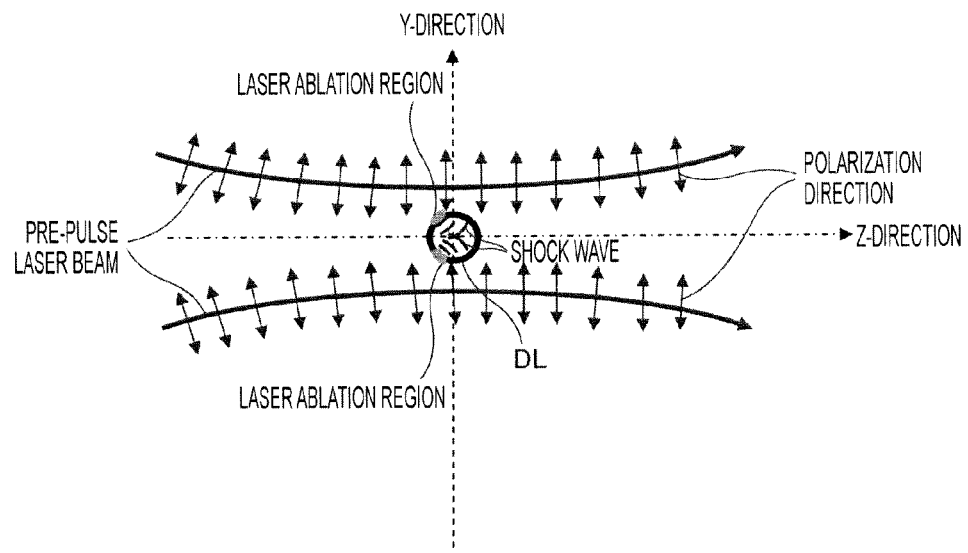
FIG. 19A is a conceptual diagram showing a droplet being irradiated with a linearly-polarized pre-pulse laser beam.
Figure 19B:
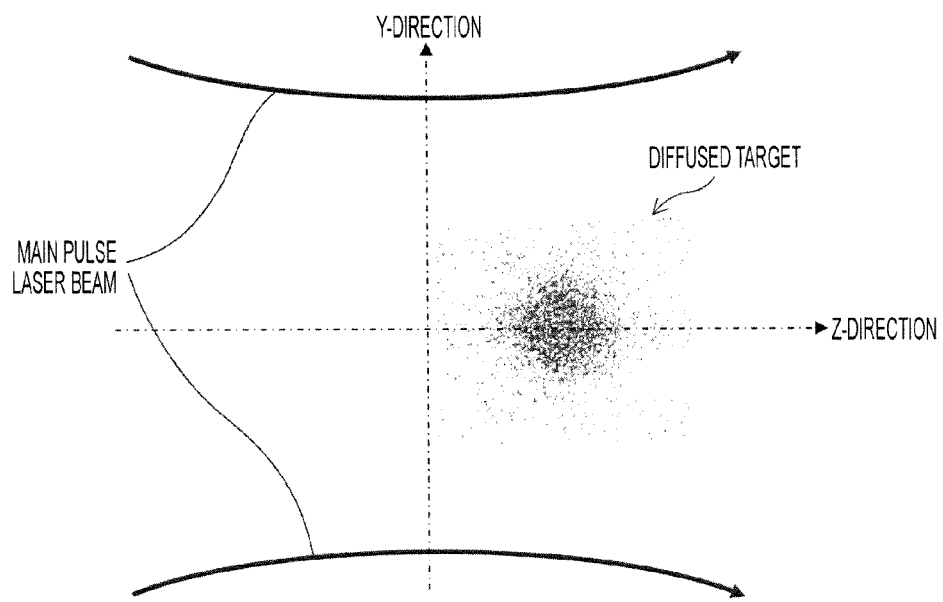
FIG. 19B shows the simulation result of diffusion of the droplet.
Figure 20A:
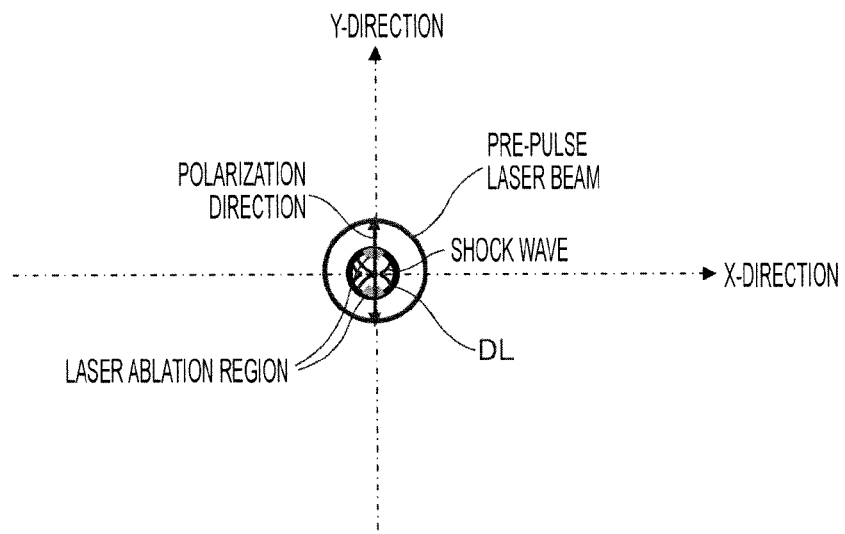
FIG. 20A is a conceptual diagram showing a droplet being irradiated with a linearly-polarized pre-pulse laser beam.
Figure 20B:
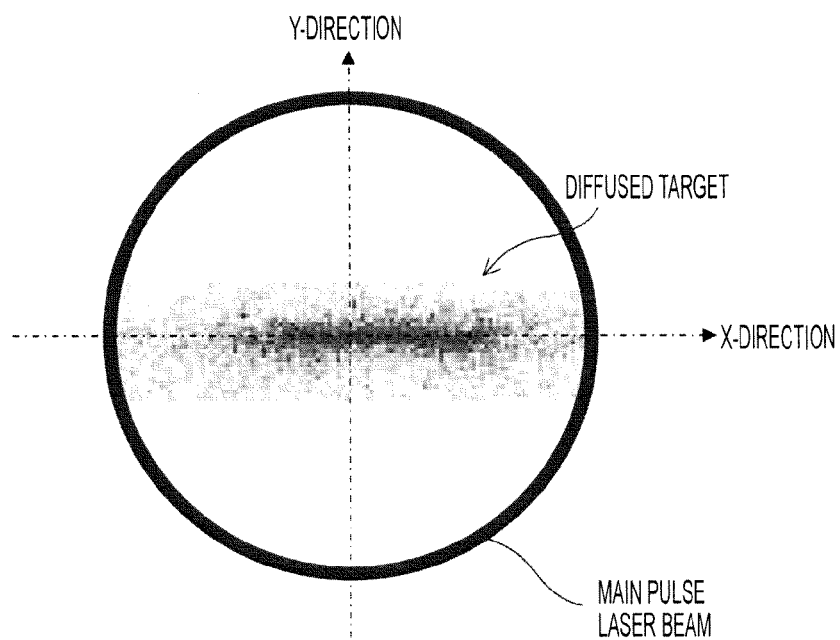
FIG. 20B shows the simulation result of diffusion of the droplet.

FIGS. 19A and 20A are conceptual diagrams showing a droplet being irradiated with a linearly-polarized pre-pulse laser beam. FIGS. 19B and 20B show the simulation result of a droplet being irradiated with a linearly-polarized pre-pulse laser beam. In FIGS. 19A and 19B, the droplet is viewed in a direction (X-direction) perpendicular to the polarization direction of the pre-pulse laser beam. In FIGS. 20A and 20B, the droplet is viewed in a direction of the beam axis (Z-direction) of the pre-pulse laser beam.

With reference to FIGS. 19A and 20A, a case where a droplet is irradiated with a linearly-polarized pre-pulse laser beam will be discussed. In this case, the droplet may be diffused, and as shown in FIGS. 19B and 20B, a diffused target may be generated. The simulation result reveals that the diffused target is diffused further in a direction (X-direction) perpendicular to the polarization direction (Y-direction) of the pre-pulse laser beam. When the diffused target diffused as such is irradiated with the main pulse laser beam traveling along substantially the same path as the pre-pulse laser beam, as shown in FIGS. 19B and 20B, the shape of the diffused target may differ largely from the cross-sectional shape of the main pulse laser beam. Accordingly, a large portion of the main pulse laser beam may not be used to generate plasma.

Figure 21:
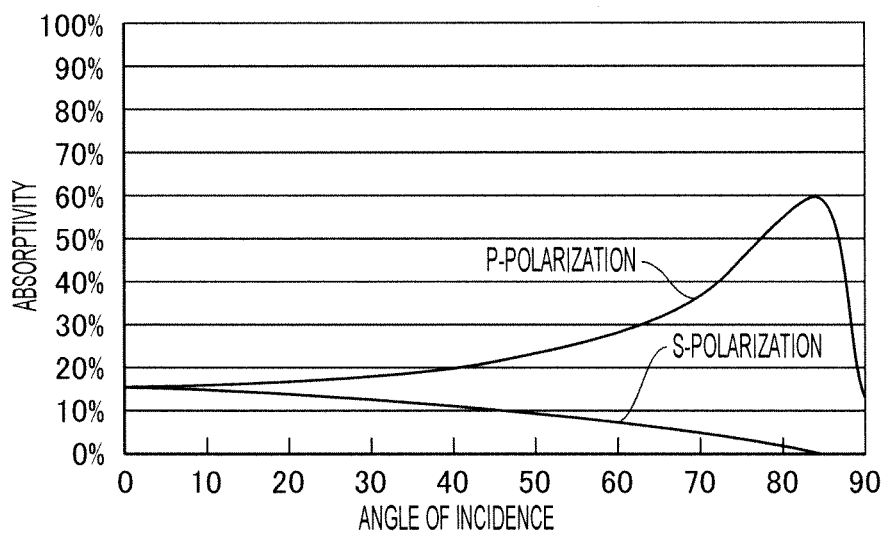
FIG. 21 is a graph showing absorptivity of a P-polarization component and an S-polarization component of a laser beam by a molten tin droplet.

Here, a reason why the diffused target is diffused largely in a direction (X-direction) perpendicular to the polarization direction of the linearly-polarized pre-pulse laser beam will be considered. FIG. 21 is a graph showing absorptivity of a P-polarization component and an S-polarization component of a laser beam incident on the surface of a molten tin droplet. In the case shown in FIG. 21, the wavelength of the laser beam is 1.06 μm. As shown in the graph, the absorptivity of the laser beam may depend on the angle of incidence and the polarization state of the laser beam.

The absorptivity of the P-polarization component of an incident laser beam is at the highest when the angle of incidence of the laser beam is 80 to 85 degrees, and gradually decreases as the angle of incidence shifts from that angle range. On the other hand, the absorptivity of the S-polarization component is substantially the same as that of the P-polarization component when the laser beam is incident on the surface of the molten tin droplet at substantially 0 degree (i.e., substantially normal incidence), and decreases as the angle of incidence increases. For example, when the angle of incidence is equal to or greater than 80 degrees, the absorptivity of the S-polarization component approximates to 0%.

Based on such absorptivity properties, it is speculated that energy of the laser beam is absorbed the most where a linearly-polarized laser beam is incident on the surface of the droplet as the P-polarization component at a degree within a range of 80 to 85 degrees. Portions of the droplet where the laser beam is incident thereon as the P-polarization component at an angle within the above range are areas toward the edges of the irradiation surface in the Y-direction (hereinafter, referred to as "laser ablation region"). That is, the absorptivity of the laser beam is high in these areas, and strong laser ablation may occur. As a result of the reaction of the laser ablation in the laser ablation regions, a shock wave or sonic wave may propagate toward the inside of the droplet from the laser ablation regions. This shock wave or sonic wave may propagate toward the edges of the droplet in the X-direction as shown in FIG. 20A, and the droplet may be diffused in the X-direction as shown in FIG. 20B.

Accordingly, in the seventh embodiment, the polarization state of the pre-pulse laser beam may be changed into a polarization state other than the linear polarization using the polarization converter 20. Further, by controlling the spot size of the pre-pulse laser beam to be equal to or greater than the diameter (e.g., 40 μm) of the droplet, the entire irradiation surface of the droplet may be irradiated with the pre-pulse laser beam. With this, the droplet may be diffused symmetrically about the beam axis of the pre-pulse laser beam, and the diffused target may be irradiated with the main pulse laser beam efficiently.

The polarization converter 20 may be configured to change the pre-pulse laser beam into a substantially circularly-polarized laser beam, a substantially unpolarized laser beam, a substantially radially-polarized laser beam, a substantially azimuthally-polarized laser beam, and so forth.

10.2 Examples of Polarization Control

Figure 22A:
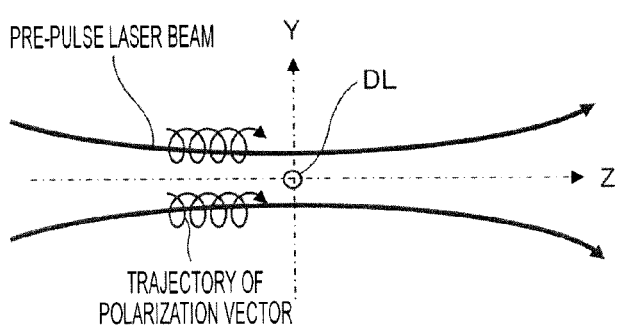
FIGS. 22A through 22F show a droplet being irradiated with a circularly-polarized pre-pulse laser beam and a diffused target being irradiated with a main pulse laser beam according to a seventh embodiment.
Figure 22B:
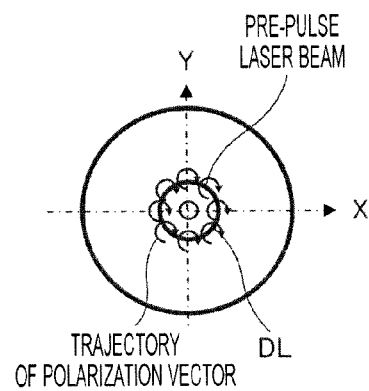
Figure 22C:
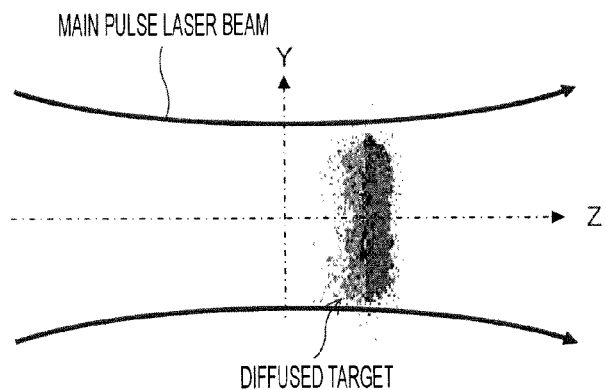
Figure 22D:
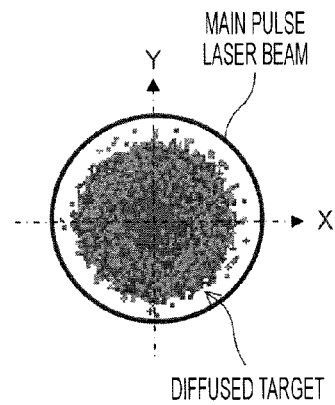
Figure 22E:
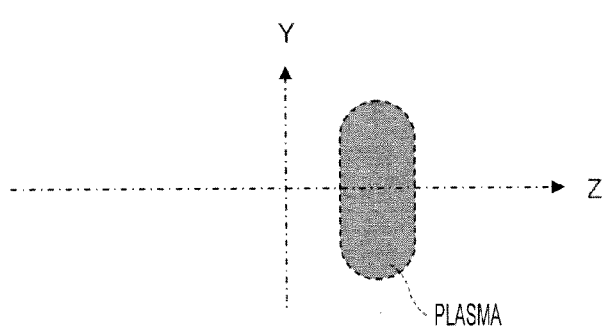
Figure 22F:
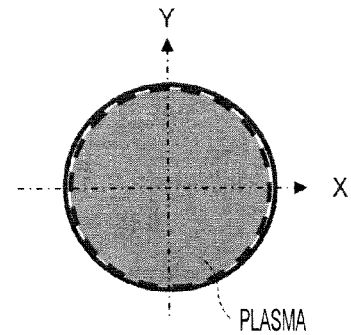

FIGS. 22A and 22B show a droplet being irradiated with a circularly-polarized pre-pulse laser beam. FIGS. 22C and 22D show a diffused target generated when the droplet is irradiated with the pre-pulse laser beam being irradiated with a main pulse laser beam. FIGS. 22E and 22F schematically show plasma generated when the diffused target is irradiated with the main pulse laser beam.

In a circularly-polarized laser beam, the polarization vector draws a circle on a plane (X-Y plane) perpendicular to the beam axis of the laser beam. Further, the polarization state of the pre-pulse laser beam is circular at any position along the X-Y plane (see FIGS. 22A and 22B). In the circularly-polarized laser beam, the ratio of an X-direction polarization component and a Y-direction polarization component is substantially 1:1. When a droplet is irradiated with the circularly-polarized pre-pulse laser beam, the distribution of absorptivity of the pre-pulse laser beam in the surface of the droplet may be symmetrical about the center axis of the droplet in the irradiation direction of the laser beam. As a result, the diffusion state of the droplet may be symmetrical about the center axis of the droplet, and the shape of the diffused target may become disc-like (see FIGS. 22C and 22D). This allows the shape of the diffused target to substantially coincide with the cross-sectional shape of the main pulse laser beam so that the main pulse laser beam may be absorbed efficiently by the diffused target.

FIGS. 23A and 23B show a droplet being irradiated with an unpolarized pre-pulse laser beam. FIGS. 23C and 23D show a diffused target generated when the droplet is irradiated with the pre-pulse laser beam being irradiated with a main pulse laser beam. FIGS. 23E and 23F schematically show plasma generated when the diffused target is irradiated with the main pulse laser beam.

The pre-pulse laser beam shown in FIG. 23B is substantially unpolarized. In such an unpolarized laser beam, the ratio of the X-direction polarization component and the Y-direction polarization component is substantially 1:1. When a droplet is irradiated with the unpolarized pre-pulse laser beam, the distribution of absorptivity of the pre-pulse laser beam in the surface of the droplet may be symmetrical about the center axis of the droplet in the irradiation direction of the laser beam. As a result, the diffusion state of the droplet may be symmetrical about the center axis of the droplet, and the shape of the diffused target may, for example, become disc-like. Accordingly, the main pulse laser beam may be absorbed by the diffused target efficiently.

Figure 24A:
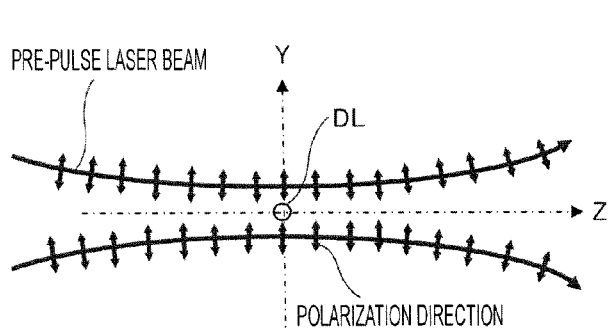
FIGS. 24A through 24F show a droplet being irradiated with a radially-polarized pre-pulse laser beam and a diffused target being irradiated with a main pulse laser beam according to the seventh embodiment.
Figure 24B:
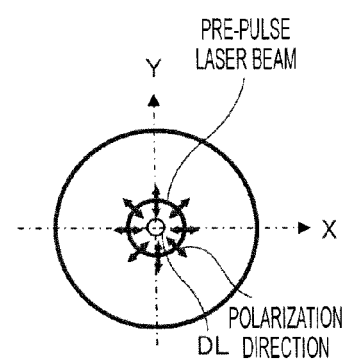
Figure 24C:
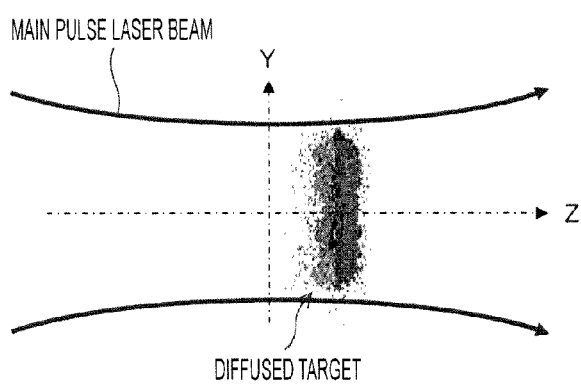
Figure 24D:
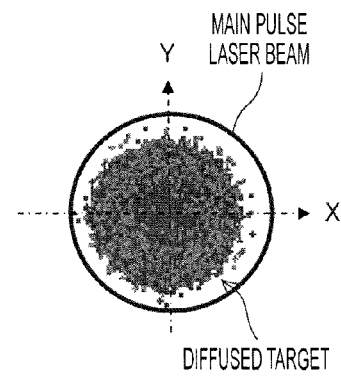
Figure 24E:
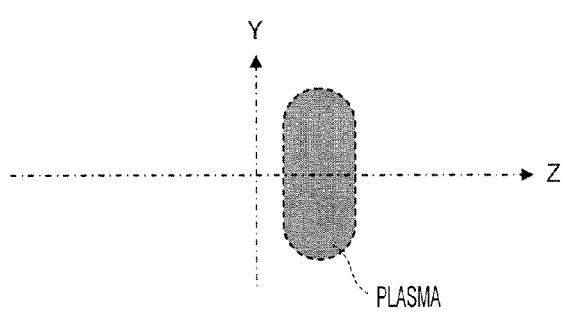
Figure 24F:
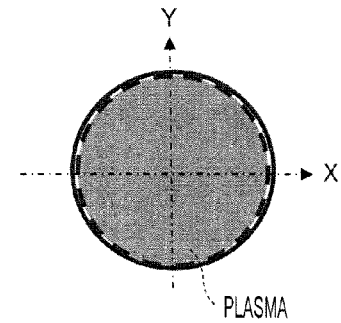

FIGS. 24A and 24B show a droplet being irradiated with a radially-polarized pre-pulse laser beam. FIGS. 24C and 24D show a diffused target generated when the droplet is irradiated with the pre-pulse laser beam being irradiated with a main pulse laser beam. FIGS. 24E and 24F schematically show plasma generated when the diffused target is irradiated with the main pulse laser beam.

When a droplet is irradiated with the radially-polarized pre-pulse laser beam, the distribution of absorptivity of the pre-pulse laser beam in the surface of the droplet may be symmetrical about the beam axis of the pre-pulse laser beam. Here, the beam axis of the pre-pulse laser beam may coincide with the center axis of the droplet. As a result, the diffusion state of the droplet may be symmetrical about the beam axis of the pre-pulse laser beam, and the shape of the diffused target may, for example, become disc-like. Accordingly, the main pulse laser beam may be absorbed by the diffused target efficiently.

Further, when the spot size of the pre-pulse laser beam is controlled to be equal to or greater than the diameter (e.g., 40 μm) of the droplet, the entire irradiation surface of the droplet may be irradiated with the pre-pulse laser beam incident thereon mostly as the P-polarization component. Accordingly, the absorptivity of the pre-pulse laser beam may be increased, and the energy required to generate a desired diffused target may be kept small.

Figure 25A:
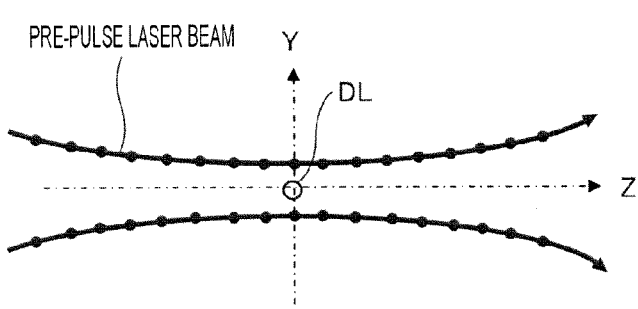
FIGS. 25A through 25F show a droplet being irradiated with an azimuthally-polarized pre-pulse laser beam and a diffused target being irradiated with a main pulse laser beam according to the seventh embodiment.
Figure 25B:
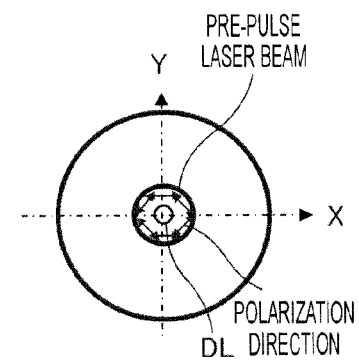
Figure 25C:
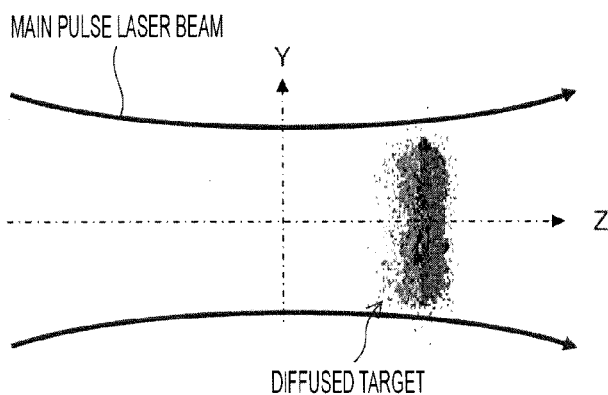
Figure 25D:
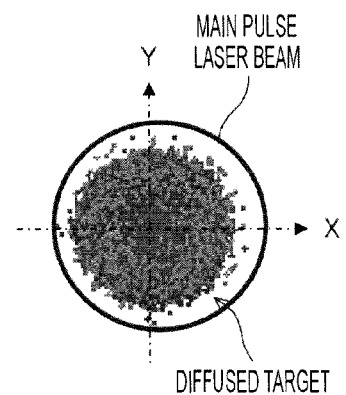
Figure 25E:
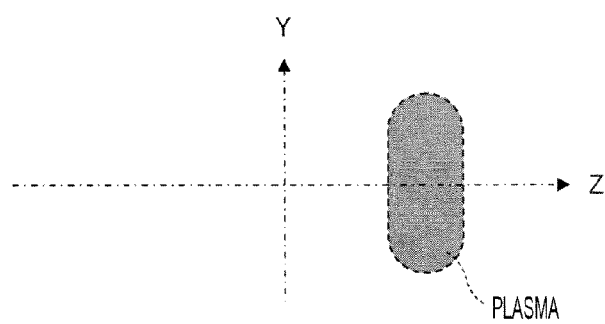
Figure 25F:
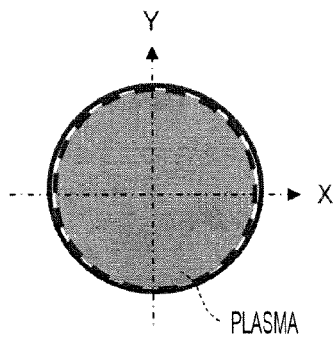

FIGS. 25A and 25B show a droplet being irradiated with an azimuthally-polarized pre-pulse laser beam. FIGS. 25C and 25D show a diffused target generated when the droplet is irradiated with the pre-pulse laser beam being irradiated with a main pulse laser beam. FIGS. 25E and 25F schematically show plasma generated when the diffused target is irradiated with the main pulse laser beam.

When a droplet is irradiated with the azimuthally-polarized pre-pulse laser beam, the distribution of absorptivity of the pre-pulse laser beam in the surface of the droplet may be symmetrical about the beam axis of the pre-pulse laser beam. Here, the beam axis of the pre-pulse laser beam may coincide with the center axis of the droplet. As a result, the diffusion state of the droplet may be symmetrical about the beam axis of the pre-pulse laser beam, and the shape of the diffused target may, for example, become disc-like. Accordingly, the main pulse laser beam may be absorbed by the diffused target efficiently.

In the seventh embodiment, the distribution of the absorptivity of the pre-pulse laser beam in the surface of the droplet is made symmetrical about the center axis of the droplet and/or the beam axis of the pre-pulse laser beam by controlling the polarization state of the pre-pulse laser beam. However, this disclosure is not limited thereto. The distribution of the absorptivity of the pre-pulse laser beam in the surface of the droplet need not be perfectly symmetrical about the beam axis, but may be substantially symmetrical. Accordingly, the polarization state of the pre-pulse laser beam may, for example, be elliptical as well.

Figure 26A:
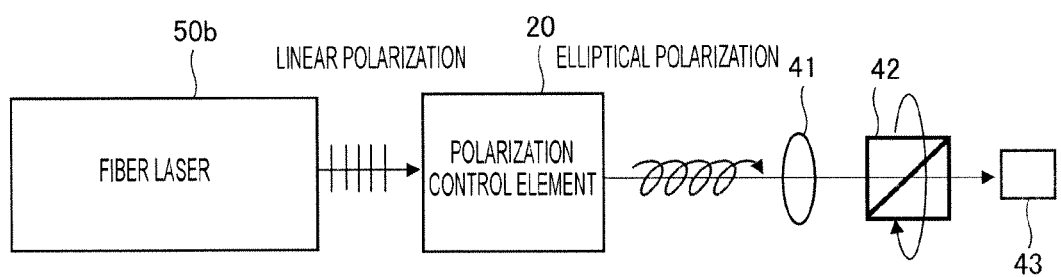
FIGS. 26A and 26B are diagrams for discussing a method for measuring the degree of linear-polarization.
Figure 26B:
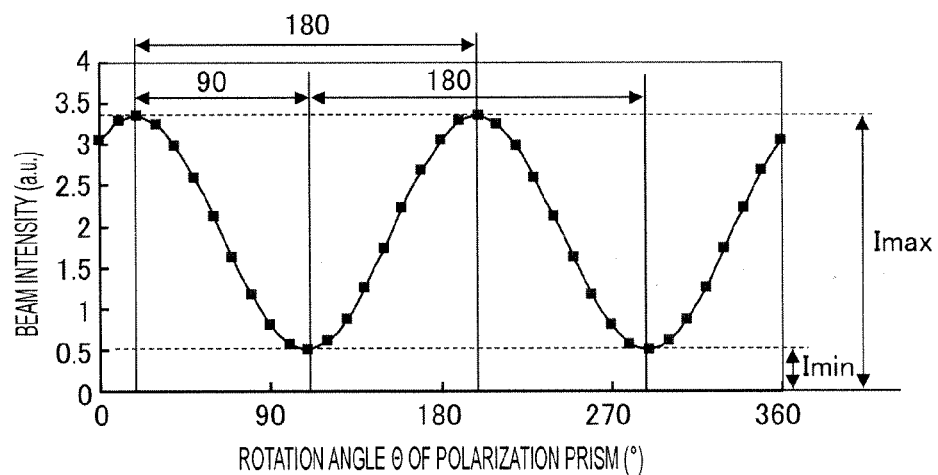

FIG. 26A schematically illustrates an exemplary configuration of a device for measuring the degree of linear polarization. The device may include a polarization prism and a beam intensity detector. FIG. 26B shows the relationship between the rotation angle of the polarization prism and the detection result of the beam intensity detector.

As shown in FIG. 26A, a linearly-polarized pre-pulse laser beam from the fiber laser 50b may be changed into an elliptically-polarized laser beam by the polarization converter 20. This elliptically-polarized laser beam may be focused by a focusing optical system 41 and made to be incident on the polarization prism 42. The beam intensity of the laser beam outputted from the polarization prism 42 may be detected by the beam intensity detector 43. The polarization prism 42 may be formed by bonding two refractive crystals such as calcite. The polarization prism 42 may be used to extract a laser beam of a predetermined polarization direction as an output laser beam from an input beam in accordance with the orientation of the bonding surface of the prism. As the polarization prism 42 is rotated about the beam axis of the pre-pulse laser beam, the polarization prism 42 may transmit a laser beam polarized in a direction corresponding to the rotation angle. In the description below, it is assumed that the polarization prism 42 may be an ideal prism having a sufficiently high extinction factor.

As shown in FIG. 26B, the beam intensity of the output beam from the polarization prism 42 may change periodically as the polarization prism 42 is rotated by 180 degrees. Here, as shown in Expression (6), the degree of linear polarization Po may be obtained from a maximum value Imax and a minimum value Imin of the beam intensity.

$$Po=(Imax-Imin)/(Imax+Imin)\times 100(\%) \quad (6)$$

The degree of linear polarization Po measured by the device shown in FIG. 26A may be substantially 0% for a laser beam of a polarization state that is substantially symmetrical about the beam axis (e.g., circularly-polarized laser beam, unpolarized laser beam, radially-polarized laser beam, azimuthally-polarized laser beam). On the other hand, the degree of linear polarization Po may be substantially 100% for a linearly-polarized laser beam. Here, when the degree of linear polarization Po is in the following ranges, the diffused target may be formed in a desired shape (e.g., disc-shape).

$$0\% \leq Po < 30\%$$

$$0\% \leq Po < 20\%$$

$$0\% \leq Po < 10\%$$

These ranges may be adjusted with the extinction factor of the actually-used polarization prism 42 taken into consideration.

10.3 Examples of Polarization Converter

Figure 27:
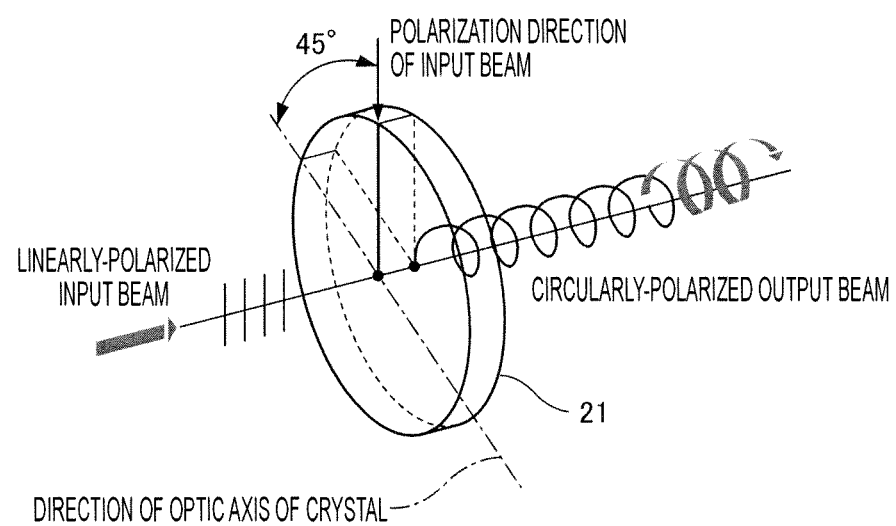
FIG. 27 shows a first example of a polarization converter in the seventh embodiment.

FIG. 27 shows a first example of a polarization converter in the seventh embodiment. In FIG. 27, a quarter-wave plate 21 for converting a linearly-polarized laser beam into a circularly-polarized laser beam may be used as the polarization converter.

The transmissive quarter-wave plate 21 may be a refractive crystal that provides a phase difference of n/2 between a polarization component parallel to the optic axis of the crystal and a polarization component perpendicular to the optic axis of the crystal. As shown in FIG. 27, a linearly-polarized laser beam may be converted into a circularly-polarized laser beam when the linearly-polarized laser beam is incident on the quarter-wave plate 21 such that the polarization direction thereof is inclined by 45 degrees with respect to the optic axis of the quarter-wave plate 21. When the polarization direction of the linearly-polarized laser beam is inclined by 45 degrees in the other direction, the rotation direction of the circular polarization is reversed. This disclosure is not limited to the transmissive quarter-wave plate 21, and a reflective quarter-wave plate may be used as well.

Figure 28A:
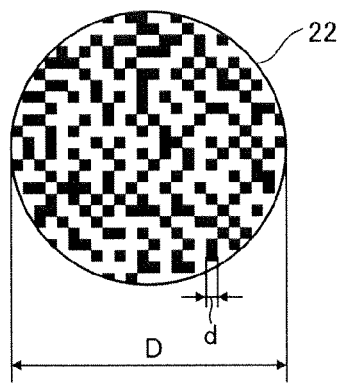
FIGS. 28A through 28C show a second example of a polarization converter in the seventh embodiment.
Figure 28B:
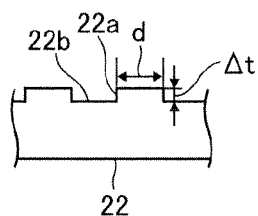
Figure 28C:
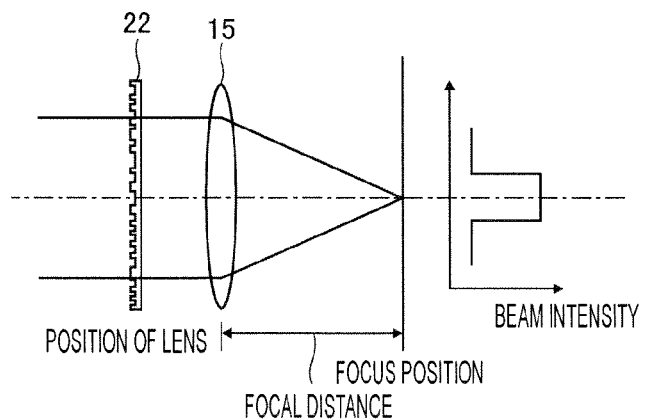

FIGS. 28A through 28C show a second example of a polarization converter in the seventh embodiment. FIG. 28A is a front view of the polarization converter, FIG. 28B is an enlarged fragmentary sectional view of the polarization converter taken along a radial direction plane, and FIG. 28C shows one mode for the use of the polarization converter. In FIGS. 28A through 28C, a random phase plate 22 for converting a linearly-polarized laser beam into an unpolarized laser beam may be used as the polarization control apparatus.

The transmissive random phase plate 22 may be a transmissive optical element having a diameter D, on whose input or output surface minute square regions each having a length d on each side are formed by randomly arranged recesses and protrusions. The random phase plate 22 may divide an input beam having the diameter D into small square beams each having the length d on each side. With this configuration, the random phase plate 22 may provide a phase difference of π between a small beam transmitted through a protrusion 22a and a small beam transmitted through a recess 22b. The phase difference π may be provided by setting a step Δt between the protrusion 22a and the recess 22b as in Expression (7) below, where the wavelength of the incident laser beam is λ, and the refractive index of the random phase plate 22 is $n_1$.

$$\Delta t = \lambda/2(n_1 - 1) \quad (7)$$

As shown in FIG. 28C, the transmissive random phase plate 22 may, for example, be provided between the pre-pulse laser apparatus and the focusing optical system 15. A linearly-polarized laser beam may be incident on the random phase plate 22, and the laser beam transmitted through the random phase plate 22 may become unpolarized. Laser beams polarized in directions perpendicular to each other do not interfere. Accordingly, when this laser beam is focused by the focusing optical system 15, the cross-sectional beam intensity distribution at the focus may not be Gaussian but may be closer to the top-hat distribution. When a droplet is irradiated with such a pre-pulse laser beam, the droplet may be diffused substantially symmetrically about the center axis of the droplet. Accordingly, the diffused target may become disc-shaped, and the main pulse laser beam may be absorbed by the diffused target efficiently.

This disclosure is not limited to the transmissive random phase plate 22, and a reflective random phase plate may be used instead. Further, the protrusion 22a and the recess 22b may be in any other polygonal shapes, such as a hexagonal shape, a triangular shape.

Figure 29A:
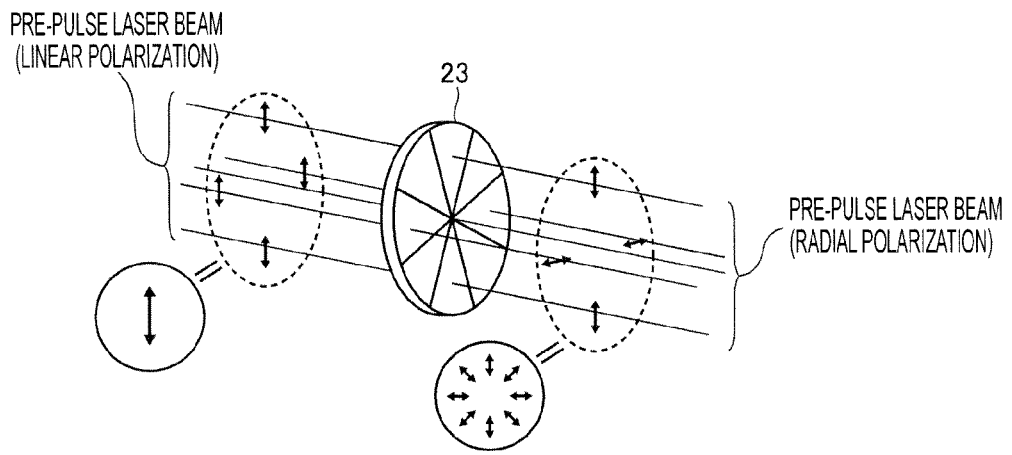
FIGS. 29A and 29B show a third example of a polarization converter in the seventh embodiment.
Figure 29B:
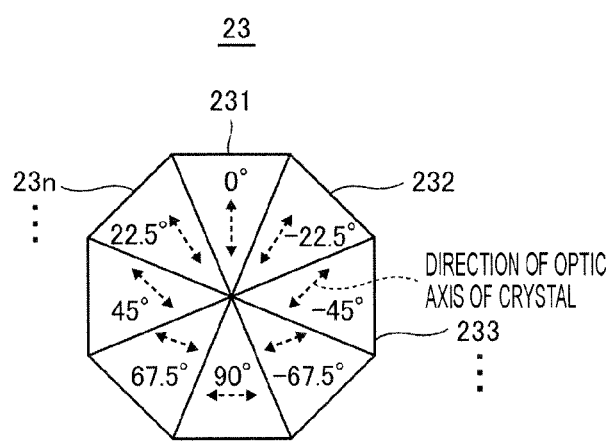

FIGS. 29A and 29B show a third example of a polarization converter in the seventh embodiment. FIG. 29A is a perspective view of the polarization converter, and FIG. 29B is a front view of the polarization converter. FIGS. 29A and 29B show an n-divided wave plate 23 for converting a linearly-polarized laser beam into a radially-polarized laser beam.

The n-divided wave plate 23 may be a transmissive optical element in which n triangular half-wave plates 231, 232, . . . , 23n are arranged symmetrically about the beam axis of the laser beam. Each of the half-wave plates 231, 232, . . . , 23n may be a refractive crystal that provides a phase difference of n between a polarization component parallel to the optic axis of the crystal and a polarization component perpendicular to the optic axis of the crystal. When a linearly-polarized laser beam is incident on such a half-wave plate perpendicularly such that the polarization direction is inclined by an angle θ with respect to the optic axis of the half-wave plate, the laser beam may be outputted from the half-wave plate with its polarization direction being rotated by 2θ.

For example, the half-wave plate 231 and the half-wave plate 233 may be arranged so that their respective optic axes make an angle of 45 degrees. Then, the polarization direction of the linearly-polarized laser beam transmitted through the half-wave plate 231 and the polarization direction of the linearly-polarized laser beam transmitted through the half-wave plate 233 may differ by 90 degrees. In this way, the polarization direction of the incident laser beam may be changed in accordance with an angle formed by the optic axis of the half-wave plate and the polarization direction of the incident laser beam. With this, the polarization directions of the laser beams transmitted through the respective half-wave plates may be changed to predetermined polarization directions. As a result, the re-divided wave plate 23 may convert a linearly-polarized laser beam into a radially-polarized laser beam. Further, by changing the arrangement of the half-wave plates in the n-divided wave plate 23, a linearly-polarized laser beam may be converted into an azimuthally-polarized laser beam as well.

Figure 30:
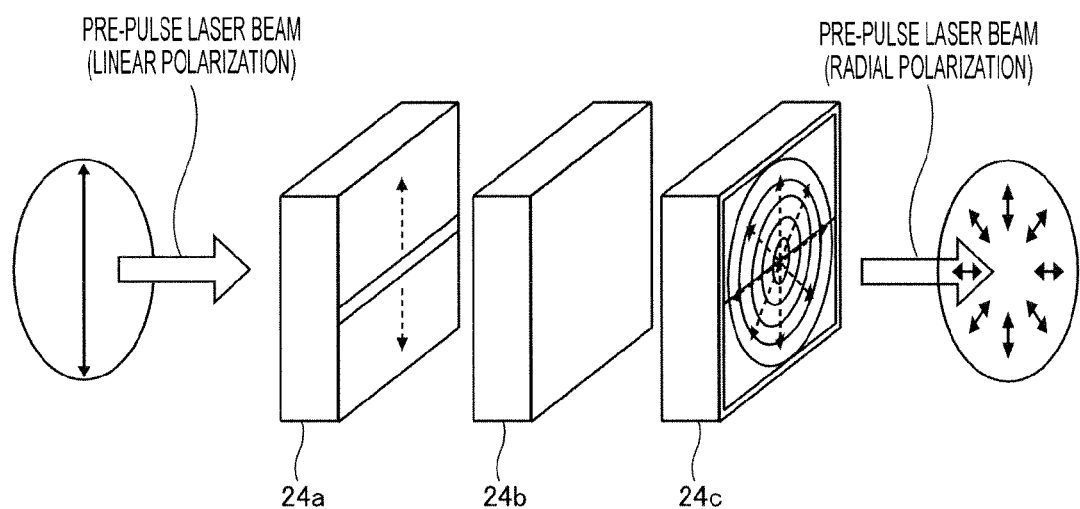
FIG. 30 shows a fourth example of a polarization converter in the seventh embodiment.

FIG. 30 shows a fourth example of a polarization converter in the seventh embodiment. FIG. 30 shows a phase compensator 24a, a polarization rotator 24b, and a theta cell 24c for converting a linearly-polarized laser beam into a radially-polarized laser beam.

The theta cell 24c may be an optical element into which a twisted nematic (TN) liquid crystal is injected, and the liquid crystal molecules are arranged so as to be twisted from the input side toward the output side. A linearly-polarized laser beam incident on the theta cell 24c may be rotated along the twist of the alignment of the liquid crystal molecules, and a laser beam linearly-polarized in a direction inclined with respect to the polarization direction of the input beam may be outputted from the theta cell 24c. Accordingly, by setting the twisted angle of the alignment of the liquid crystal molecules in the theta cell 24c so as to differ in accordance with the azimuth angle direction, the theta cell 24c may convert a linearly-polarized input beam into a radially-polarized output beam.

However, when a linearly-polarized laser beam is converted into a radially-polarized laser beam only with the theta cell 24c, the beam intensity may be decreased at a boundary between an upper half and a lower half of the laser beam outputted from the theta cell 24c. Accordingly, a phase of the upper half of the laser beam may be shifted by π by the phase compensator 24a prior to the laser beam being incident on the theta cell 24c. In FIG. 30, the arrows indicate that the phases of the input beam are opposite between the upper and lower halves of the laser beam. The upper half of the phase compensator 24a may include a TN liquid crystal in which the alignment of the liquid crystal molecules is twisted by 180 degrees from the input side toward the output side. In this way, when a linearly-polarized laser beam in which the phases of the upper and lower halves are opposite is made to be incident on the theta cell 24c, laser beams of the same phase may be outputted around the boundary between the upper and lower halves of the output laser beam. With this, the beam intensity may be prevented from being decreased at the boundary between the upper and lower halves of the laser beam outputted from the theta cell 24c.

The polarization rotator 24b may be configured to rotate the polarization direction of the linearly-polarized input beam by 90 degrees. When a laser beam of which the polarization direction is rotated by 90 degrees is made to be incident on the theta cell 24c, the theta cell 24c may convert the linearly-polarized laser beam into an azimuthally-polarized laser beam. The polarization rotator 24b may be formed of a TN liquid crystal in which the alignment of the liquid crystal molecules is twisted by 90 degrees from the input side toward the output side. In this case, by controlling the DC voltage applied to the polarization rotator 24b so as to switch between a state where the alignment of the liquid crystal molecules are twisted and a state where the alignment is not twisted, switching between a radially-polarized output beam and an azimuthally-polarized output beam may be achieved.

In this way, the conversion of the polarization state may be achieved relatively freely by using the phase compensator 24a, the polarization rotator 24b, and the theta cell 24c. Further, as described with reference to FIGS. 27 through 29B, when the polarization direction is to be changed using a wave plate (phase plate), the wavelength of the laser beam of which the polarization direction is changed may differ depending on the thickness of the wave plate. However, as described with reference to FIG. 30, when the theta cell 24c is used, the polarization direction of an input beam of a relatively broad bandwidth may be changed. Accordingly, using the theta cell 24c may make it possible to change the polarization direction even when the bandwidth of the pre-pulse laser beam is broad.

11. Eighth Embodiment

Figure 31:
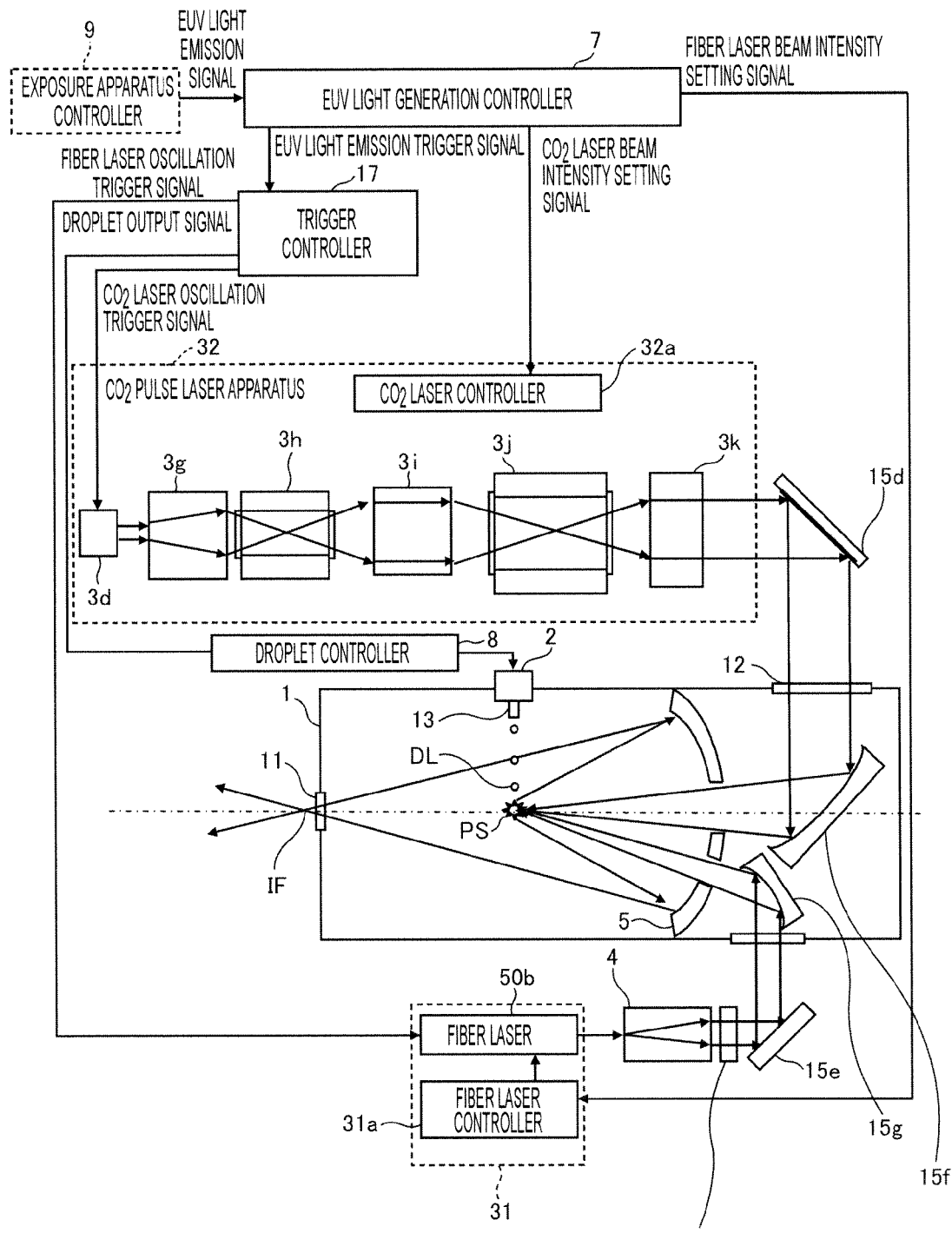
FIG. 31 schematically illustrates an exemplary configuration of an EUV light generation system according to an eighth embodiment.

FIG. 31 schematically illustrates the configuration of an EUV light generation system according to an eighth embodiment. In the EUV light generation system according to the eighth embodiment, the polarization state of a pre-pulse laser beam from the fiber laser apparatus 31 may be controlled by the polarization converter 20, and this pre-pulse laser beam may be guided into the chamber 1 along a beam path that is different from that of the main pulse laser beam.

12. Ninth Embodiment

Figures 32A, 32B, 32C:
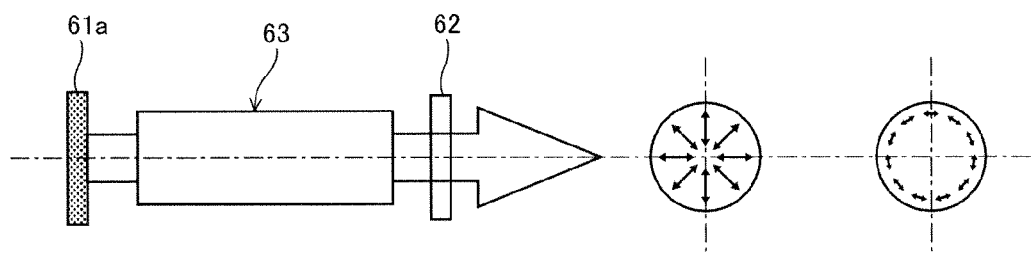
FIGS. 32A through 32C schematically illustrates an exemplary configuration of a laser apparatus configured to output a pre-pulse laser beam in an EUV light generation system according to a ninth embodiment.

FIGS. 32A through 32C schematically illustrates an exemplary configuration of a laser apparatus configured to output a pre-pulse laser beam in an EUV light generation system according to a ninth embodiment. A laser apparatus 60a of the ninth embodiment may be provided outside the chamber 1 (see, e.g., FIG. 1) as a driver laser for outputting a pre-pulse laser beam in any one of the first through fourth embodiments.

As shown in FIG. 32A, the laser apparatus 60a may include a laser resonator that includes a reflective polarization converter 61a and a front mirror 62. A laser medium 63 may be provided in the laser resonator. Stimulated emission light may be generated from the laser medium 63 with a pumping beam from a pumping source (not shown). The stimulated emission light may travel back and forth between the polarization converter 61a and the front mirror 62 and be amplified by the laser medium 63. Thereafter, an amplified laser beam may be outputted from the laser apparatus 60a.

The polarization converter 61a may be configured to reflect with high reflectance a laser beam of a predetermined polarization direction in accordance with the input position on the polarization converter 61a. In accordance with the reflective properties of the polarization converter 61a, a radially-polarized laser beam shown in FIG. 32B or an azimuthally-polarized laser beam shown in FIG. 32C may be amplified in the laser resonator. A part of the amplified laser beam may be transmitted through the front mirror 62 and outputted as the pre-pulse laser beam.

According to the ninth embodiment, a polarization converter may be used as a part of the resonator of the driver laser. With this, a polarization converter need not be provided in a beam path between the driver laser and the plasma generation region PS as in the seventh embodiment.

Figures 33A, 33B, 33C:
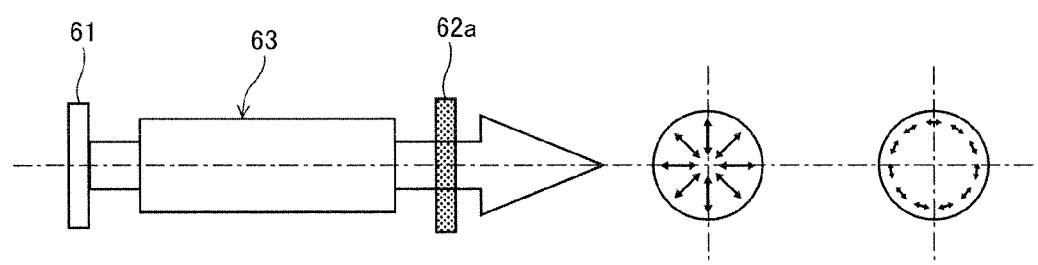
FIGS. 33A through 33C schematically illustrates an exemplary configuration of a laser apparatus configured to output a pre-pulse laser beam in an EUV light generation system according to a modification of the ninth embodiment.

FIGS. 33A through 33C schematically illustrates the exemplary configuration of a laser apparatus configured to output a pre-pulse laser beam in an EUV light generation system according to a modification of the ninth embodiment. A laser apparatus 60b of this modification may include a laser resonator that includes a rear mirror 61 and a reflective polarization converter 62a. In accordance with the reflective properties of the polarization converter 62a, a radially-polarized laser beam shown in FIG. 33B or an azimuthally-polarized laser beam shown in FIG. 33C may be amplified in the laser resonator. A part of the amplified laser beam may be transmitted through the polarization converter 62a and outputted as the pre-pulse laser beam.

Figure 34A:
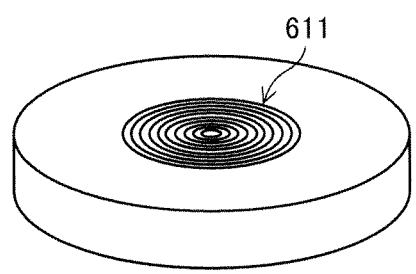
FIGS. 34A and 34B show an example of a polarization converter in the ninth embodiment.
Figure 34B:
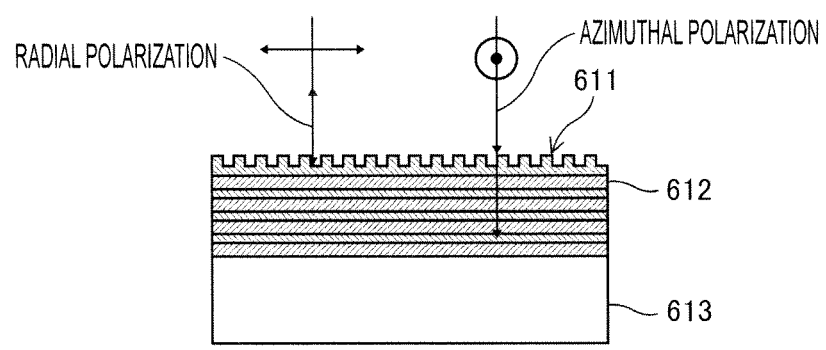

FIGS. 34A and 34B show an example of a polarization converter in the ninth embodiment. FIG. 34A is a perspective view of the polarizer, and FIG. 34B is an enlarged fragmentary sectional view of a diffraction grating portion of the polarization converter, taken along the radial direction plane.

As shown in FIG. 34A, the reflective polarization converter 61a may be a mirror on which a concentric circular diffraction grating 611 is formed. Further, as shown in FIG. 34B, in the polarization converter 61a, a multilayer film 612 may be formed on a glass substrate 613, and the diffraction grating 611 may be formed on the multilayer film 612.

When an azimuthally-polarized laser beam is incident on the polarization converter 61a configured as such (here, the polarization direction is substantially parallel to the direction of the grooves in the diffraction grating 611), the azimuthally-polarized laser beam may be transmitted through the diffraction grating 611 and propagated to the multilayer film 612. On the other hand, when a radially-polarized laser beam is incident on the polarization converter 61a configured as such (here, the polarization direction is substantially perpendicular to the direction of the grooves in the diffraction grating 611), the radially-polarized laser beam may not be transmitted through the diffraction grating 611 and may be reflected thereby. In the ninth embodiment (see FIGS. 32A through 32C), using the polarization converter 61a configured as such in the laser resonator may make it possible to output a radially-polarized laser beam.

Here, when the grooves in the diffraction grating 611 are formed radially, the polarization converter 61a may reflect an azimuthally-polarized laser beam with high reflectance. In this case, the azimuthally-polarized laser beam may be outputted. Further, forming the diffraction grating 611 on the polarization converter 62a of the modification (see FIGS. 33A through 33C) of the ninth embodiment may make it possible to output a radially-polarized laser beam or an azimuthally-polarized laser beam.

13. Control of Fluence

Figure 35:
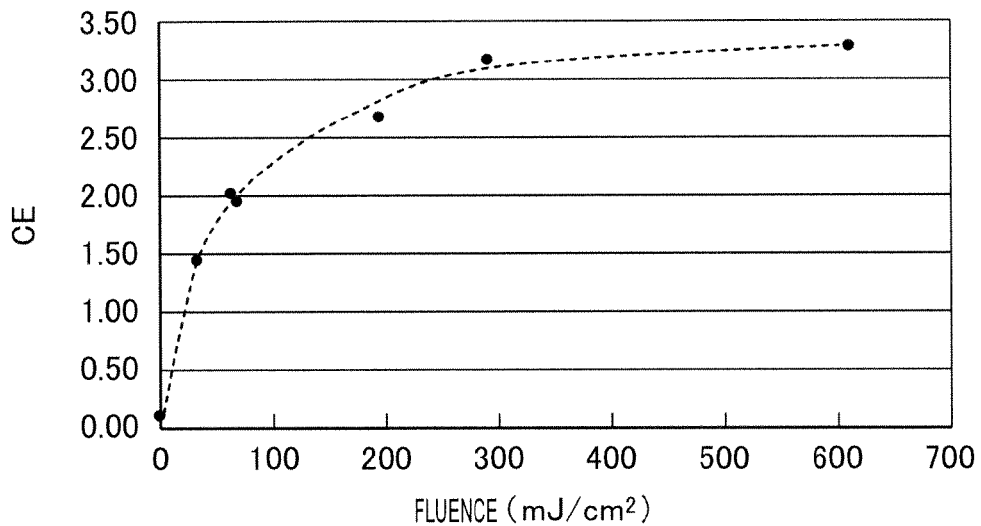
FIG. 35 is a graph on which the obtained conversion efficiency (CE) in accordance with a fluence of a pre-pulse laser beam is plotted.

FIG. 35 is a graph on which the obtained conversion efficiency (CE) in accordance with a fluence (energy per unit area of a beam cross-section at its focus) of a pre-pulse laser beam is plotted.

The measuring conditions are as follows. A molten tin droplet having a diameter of 20 μm is used as a target material. A laser beam with a pulse duration of 5 ns to 15 ns outputted from a YAG pulse laser apparatus is used as a pre-pulse laser beam. A laser beam with a pulse duration of 20 ns outputted from a $CO_2$ pulse laser apparatus is used as a main pulse laser beam. The beam intensity of the main pulse laser beam is $6.0 \times 10^9$ W/cm$^2$, and the delay time for the irradiation with the main pulse laser beam is 1.5 μs after the irradiation with the pre-pulse laser beam.

The horizontal axis of the graph shown in FIG. 35 shows a value in which the irradiation conditions of the pre-pulse laser beam (pulse duration, energy, spot size) are converted into a fluence. Further, the vertical axis shows the CE in the case where the diffused target generated in accordance with the irradiation conditions of the pre-pulse laser beam is irradiated with the above main pulse laser beam.

The measurement results shown in FIG. 35 reveal that increasing the fluence of the pre-pulse laser beam may improve the CE (approximately 3%). That is, at least in a range where the pulse duration of the pre-pulse laser beam is 5 ns to 15 ns, there is a correlation between the fluence and the CE.

Accordingly, in the above embodiments, the EUV light generation controller 7 may be configured to control the fluence, instead of the beam intensity, of the pre-pulse laser beam. The measurement results shown in FIG. 35 reveal that the fluence of the pre-pulse laser beam may be in the range of 10 mJ/cm$^2$ to 600 mJ/cm$^2$. In other embodiments, the range may be 30 mJ/cm$^2$ to 400 mJ/cm$^2$. In yet other embodiments, the range may be 150 mJ/cm$^2$ to 300 mJ/cm$^2$.

From the measurement results where the CE is improved when the fluence of the pre-pulse laser beam is controlled as above, it is speculated that a droplet is diffused in a disc-shape, a dish-shape, or a torus-shape under the above conditions. That is, it is speculated that when a droplet is diffused, the total surface area is increased, the energy of the main pulse laser beam is absorbed efficiently by the diffused target, and as a result, the CE is improved.

14. Control of Delay Time

Figure 36:
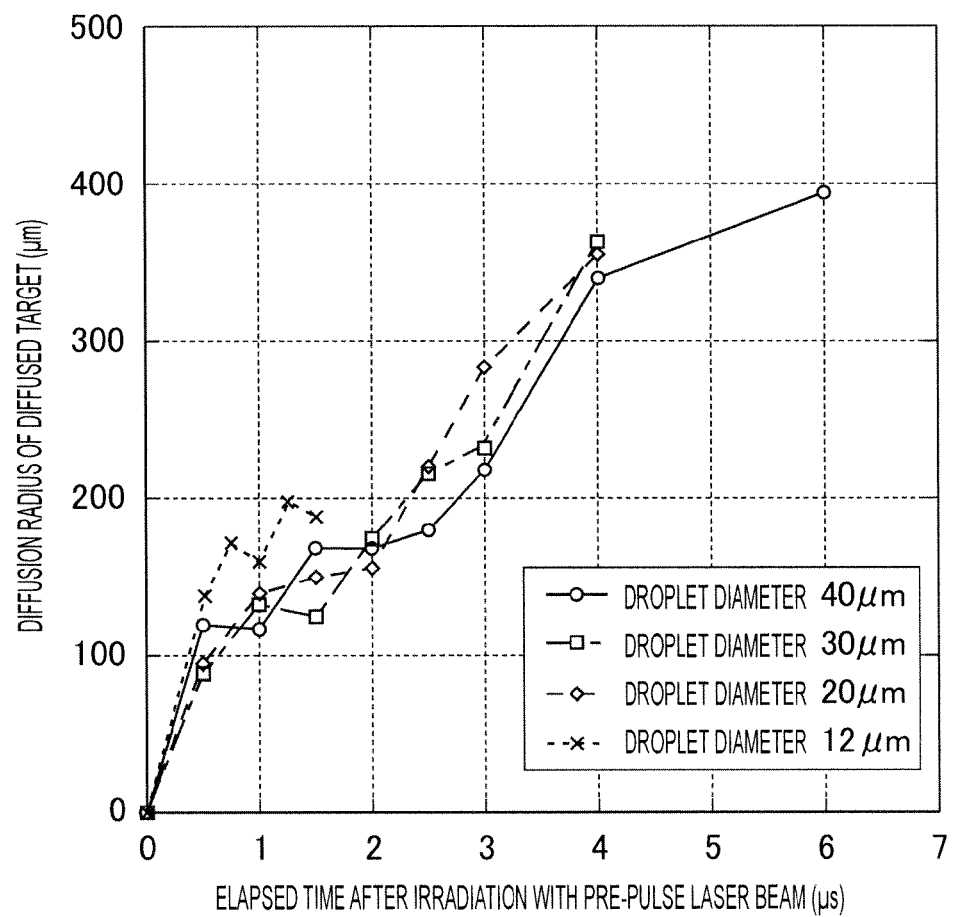
FIG. 36 is a graph showing the result of an experiment for generating a diffused target in an EUV light generation system.

FIG. 36 is a graph showing the result of an experiment for generating a diffused target in an EUV light generation system. In this experiment, the EUV light generation system of the eighth embodiment is used. The pre-pulse laser beam may be converted into a circularly-polarized laser beam by the polarization converter 20. The horizontal axis in FIG. 36 shows a time that has elapsed since a droplet is irradiated with a pre-pulse laser beam. The vertical axis shows a diffusion radius of a diffused target generated when the droplet is irradiated with the pre-pulse laser beam. The diffusion radius is a radius of a space where a particle of a predetermined diameter exists. Changes over time in the diffusion radius after the irradiation with the pre-pulse laser beam are plotted for the droplets respectively having diameters of 12 μm, 20 μm, 30 μm, and 40 μm. As seen from FIG. 36, the diffusion radius has low dependency on the droplet diameter. Further, the changes over time in the diffusion radius are relatively gradual in 0.3 μs to 3 μs after a droplet is irradiated with a pre-pulse laser beam. It is speculated that the variation in the diffusion radius for each droplet is small during this time period. Accordingly, if the diffused target is irradiated with a main pulse laser beam during this time period, the variation in generated EUV energy may be small between pulses.

Figure 37:
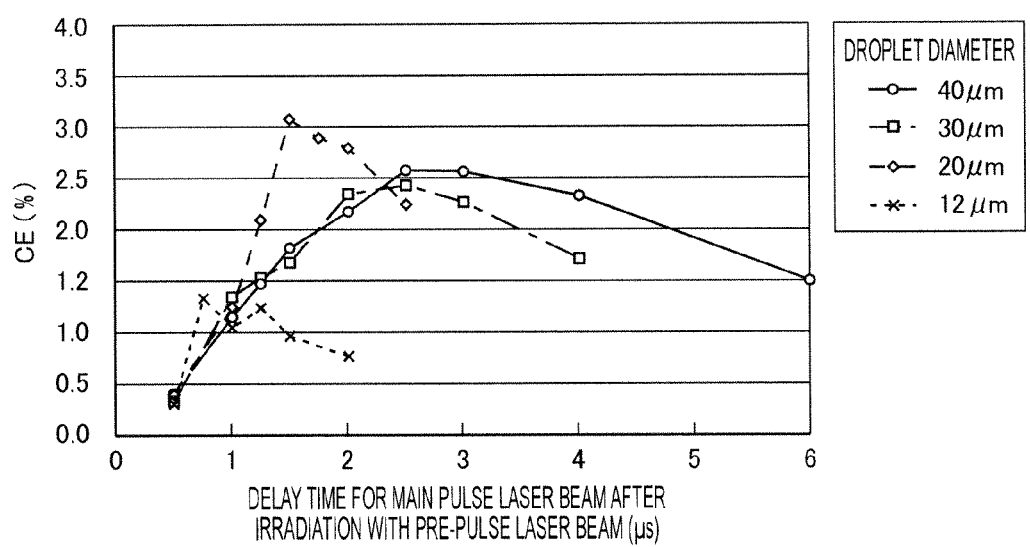
FIG. 37 is a graph on which the obtained conversion efficiency (CE) for the corresponding delay time since a droplet is irradiated with a pre-pulse laser beam until a diffused target is irradiated by a main pulse laser beam is plotted for differing diameters of the droplet.

FIG. 37 is a graph on which the obtained conversion efficiency (CE) for the corresponding delay time since a droplet is irradiated with a pre-pulse laser beam until a diffused target is irradiated by a main pulse laser beam is plotted for differing diameters of the droplet.

The measuring conditions are as follows. Molten tin droplets respectively having diameters of 12 μm, 20 μm, 30 μm, and 40 μm are used as the target material. A laser beam with a pulse duration of 5 ns outputted from a YAG pulse laser apparatus is used as a pre-pulse laser beam. The fluence of the pre-pulse laser beam is 490 mJ/cm$^2$. A laser beam with a pulse duration of 20 ns outputted from a $CO_2$ pulse laser apparatus is used as a main pulse laser beam. The beam intensity of the main pulse laser beam is $6.0 \times 10^9$ W/cm$^2$.

The measurement results shown in FIG. 37 reveal that the delay time for the irradiation with the main pulse laser beam may be in a range of 0.5 μs to 2.5 μs after the irradiation with the pre-pulse laser beam. However, it is found that the optimum range of the delay time for the irradiation with the main pulse laser beam to obtain a high CE differs depending on the diameter of the droplet.

When the diameter of the droplet is 12 μm, the delay time for the irradiation with the main pulse laser beam may be in a range of 0.5 μs to 2 μs after the irradiation with the pre-pulse laser beam. In other embodiments, the range may be 0.6 μs to 1.5 μs. In yet other embodiments, the range may be 0.7 μs to 1 μs.

When the diameter of the droplet is 20 μm, the delay time for the irradiation with the main pulse laser beam may be in a range of 0.5 μs to 2.5 μs after the irradiation with the pre-pulse laser beam. In other embodiments, the range may be 1 µs to 2 µs. In yet other embodiments, the range may be 1.3 µs to 1.7 µs.

When the diameter of the droplet is 30 µm, the delay time for the irradiation with the main pulse laser beam may be in a range of 0.5 µs to 4 µs after the irradiation with the pre-pulse laser beam. In other embodiments, the range may be 1.5 µs to 3.5 µs. In yet other embodiments, the range may be 2 µs to 3 µs.

When the diameter of the droplet is 40 µm, the delay time for the irradiation with the main pulse laser beam may be in a range of 0.5 µs to 6 µs after the irradiation with the pre-pulse laser beam. In other embodiments, the range may be 1.5 µs to 5 µs. In yet other embodiments, the range may be 2 µs to 4 µs.

15. Tenth Embodiment

15.1 Configuration

Figure 38:
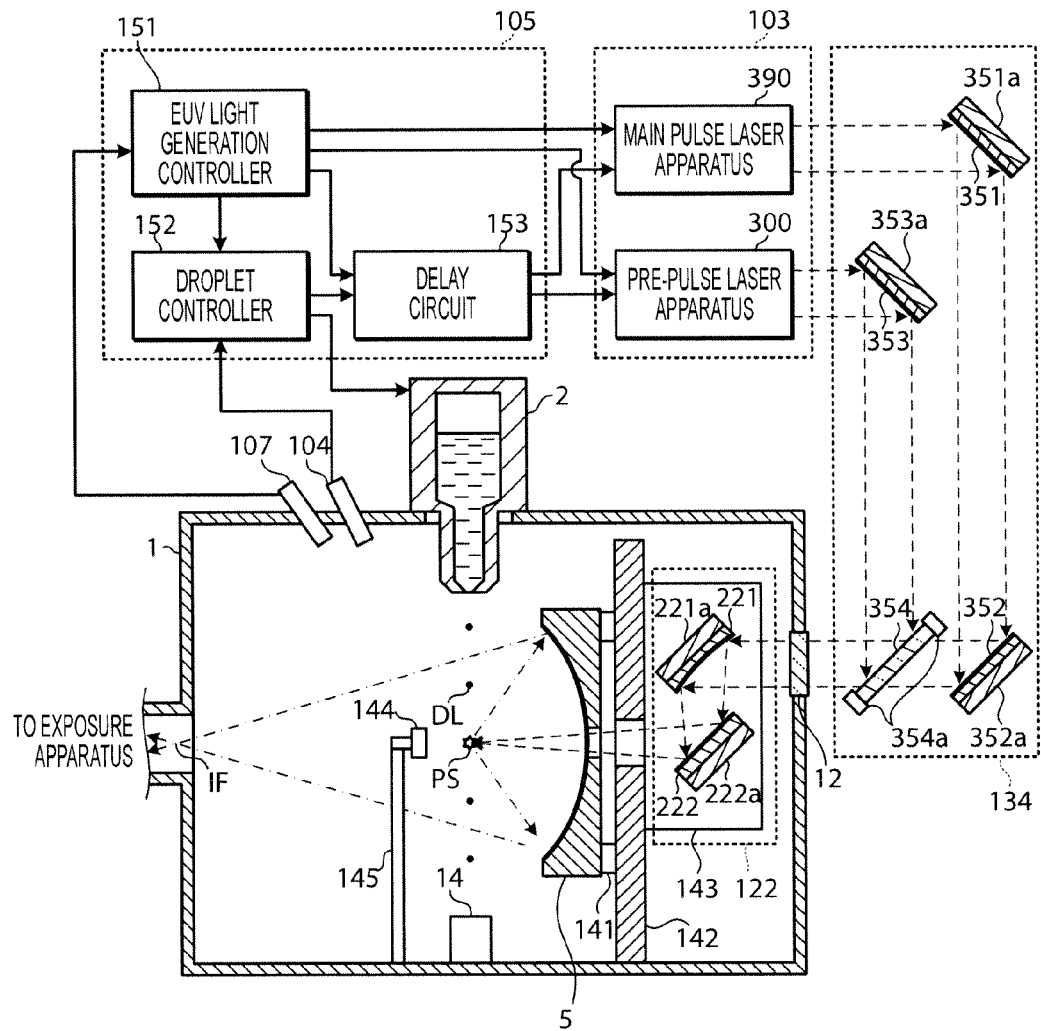
FIG. 38 is a partial sectional view schematically illustrating an exemplary configuration of an EUV light generation system according to a tenth embodiment.

FIG. 38 is a partial sectional view schematically illustrating an exemplary configuration of an EUV light generation system according to a tenth embodiment of this disclosure. As shown in FIG. 38, a laser beam focusing optical system 122, an EUV collector mirror 5, a target collector 14, an EUV collector mirror mount 141, plates 142 and 143, a beam dump 144, a beam dump support member 145 may be provided inside the chamber 1.

The plate 142 may be attached to the chamber 1, and the plate 143 may be attached to the plate 142. The EUV collector mirror 5 may be attached to the plate 142 through the EUV collector mirror mount 141.

The laser beam focusing optical system 122 may include an off-axis paraboloidal mirror 221, a flat mirror 222, and holders 221a and 222a for the respective mirrors 221 and 222. The off-axis paraboloidal mirror 221 and the flat mirror 222 may be positioned on the plate 143 through the respective mirror holders 221a and 222a such that a pulse laser beam reflected by these mirrors 221 and 222 is focused in the plasma generation region PS.

The beam dump 144 may be fixed in the chamber 1 through the beam dump support member 145 to be positioned on an extension of a beam path of a pulse laser beam. The target collector 14 may be provided on an extension of a trajectory of a droplet DL.

A target sensor 104, an EUV light sensor 107, a window 12, and a target supply unit 2 may be provided in the chamber 1. A laser apparatus 103, a laser beam travel direction control unit 134, and an EUV light control device 105 may be provided outside the chamber 1.

The target sensor 104 may include an imaging function and may detect at least one of the presence, the trajectory, the position, and the speed of a droplet DL. The EUV light sensor 107 may be configured to detect EUV light generated in the plasma generation region PS to detect an intensity of the EUV light, and output a detection signal to an EUV light generation controller 151. The target supply unit 2 may be configured to continuously output droplets at a predetermined interval, or configured to output a droplet on-demand at a timing in accordance with a trigger signal received from a droplet controller 152. The laser beam travel direction control unit 134 may include high-reflection mirrors 351, 352, and 353, a dichroic mirror 354, and holders 351a, 352a, 353a, and 354a for the respective mirrors 351, 352, 353, and 354.

The EUV light control device 105 may include the EUV light generation controller 151, the droplet controller 152, and a delay circuit 153. The EUV light generation controller 151 may be configured to output control signals respectively to the droplet controller 152, the delay circuit 153, and the laser apparatus 103.

The laser apparatus 103 may include a pre-pulse laser apparatus 300 configured to output a pre-pulse laser beam and a main pulse laser apparatus 390 configured to output a main pulse laser beam. The aforementioned dichroic mirror 354 may include a coating configured to reflect the pre-pulse laser beam with high reflectance and transmit the main pulse laser beam with high transmittance, and may serve as a beam combiner.

15.2 Operation

The droplet controller 152 may output a target supply start signal to the target supply unit 2 to cause the target supply unit 2 to start supplying the droplets DL toward the plasma generation region PS inside the chamber 1.

Upon receiving the target supply start signal from the droplet controller 152, the target supply unit 2 may start outputting the droplets DL toward the plasma generation region PS. The droplet controller 152 may receive a target detection signal from the target sensor 104 and output that detection signal to the delay circuit 153. The target sensor 104 may be configured to detect a timing at which a droplet DL passes through a predetermined position prior to reaching the plasma generation region PS. For example, the target sensor 104 may include a laser device (not shown) and an optical sensor. The laser device included in the target sensor 104 may be positioned such that a continuous wave (CW) laser beam from the laser device travels through the aforementioned predetermined position. The optical sensor included in the target sensor 104 may be positioned to detect a ray reflected by the droplet DL when the droplet DL passes through the aforementioned predetermined position. When the droplet DL passes through the aforementioned predetermined position, the optical sensor may detect the ray reflected by the droplet DL and output a target detection signal.

The delay circuit 153 may output a first timing signal to the pre-pulse laser apparatus 300 so that the droplet DL is irradiated with the pre-pulse laser beam at a timing at which the droplet DL reaches the plasma generation region PS. The first timing signal may be a signal in which a first delay time is given to a target detection signal. The delay circuit 153 may output a second timing signal to the main pulse laser apparatus 390 such that a diffused target is irradiated with the main pulse laser beam at a timing at which a droplet irradiated with the pre-pulse laser beam is diffused to a predetermined size to form the diffused target. Here, a time from the first timing signal to the second timing signal may be a second delay time.

The pre-pulse laser apparatus 300 may be configured to output the pre-pulse laser beam in accordance with the first timing signal from the delay circuit 153. The main pulse laser apparatus 390 may be configured to output the main pulse laser beam in accordance with the second timing signal from the delay circuit 153.

The pre-pulse laser beam from the pre-pulse laser apparatus 300 may be reflected by the high-reflection mirror 353 and the dichroic mirror 354, and enter the laser beam focusing optical system 122 through the window 12. The main pulse laser beam from the main pulse laser apparatus 390 may be reflected by the high-reflection mirrors 351 and 352, transmitted through the dichroic mirror 354, and enter the laser beam focusing optical system 122 through the window 12.

Each of the pre-pulse laser beam and the main pulse laser beam that have entered the laser beam focusing optical system 122 may be reflected sequentially by the off-axis paraboloidal mirror 221 and the flat mirror 222, and guided to the plasma generation region PS. The pre-pulse laser beam may strike the droplet DL, which may be diffused to form a diffused target. This diffused target may then be irradiated with the main pulse laser beam to thereby be turned into plasma.

Figure 39:
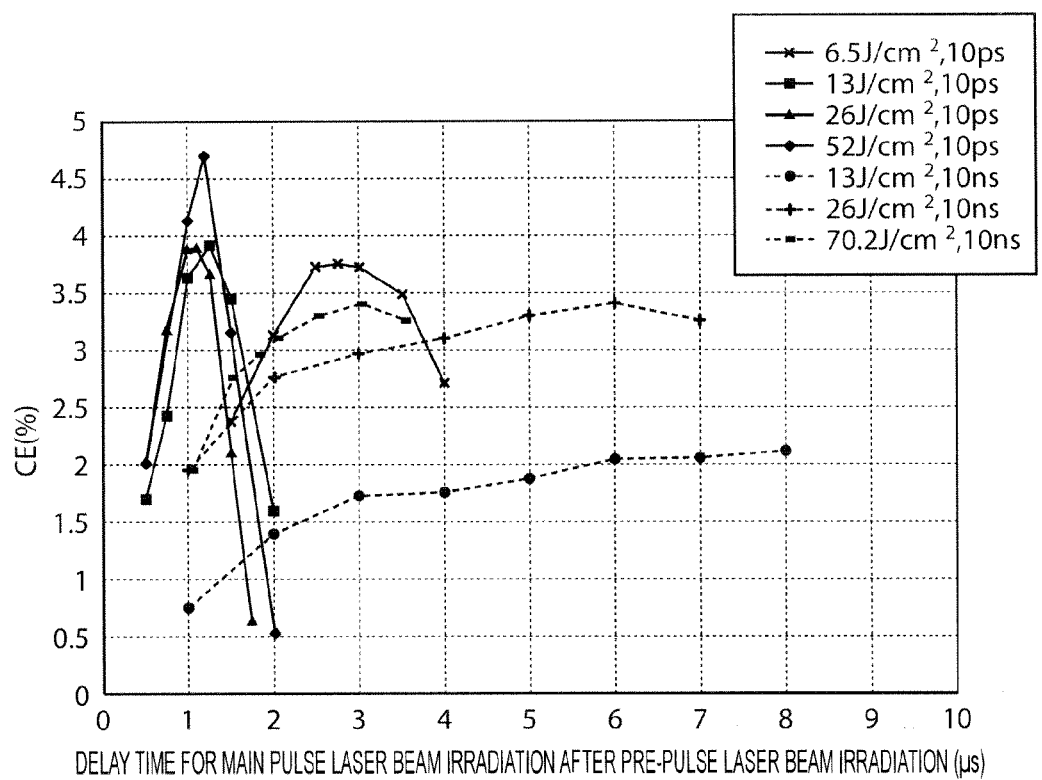
FIG. 39 is a graph showing an example of a relationship between an irradiation condition of a pre-pulse laser beam and a CE in an EUV light generation system.

15.3 Parameters of Pre-Pulse Laser Beam 15.3.1 Relationship Between Pulse Duration and CE FIG. 39 is a graph showing an example of a relationship between an irradiation condition of a pre-pulse laser beam and a conversion efficiency (CE) in an EUV light generation system. In FIG. 39, a delay time (a third delay time) (μs) for the main pulse laser beam from the pre-pulse laser beam is plotted along the horizontal axis, and a conversion efficiency (%) from an energy of the main pulse laser beam into an energy of the EUV light is plotted along the vertical axis. The third delay time may be a time from the irradiation of a droplet DL with a pre-pulse laser beam to the irradiation of a diffused target with a main pulse laser beam.

In the graph shown in FIG. 39, seven combination patterns of a pulse duration (the full width at half maximum) and a fluence (energy density) of a pre-pulse laser beam were set, and a measurement was carried out on each combination pattern. Obtained results are shown in a line graph. Here, a fluence may be a value in which an energy of a pulse laser beam is divided by an area of a portion having a beam intensity equal to or higher than $1/e^2$ at the spot.

Details on the measuring conditions are as follows. Tin (Sn) was used as the target material, and tin was molten to produce a droplet having a diameter of 21 μm.

As for the pre-pulse laser apparatus 300, an Nd:YAG laser apparatus was used to generate a pre-pulse laser beam having a pulse duration of 10 ns and a pulse energy of 0.5 mJ to 2.7 mJ. The wavelength of this pre-pulse laser beam was 1.06 μm. When a pre-pulse laser beam having a pulse duration of 10 μs was to be generated, a mode-locked laser device including an Nd:YVO$_4$ crystal was used as a master oscillator, and a regenerative amplifier including an Nd:YAG crystal was used. The wavelength of this pre-pulse laser beam was 1.06 μm, and the pulse energy thereof was 0.25 mJ to 2 mJ. The spot size of each of the pre-pulse laser beams was 70 μm.

A CO$_2$ laser apparatus was used as the main pulse laser apparatus to generate a main pulse laser beam. The wavelength of the main pulse laser beam was 10.6 μm, and the pulse energy thereof was 135 mJ to 170 mJ. The pulse duration of the main pulse laser beam was 15 ns, and the spot size thereof was 300 μm.

The results are as follows. As shown in FIG. 39, when the pulse duration of the pre-pulse laser beam was 10 ns, a CE never reached 3.5% at the maximum. Further, the CE in this case reached the maximum in each combination pattern when the third delay time is equal to or greater than 3 μs.

On the other hand, as for a CE when the pulse duration of the pre-pulse laser beam was 10 μs, the maximum value in each combination pattern exceeded 3.5%. These maximum values were obtained when the third delay time was smaller than 3 μs. In particular, the CE of 4.7% was achieved when the pulse duration of the pre-pulse laser beam was 10 μs, the fluence was 52 J/cm$^2$, and the third delay time was 1.2 μs.

The above-described results reveal that a higher CE may be achieved when the pulse duration of the pre-pulse laser beam is in the picosecond range (e.g., 10 μs) compared to the case where the pulse duration thereof is in the nanosecond range (e.g., 10 ns). Further, an optimal third delay time for obtaining the highest CE was smaller when the pulse duration of the pre-pulse laser beam was in the picosecond range compared to the case where the pulse duration thereof was in the nanosecond range. Accordingly, the EUV light may be generated at a higher repetition rate when the pulse duration of the pre-pulse laser beam is in the picosecond range compared to the case where the pulse duration thereof is in the nanosecond range.

Further, based on the results shown in FIG. 39, when the pulse duration of the pre-pulse laser beam is in the picosecond range and the fluence is 13 J/cm$^2$ to 52 J/cm$^2$, the third delay time may be set in a range between 0.5 us and 1.8 us inclusive. In other embodiments, the third delay time may be in a range of between 0.7 us and 1.6 μs inclusive, and in yet other embodiments, the range may be between 1.0 μs and 1.4 μs inclusive.

Figure 40A:
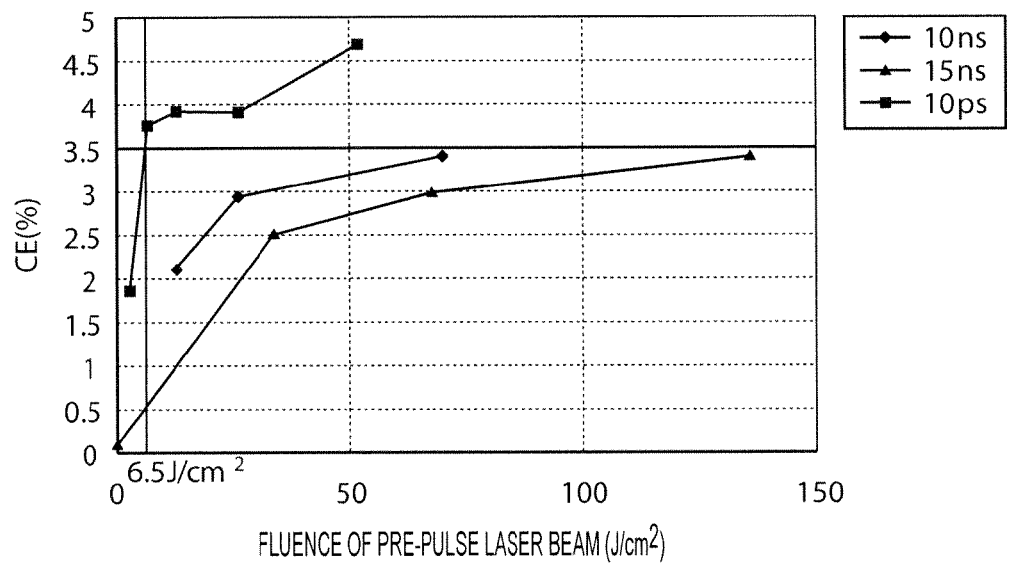
FIG. 40A is a graph showing an example of a relationship between a fluence of a pre-pulse laser beam and a CE in an EUV light generation system.

15.3.2 Relationship Between Pulse Duration and Fluence, and Relationship Between Pulse Duration and Beam Intensity FIG. 40A is a graph showing an example of a relationship between a fluence of a pre-pulse laser beam and a CE in an EUV light generation system. In FIG. 40A, a fluence (J/cm$^2$) of a pre-pulse laser beam is plotted along the horizontal axis, and a CE (%) is plotted along the vertical axis. In each of the cases where a pulse duration of the pre-pulse laser beam was set to 10 ps, 10 ns, and 15 ns, a CE was measured for various third delay times, and the CE at the optimal third delay time was plotted. Here, the results shown in FIG. 39 were used to fill a part of the data where the pulse duration was 10 ps or 10 ns. Further, in order to generate a pre-pulse laser beam having a pulse duration of 15 ns, a pre-pulse laser apparatus configured similarly to the one used to generate a pre-pulse laser beam having a pulse duration of 10 ns was used.

In all of the cases where the pulse duration of the pre-pulse laser beam was 10 ps, 10 ns, and 15 ns, the CE increased with the increase in the fluence of the pre-pulse laser beam, and the CE saturated when the fluence exceeded a predetermined value. Further, the higher CE was obtained when the pulse duration was 10 ps, compared to the case where the pulse duration was 10 ns or 15 ns, and the fluence required to obtain that CE was smaller when the pulse duration was 10 ps. When the pulse duration was 10 ps, if the fluence was increased from 2.6 J/cm$^2$ to 6.5 J/cm$^2$, the CE improved greatly, and if the fluence exceeded 6.5 J/cm$^2$, the rate of increase in the CE with respect to the increase in the fluence was small.

Figure 40B:
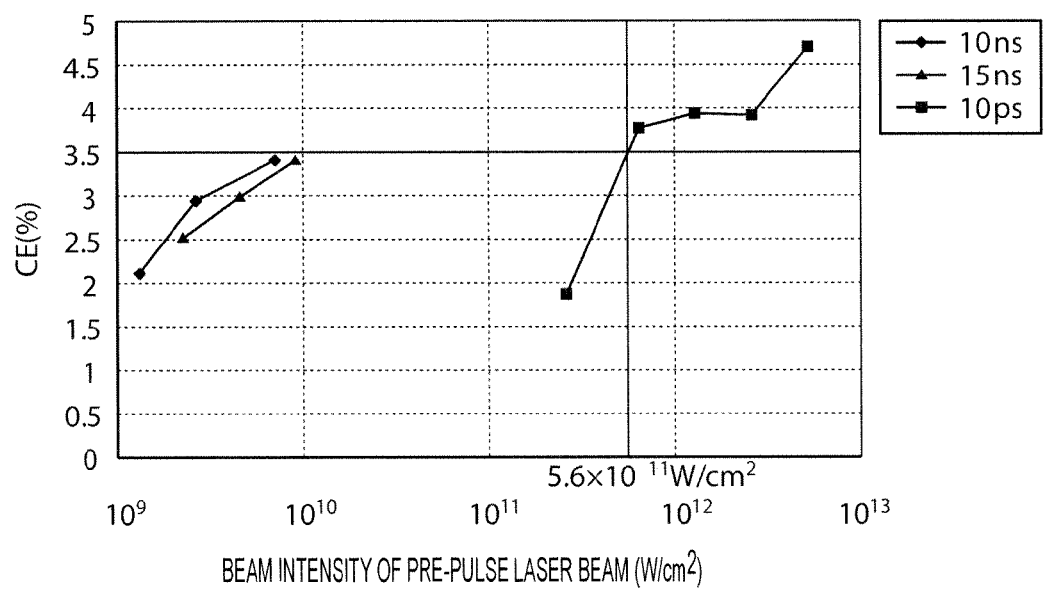
FIG. 40B is a graph showing an example of a relationship between a beam intensity of a pre-pulse laser beam and a CE in an EUV light generation system.

FIG. 40B is a graph showing an example of a relationship between a beam intensity of a pre-pulse laser beam and a CE in an EUV light generation system. In FIG. 40B, the beam intensity (W/cm$^2$) of the pre-pulse laser beam is plotted along the horizontal axis, and the CE (%) is plotted along the vertical axis. The beam intensity was calculated from the results shown in FIG. 40A. Here, the beam intensity is a value in which the fluence of the pre-pulse laser beam is divided by the pulse duration (the full width at half maximum).

In all of the cases where the pulse duration of the pre-pulse laser beam was 10 ps, 10 ns, and 15 ns, the CE increased with the increase in the beam intensity of the pre-pulse laser beam. Further, a higher CE was obtained when the pulse duration was 10 ps, compared to the case where the pulse duration was 10 ns or 15 ns. When the pulse duration was 10 ps, the CE greatly improved if the beam intensity was increased from $2.6 \times 10^{11}$ W/cm$^2$ to $5.6 \times 10^{11}$ W/cm$^2$, and an even higher CE was obtained when the beam intensity exceeded $5.6 \times 10^{11}$ W/cm$^2$.

As described above, when a droplet is irradiated with a pre-pulse laser beam having a pulse duration in the picosecond range to form a diffused target and the diffused target is irradiated with a main pulse laser beam, a higher CE may be obtained.

15.3.3 Relationship Between Pulse Duration and State of Diffused Target

Figure 41A:
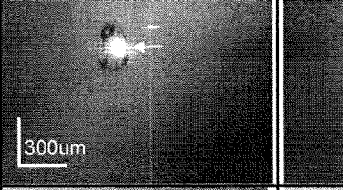
FIG. 41A shows photographs of a diffused target generated when a droplet is irradiated with a pre-pulse laser beam in an EUV light generation system.
Figure 41B:
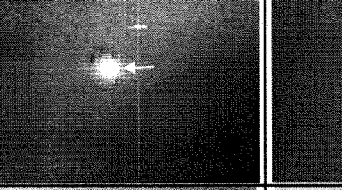
FIG. 41B shows photographs of a diffused target generated when a droplet is irradiated with a pre-pulse laser beam in an EUV light generation system.

FIGS. 41A and 41B show photographs of a diffused target generated when a droplet is irradiated with a pre-pulse laser beam in an EUV light generation system. Each of the photographs shown in FIG. 41A was captured with the optimal third delay time in cases where the pulse duration of the pre-pulse laser beam was set to 10 ps with three differing fluences. That is, as in the description given with reference to FIG. 39, FIG. 41A shows a diffused target at the third delay times of 1.2 µs (fluence of 52 J/cm$^2$), 1.1 µs (fluence of 26 J/cm$^2$), and 1.3 µs (fluence of 13 J/cm$^2$). Each of the photographs shown in FIG. 41B was captured with the optimal third delay time in cases where the pulse duration of the pre-pulse laser beam was set to 10 ns with two differing fluences. That is, FIG. 41B shows a diffused target at the third delay times of 3 µs (fluence of 70 J/cm$^2$) and 5 µs (fluence of 26 J/cm$^2$). In both FIGS. 41A and 41B, the diffused target was captured at an angle of 60 degrees and 90 degrees with respect to the beam path of the pre-pulse laser beam. The arrangement of the capturing equipment will be described later.

A diameter De of the diffused target was 360 µm to 384 µm when the pulse duration of the pre-pulse laser beam was 10 ps, and the diameter De was 325 µm to 380 µm when the pulse duration of the pre-pulse laser beam was 10 ns. That is, the diameter De of the diffused target was somewhat larger than 300 µm, which was the spot size of the main pulse laser beam. However, the spot size of the main pulse laser beam here is shown as a 1/e$^2$ width (a width of a portion having a beam intensity equal to or higher than 1/e$^2$ of the peak intensity). Thus, even when the diameter De of the diffused target is 400 µm, the diffused target may be irradiated with the main pulse laser beam sufficiently.

Further, the diameter De of the diffused target reached 300 µm in a shorter period of time when the pulse duration of the pre-pulse laser beam was 10 ps, compared to the case where the pulse duration was 10 ns. That is, the diffusion speed of the diffused target was found to be faster when the pulse duration was 10 ps, compared to the case where the pulse duration was 10 ns.

Figure 42:
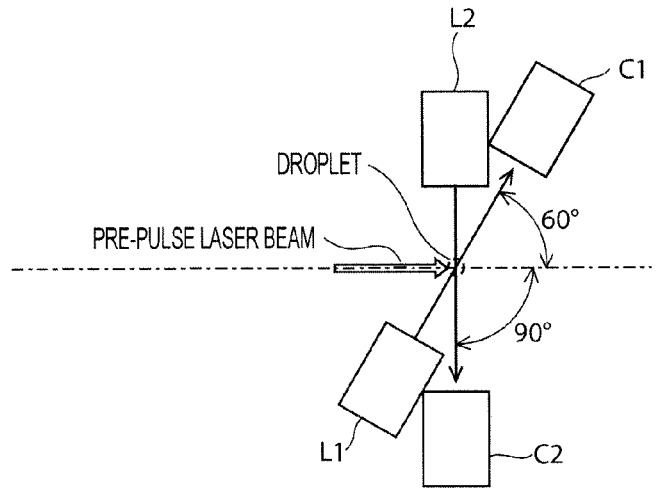
FIG. 42 schematically illustrates an arrangement of equipment used to capture the photographs shown in FIGS. 41A and 41B.

FIG. 42 schematically illustrates an arrangement of equipment used to capture the photographs shown in FIGS. 41A and 41B. As shown in FIG. 42, cameras C1 and C2 are respectively arranged at 60 degrees and 90 degrees to the beam path of the pre-pulse laser beam, and flash lamps L1 and L2 are respectively arranged to oppose the cameras C1 and C2 with a point where a droplet is irradiated located therebetween.

Figure 43A:
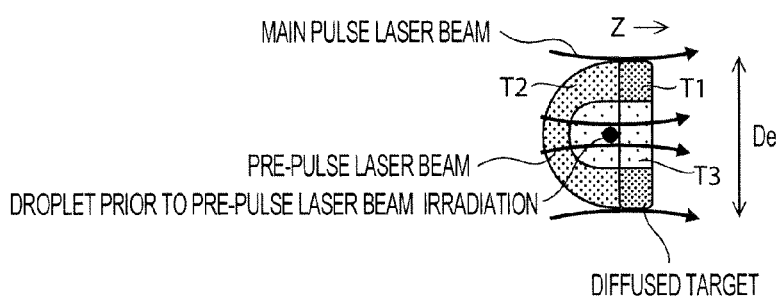
FIG. 43A is a sectional view schematically illustrating the diffused target shown in FIG. 41A.
Figure 43B:
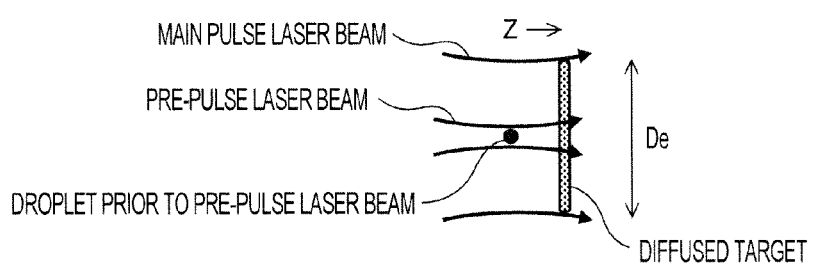
FIG. 43B is a sectional view schematically illustrating the diffused target shown in FIG. 41B.

FIGS. 43A and 43B are sectional views schematically illustrating the diffused targets shown respectively in FIGS. 41A and 41B. As shown in FIGS. 41A and 43A, when the pulse duration of the pre-pulse laser beam was 10 ps, the droplet diffused annularly in the direction in which the pre-pulse laser beam travels, and diffused in a dome shape in the opposite direction. More specifically, the diffused target included a first portion T1 where the target material diffused in an annular shape, a second portion T2 which is adjacent to the first portion T1 and in which the target material diffused in a dome shape, and a third portion T3 surrounded by the first portion T1 and the second portion T2. The density of the target material was higher in the first portion T1 than in the second portion T2, and the density of the target material was higher in the second portion T2 than in the third portion T3.

On the other hand, as shown in FIGS. 41B and 43B, when the pulse duration of the pre-pulse laser beam was 10 ns, the droplet diffused in a disc shape or in an annular shape. In this case, the droplet diffused toward the direction in which the pre-pulse laser beam travels.

When the pulse duration of the pre-pulse laser beam is in the nanosecond range, laser ablation from the droplet may occur over a time period in the nanosecond range. During that time period, heat may be conducted into the droplet, a part of the droplet may be vaporized, or the droplet may move due to the reaction of the laser ablation. On the other hand, when the pulse duration of the pre-pulse laser beam is in the picosecond range, the droplet may be broken up instantaneously before the heat is conducted into the droplet. Such a difference in the diffusion process of the droplet may be a cause for the higher CE with a pre-pulse laser beam having a small fluence when the pulse duration thereof is in the picosecond range, compared to the case where the pulse duration thereof is in the nanosecond range (see FIG. 40A).

Further, the particle size of the fine particles of the target material included in the diffused target was smaller when the pulse duration of the pre-pulse laser beam was in the picosecond range, compared to the case where the pulse duration was in the nanosecond range. Accordingly, the diffused target may be turned into plasma more efficiently when the diffused target is irradiated with the main pulse laser beam in a case where the pulse duration of the pre-pulse laser beam is in the picosecond range. This may be a cause for the higher CE when the pulse duration is in the picosecond range, compared to the case where the pulse duration is in the nanosecond range.

15.3.4 Generation Process of Diffused Target

Figure 44A:
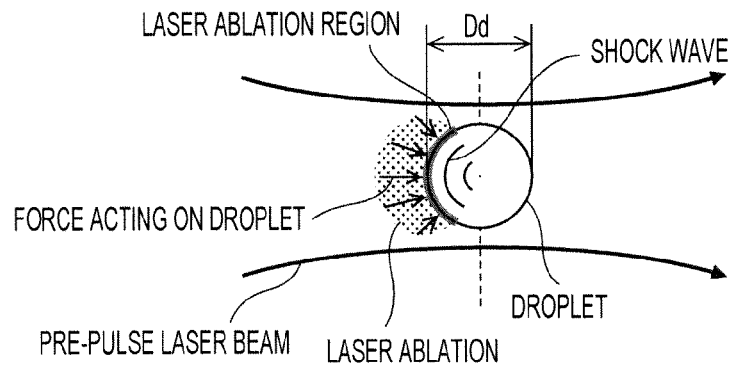
FIG. 44A is a sectional view schematically illustrating a process through which a diffused target is generated when a droplet is irradiated with a pre-pulse laser beam having a pulse duration in the picosecond range.
Figure 44B:
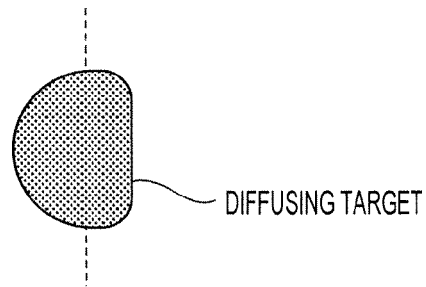
FIG. 44B is another sectional view schematically illustrating the process through which the diffused target is generated when a droplet is irradiated with a pre-pulse laser beam having a pulse duration in the picosecond range.
Figure 44C:
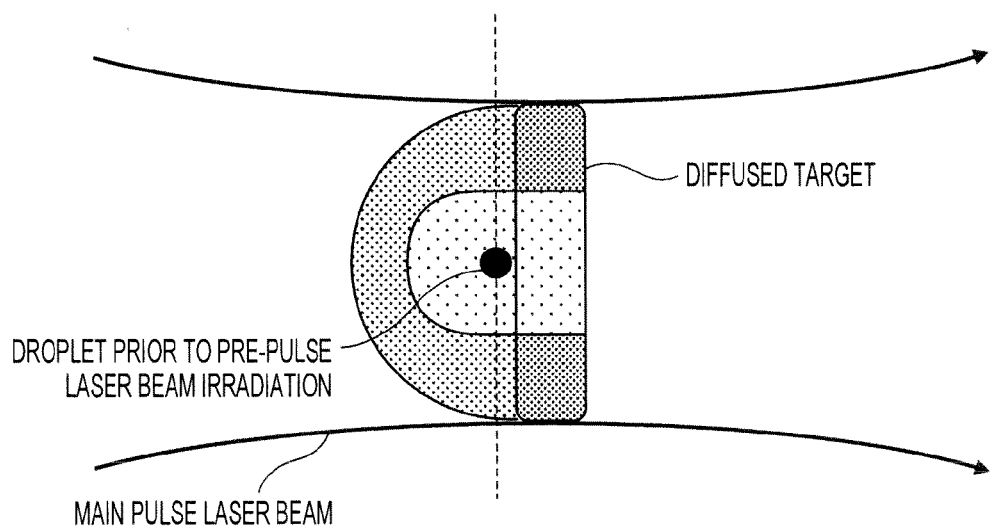
FIG. 44C is yet another sectional view schematically illustrating the process through which the diffused target is generated when a droplet is irradiated with a pre-pulse laser beam having a pulse duration in the picosecond range.

FIGS. 44A through 44C are sectional views schematically illustrating a process through which a diffused target is generated when a droplet is irradiated with a pre-pulse laser beam having a pulse duration in the picosecond range. FIG. 44A shows a presumed state of the target material after a time in the picosecond range has passed since the droplet starts to be irradiated with the pre-pulse laser beam having a pulse duration in the picosecond range. FIG. 44B shows a presumed state of the target material after a time in the nanosecond range has passed since the droplet starts to be irradiated with the pre-pulse laser beam having a pulse duration in the picosecond range. FIG. 44C shows a state of a diffused target after approximately 1 µs has passed since the droplet starts to be irradiated with the pre-pulse laser beam having a pulse duration in the picosecond range (see FIG. 43A).

As shown in FIG. 44A, when the droplet is irradiated with the pre-pulse laser beam, a part of the energy of the pre-pulse laser beam may be absorbed into the droplet. As a result, laser ablation, a jet of ions or atoms of the target material, may occur substantially normal to the surface of the droplet irradiated with the pre-pulse laser beam toward the outside of the droplet. Then, the reaction of the laser ablation may act normal onto the surface of the droplet irradiated with the pre-pulse laser beam.

This pre-pulse laser beam may have a fluence equal to or higher than 6.5 J/cm$^2$, and the irradiation may be completed within the picosecond range. Thus, the energy of the pre-pulse laser beam which the droplet receives per unit time may be relatively large (see FIG. 40B). Accordingly, a large amount of laser ablation may occur in a short period of time. Thus, the reaction of the laser ablation may be large, and a shock wave may occur into the droplet.

The shock wave may travel substantially normal to the surface of the droplet irradiated with the pre-pulse laser beam, and thus the shock wave may converge at substantially the center of the droplet. The curvature of the wavefront of the shock wave may be substantially the same as that of the surface of the droplet. As the shock wave converges, the energy may be concentrated, and when the concentrated energy exceeds a predetermined level, the droplet may begin to break up.

It is speculated that the break-up of the droplet starts from a substantially semi-spherical wavefront of the shock wave whose energy has exceeded the aforementioned predetermined level as the shock wave converges. This may be a reason why the droplet has diffused in a dome shape in a direction opposite to the direction in which the pre-pulse laser beam has struck the droplet.

When the shock wave converges at the center of the droplet (see FIG. 40A), the energy may be at highest concentration, and the remaining part of the droplet may be broken up at once. This may be a reason why the droplet has diffused in an annular shape in the direction in which the pre-pulse laser beam has struck the droplet, as shown in FIG. 44C.

Although it is speculated that a large amount of laser ablation occurs in the state shown in FIG. 44A, the time in which the laser ablation occurs is short, and the time it takes for the shock wave to reach the center of the droplet may also be short. Then, as shown in FIG. 44B, it is speculated that the droplet has already started to break up after a time in the nanosecond range has elapsed. This may be a reason why the centroid of the diffused target does not differ much from the position of the center of the droplet prior to being irradiated with the pre-pulse laser beam.

Figure 45A:
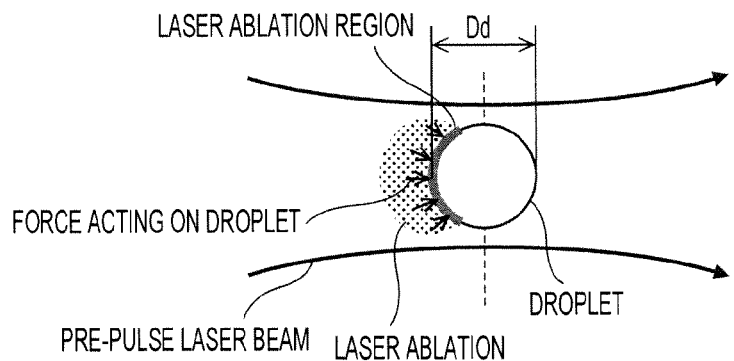
FIG. 45A is a sectional view schematically illustrating a process through which a diffused target is generated when a droplet is irradiated with a pre-pulse laser beam having a pulse duration in the nanosecond range.
Figure 45B:
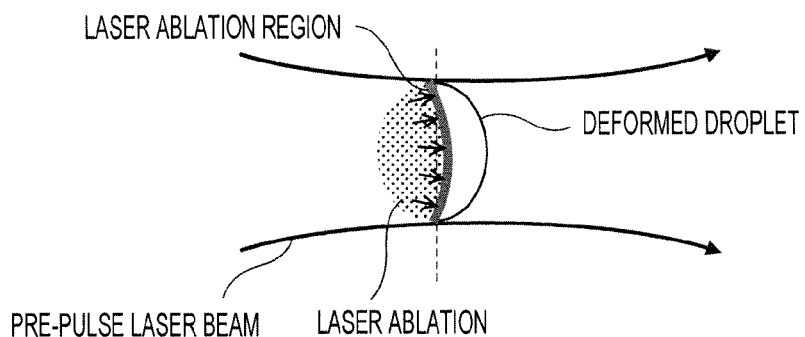
FIG. 45B is another sectional view schematically illustrating the process through which the diffused target is generated when a droplet is irradiated with a pre-pulse laser beam having a pulse duration in the nanosecond range.
Figure 45C:
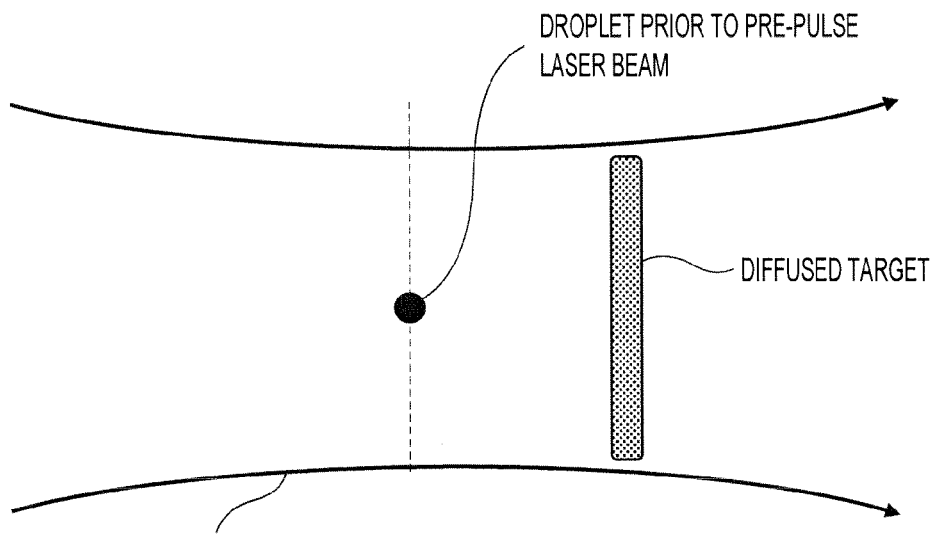
FIG. 45C is yet another sectional view schematically illustrating the process through which the diffused target is generated when a droplet is irradiated with a pre-pulse laser beam having a pulse duration in the nanosecond range.

FIGS. 45A through 45C are sectional views schematically illustrating a process through which a diffused target is generated when a droplet is irradiated with a pre-pulse laser beam having a pulse duration in the nanosecond range. FIG. 45A shows a presumed state of the target material after a time in the picosecond range has passed since the droplet starts to be irradiated with the pre-pulse laser beam having a pulse duration in the nanosecond range. FIG. 45B shows a presumed state of the target material after a time in the nanosecond range has passed since the droplet starts to be irradiated with the pre-pulse laser beam having a pulse duration in the nanosecond range. FIG. 45C shows a state of a diffused target after a few μs has passed since the droplet starts to be irradiated with the pre-pulse laser beam having a pulse duration in the nanosecond range (see FIG. 43B).

As shown in FIG. 45A, when the droplet is irradiated with the pre-pulse laser beam, a part of the energy of the pre-pulse laser beam may be absorbed into the droplet. As a result, laser ablation may occur substantially normal to the surface of the droplet irradiated with the pre-pulse laser beam. Then, the reaction of the laser ablation may act substantially normal onto the surface of the droplet irradiated with the pre-pulse laser beam.

This pre-pulse laser beam has a pulse duration in the nanosecond range. This pre-pulse laser beam may have a fluence similar to that of the above-described pre-pulse laser beam having a pulse duration in the picosecond range. However, since the droplet is irradiated with the pre-pulse laser beam having a pulse duration in the nanosecond range over a time period in the nanosecond range, the energy of the pre-pulse laser beam which the droplet receives per unit time is smaller (see FIG. 40B).

A sonic speed V through liquid tin forming the droplet is approximately 2500 m/s. When the diameter Dd of the droplet is 21 μm, a time Ts in which the sonic wave travels from the surface of the droplet irradiated with the pre-pulse laser beam to the center of the droplet may be calculated as follows.

$$Ts = (Dd/2)/V$$
$$= (21 \times 10^{-6}/2)/2500$$
$$= 4.2 \text{ ns}$$

In the above-described measurement (see FIGS. 39 through 42), the fluence of the pre-pulse laser beam is not set to be high enough to vaporize the entire droplet as ions or atoms by the laser ablation. Accordingly, when the droplet is irradiated with the pre-pulse laser beam having a pulse duration of 10 ns, the thickness of the droplet in the direction in which the pre-pulse laser beam travels may not be reduced more than 21 μm within 10 ns. That is, the speed at which the thickness of the droplet decreases by being pressurized by the reaction of the laser ablation may not exceed the sonic speed in liquid tin. Accordingly, the shock wave may not likely to occur inside the droplet.

The droplet irradiated with such a pre-pulse laser beam having a pulse duration in the nanosecond range may deform into a flat or substantially disc shape due to the reaction of the laser ablation acting on the droplet over a time period in the nanosecond range, as shown in FIG. 45B. Then, when the force causing the droplet to deform due to the reaction of the laser ablation overcomes the surface tension, the droplet may break up. This may be a reason why the droplet has diffused in a disc shape or in an annular shape as shown in FIG. 45C.

Further, as stated above, the reaction of the laser ablation may act on the droplet for a time period in the nanosecond range in the above-described case. Thus, this droplet may be accelerated by the reaction of the laser ablation for an approximately 1000 times longer period of time than in a case where the droplet is irradiated with the pre-pulse laser beam having a pulse duration in the picosecond range. This may be a reason why the centroid of the diffused target is shifted from the center of the droplet in the direction in which the pre-pulse laser beam travels, as shown in FIG. 45C.

15.3.5 Range of Pulse Duration

As stated above, when the droplet is irradiated with the pre-pulse laser beam having a pulse duration in the picosecond range, a shock wave may occur inside the droplet and the droplet may break up from the vicinity of the center thereof. On the other hand, when the droplet is irradiated with the pre-pulse laser beam having a pulse duration in the nanosecond range, a shock wave may not occur and the droplet may break up from the surface thereof.

Based on the above, the conditions for causing a shock wave to occur by the pre-pulse laser beam and breaking up the droplet may be as follows. Here, the diameter Dd of the droplet may be 10 μm to 40 μm.

When the diameter Dd of the droplet is 40 μm, a time Ts required for the sonic wave to reach the center of the droplet from the surface thereof is calculated as follows.

$$Ts = (Dd/2)/V$$
$$= (40 \times 10^{-6}/2)/2500$$
$$= 8 \text{ ns}$$

A pulse duration Tp of the pre-pulse laser beam may be sufficiently shorter than the time Ts required for the sonic wave to reach the center of the droplet from the surface thereof. Irradiating the droplet with the pre-pulse laser beam having a certain level of fluence within such a short period of time may cause a shock wave to occur, and the droplet may break up into fine particles.

A coefficient K will now be defined. The coefficient K may be set to determine a pulse duration Tp which is sufficiently smaller than the time Ts required for the sonic wave to reach the center of the droplet from the surface thereof. As in Expression (8) below, a value smaller than a product of the time Ts and the coefficient K may be the pulse duration Tp of the pre-pulse laser beam.

$$Tp < K \cdot Ts \qquad (8)$$

The coefficient K may, for example, be set as K≤⅛. In other embodiments, the coefficient K may be set as K≤1/16. In yet other embodiments, the coefficient K may be set as K≤1/160.

When the diameter Dd of the droplet is 40 μm, a value for the pulse duration Tp of the pre-pulse laser beam may be induced from Expression (8) above as follows.

When K≤⅛, Tp≤1 ns

In other embodiments, when K≤1/16, Tp≤500 ps

In yet other embodiments, when K≤1/160, Tp≤50 ps 15.3.6 Range of Fluence

Referring back to FIG. 40A, when a fluence of the pre-pulse laser beam having a pulse duration in the picosecond range is set to be equal to or higher than 6.5 J/cm², the CE of 3.5% or higher is obtained when the diffused target is irradiated with the main pulse laser beam in the optimal third delay time. When the fluence is set to be equal to or higher than 30 J/cm², the CE of 4% or higher is obtained. Further, when the fluence is set to be equal to or higher than 45 J/cm², the CE of 4.5% or higher is obtained. Accordingly, the fluence of the pre-pulse laser beam having the pulse duration in the picosecond range may be set to be equal to or higher than 6.5 J/cm². In other embodiments, the fluence may be set to 30 J/cm², and in yet other embodiments, the fluence may be set to 45 J/cm².

An energy Ed absorbed by the droplet when the droplet is irradiated with the pre-pulse laser beam having a pulse duration in the picosecond range may be approximated from the following expression.

$$Ed \approx F \cdot A \cdot \pi \cdot (Dd/2)^2$$

Here, F is the fluence of the pre-pulse laser beam, and A is an absorptance of the pre-pulse laser beam by the droplet. When the target material is liquid tin, and the wavelength of the pre-pulse laser beam is 1.06 μm, A is approximately 16%. Dd is the diameter of the droplet.

Mass m of the droplet may be obtained from the following expression.

$$m = \rho \cdot (4\pi/3) \cdot (Dd/2)^3$$

Here, ρ is the density of the droplet. When the target material is liquid tin, ρ is approximately 6.94 g/cm³.

Then, an energy Edp of the pre-pulse laser beam absorbed by the droplet per unit mass may be obtained from Expression (9) below.

$$Edp = Ed/m \quad (9)$$

$$\approx (3/2) \cdot F \cdot A / (\rho \cdot Dd)$$

Accordingly, when the target material is liquid tin and the CE of 3.5% is obtained (i.e., the fluence F of the pre-pulse laser beam is 6.5 J/cm²), the energy Edp absorbed by the droplet per unit mass may be obtained from Expression (9) above as follows.

$$Edp \approx (3/2) \times 6.5 \times 0.16 / (6.94 \times 21 \times 10^{-4})$$

$$\approx 107 \text{ J/g}$$

When the CE of 4% is obtained (i.e., the fluence F of the pre-pulse laser beam is 30 J/cm²), the energy Edp absorbed by the droplet per unit mass may be obtained as follows.

$$Edp \approx (3/2) \times 30 \times 0.16 / (6.94 \times 21 \times 10^{-4})$$

$$\approx 494 \text{ J/g}$$

When the CE of 4.5% is obtained (i.e., the fluence F of the pre-pulse laser beam is 45 J/cm²), the energy Edp absorbed by the droplet per unit mass may be obtained as follows.

$$Edp \approx (3/2) \times 45 \times 0.16 / (6.94 \times 21 \times 10^{-4})$$

$$\approx 741 \text{ J/g}$$

Further, from Expression (9), the relationship between the fluence F of the pre-pulse laser beam and the energy Edp absorbed by the droplet per unit mass may be expressed as follows.

$$F \approx (2/3) Edp \cdot \rho \cdot Dd / A$$

Accordingly, the fluence F of the pre-pulse laser beam to obtain the CE of 3.5% using a given target material may be obtained using the aforementioned Edp as follows.

$$F \approx (2/3) 107 \cdot \rho \cdot Dd / A$$

$$\approx 71.3 (\rho \cdot Dd / A)$$

The fluence F of the pre-pulse laser beam to obtain the CE of 4% using a given target material may be obtained as follows.

$$F \approx (2/3) 494 \cdot \rho \cdot Dd / A$$

$$\approx 329 (\rho \cdot Dd / A)$$

The fluence F of the pre-pulse laser beam to obtain the CE of 4.5% using a given target material may be obtained as follows.

$$F \approx (2/3) 741 \cdot \rho \cdot Dd / A$$

$$\approx 494 (\rho \cdot Dd / A)$$

Accordingly, the value of the fluence F of the pre-pulse laser beam may be equal to or greater than the values obtained as above. Further, the value of the fluence F of the pre-pulse laser beam may be equal to or smaller than the value of the fluence of the main pulse laser beam. The fluence of the main pulse laser beam may, for example, be 150 J/cm² to 300 J/cm².

15.4 Pre-Pulse Laser Apparatus 15.4.1 General Configuration

A mode-locked laser device may be used to generate a pre-pulse laser beam having a short pulse duration. The mode-locked laser device may oscillate at a plurality of longitudinal modes with fixed phases among one another. When the plurality of longitudinal modes interferes with one another, a pulse of a laser beam having a short pulse duration may be outputted. However, a timing at which a given pulse of the pulse laser beam is outputted from the mode-locked laser device may depend on a timing at which a preceding pulse is outputted and a repetition rate in accordance with a resonator length of the mode-locked laser device. Accordingly, it may not be easy to control the mode-locked laser device such that each pulse is outputted at a desired timing. Thus, in order to control the timing at which a droplet supplied into the chamber 1 is irradiated with a given pulse of a pre-pulse laser beam, a pre-pulse laser apparatus may be configured as follows.

Figure 46:
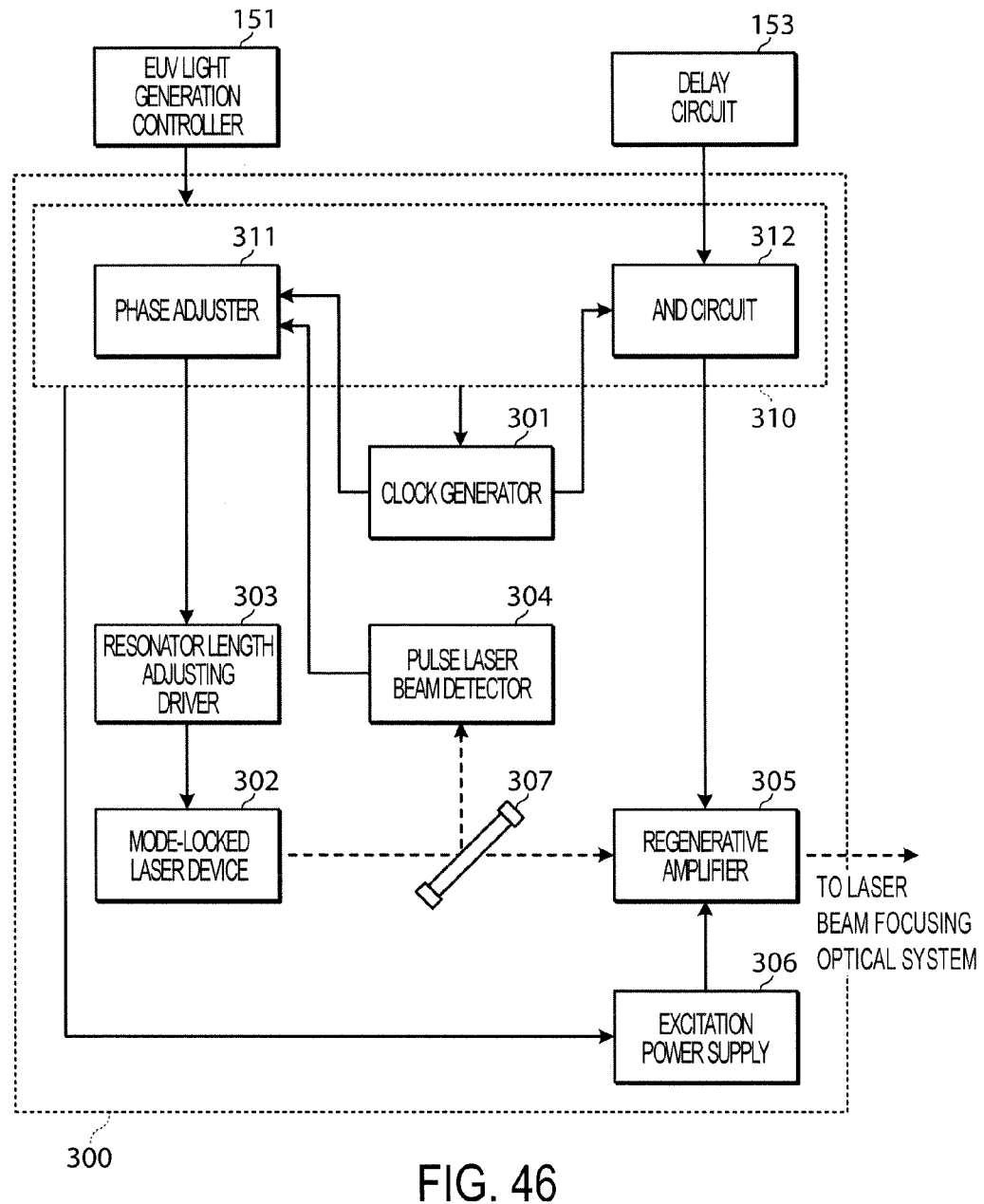
FIG. 46 schematically illustrates an exemplary configuration of a pre-pulse laser apparatus shown in FIG. 38.

FIG. 46 schematically illustrates an exemplary configuration of a pre-pulse laser apparatus shown in FIG. 38. The pre-pulse laser apparatus 300 may include a clock generator 301, a mode-locked laser device 302, a resonator length adjusting driver 303, a pulse laser beam detector 304, a regenerative amplifier 305, an excitation power supply 306, and a controller 310.

The clock generator 301 may, for example, output a clock signal at a repetition rate of 100 MHz. The mode-locked laser device 302 may output a pulse laser beam at a repetition rate of approximately 100 MHz, for example. The mode-locked laser device 302 may include a resonator, which will be described later, and the resonator length thereof may be adjusted through the resonator length adjusting driver 303.

A beam splitter 307 may be provided in a beam path of the pulse laser beam from the mode-locked laser device 302. The pulse laser beam may be split by the beam splitter 307, and the pulse laser beam detector 304 may be provided in a beam path of a part of the pulse laser beam split by the beam splitter 307. The pulse laser beam detector 304 may be configured to detect the pulse laser beam and output a detection signal.

The regenerative amplifier 305 may be provided in a beam path of the other part of the pulse laser beam split by the beam splitter 307. The details of the regenerative amplifier 305 will be given later.

The controller 310 may include a phase adjuster 311 and an AND circuit 312. The phase adjuster 311 may carry out a feedback-control on the resonator length adjusting driver 303 based on the clock signal from the clock generator 301 and the detection signal from the pulse laser beam detector 304.

Further, the controller 310 may control the regenerative amplifier 305 based on the clock signal from the clock generator 301 and the aforementioned first timing signal from the delay circuit 153 described with reference to FIG. 38. More specifically, the AND circuit 312 may be configured to generate an AND signal of the clock signal and the first timing signal, and control a Pockels cell inside the regenerative amplifier 305 through the AND signal of the clock signal.

15.4.2 Mode-Locked Laser Device

Figure 47:
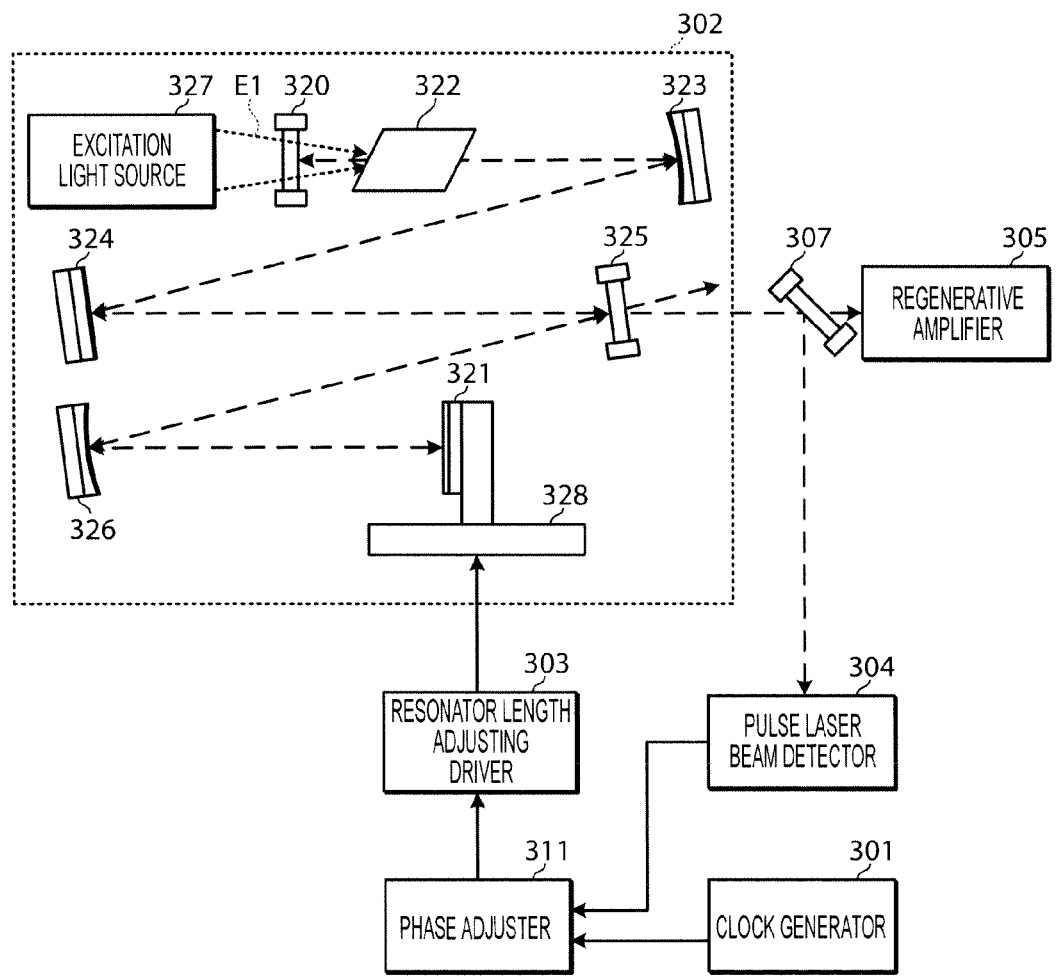
FIG. 47 schematically illustrates an exemplary configuration of a mode-locked laser device shown in FIG. 46.

FIG. 47 schematically illustrates an exemplary configuration of a mode-locked laser device shown in FIG. 46. The mode-locked laser device 302 may include a resonator formed by a flat mirror 320 and a saturable absorber mirror 321, and a laser crystal 322, a concave mirror 323, a flat mirror 324, an output coupler mirror 325, and a concave mirror 326 are provided in this order from the side of the flat mirror 320 in a beam path in the resonator. The beam path in the resonator may be substantially parallel to the paper plane. The mode-locked laser device 302 may further include an excitation light source 327 configured to introduce excitation light E1 to the laser crystal 322 from the outside of the resonator. The excitation light source 327 may include a laser diode to generate the excitation light E1.

The flat mirror 320 may be configured to transmit the excitation light E1 from the excitation light source 327 with high transmittance and reflect light from the laser crystal 322 with high reflectance. The laser crystal 322 may be a laser medium that undergoes stimulated emission with the excitation light E1. The laser crystal 322 may, for example, be a neodymium-doped yttrium orthovanadate (Nd:YVO$_4$) crystal. Light emitted from the laser crystal 322 may include a plurality of longitudinal modes. The laser crystal 322 may be arranged so that a laser beam is incident on the laser crystal 322 at a Brewster's angle.

The concave mirror 323, the flat mirror 324, and the concave mirror 326 may reflect the light emitted from the laser crystal 322 with high reflectance. The output coupler mirror 325 may be configured to transmit a part of the laser beam amplified in the laser crystal 322 to the outside of the resonator and reflect the remaining part of the laser beam back into the resonator to be further amplified in the laser crystal 322. First and second laser beams that travel in different directions may be outputted through the output coupler mirror 325 to the outside of the resonator. The first laser beam is a part of the laser beam reflected by the flat mirror 324 and transmitted through the output coupler mirror 325, and the second laser beam is a part of the laser beam reflected by the concave mirror 326 and transmitted through the output coupler mirror 325. The aforementioned beam splitter 307 may be provided in a beam path of the first laser beam, and a beam dump (not shown) may be provided in a beam path of the second laser beam.

The saturable absorber mirror 321 may be formed such that a reflective layer is laminated on a mirror substrate and a saturable absorber layer is laminated on the reflective layer. In the saturable absorber mirror 321, the saturable absorber layer may absorb an incident ray while the intensity thereof is equal to or lower than a predetermined threshold value. When the intensity of the incident ray exceeds the predetermined threshold value, the saturable absorber layer may transmit the incident ray and the reflective layer may reflect the incident ray. With this configuration, only high-intensity pulses of the laser beam may be reflected by the saturable absorber mirror 321. The high-intensity pulses may be generated when the plurality of longitudinal modes is in phase with one another.

In this way, the mode-locked pulses of the laser beam may travel back and forth in the resonator and be amplified. The amplified pulses may be outputted through the output coupler mirror 325 as a pulse laser beam. The repetition rate of this pulse laser beam may correspond to an inverse of a time it takes for a pulse to make a round trip in the resonator. For example, when the resonator length L is 1.5 m, the speed of light in vacuum c is 3×10$^8$ m/s, a refractive index in the beam path, which is obtained by dividing the speed of light in vacuum by the speed of light in a material in the beam path, is 1, a repetition rate f may be 100 MHz as obtained from the following expression.

$$f = c/(2L)$$
$$= (3 \times 10^8)/(2 \times 1.5)$$
$$= 100 \text{ MHz}$$

Since the laser crystal 322 is arranged at a Brewster's angle to the laser beam, the pulse laser beam outputted from the mode-locked laser beam 302 may be a linearly polarized laser beam whose polarization direction is parallel to the paper plane.

The saturable absorber mirror 321 may be held by a mirror holder, and this mirror holder may be movable by a linear stage 328 in the direction in which the laser beam is incident on the saturable absorber mirror 321. The linear stage 328 may be driven through the aforementioned resonator length adjusting driver 303. As the saturable absorber mirror 321 is moved in the direction in which the laser beam is incident on the saturable absorber mirror 321, the resonator length may be adjusted to adjust the repetition rate of the pulse laser beam.

As mentioned above, the phase adjuster 311 may be configured to control the resonator length adjusting driver 303 based on the clock signal from the clock generator 301 and the detection signal from the pulse laser beam detector 304. More specifically, the phase adjuster 311 may detect a phase difference between the clock signal and the detection signal, and control the resonator length adjusting driver 303 so that the clock signal and the detection signal are in synchronization with a certain phase difference, a fourth delay time. The fourth delay time will be described later with reference to FIGS. 50A and 50B.

15.4.3 Regenerative Amplifier

Figure 48:
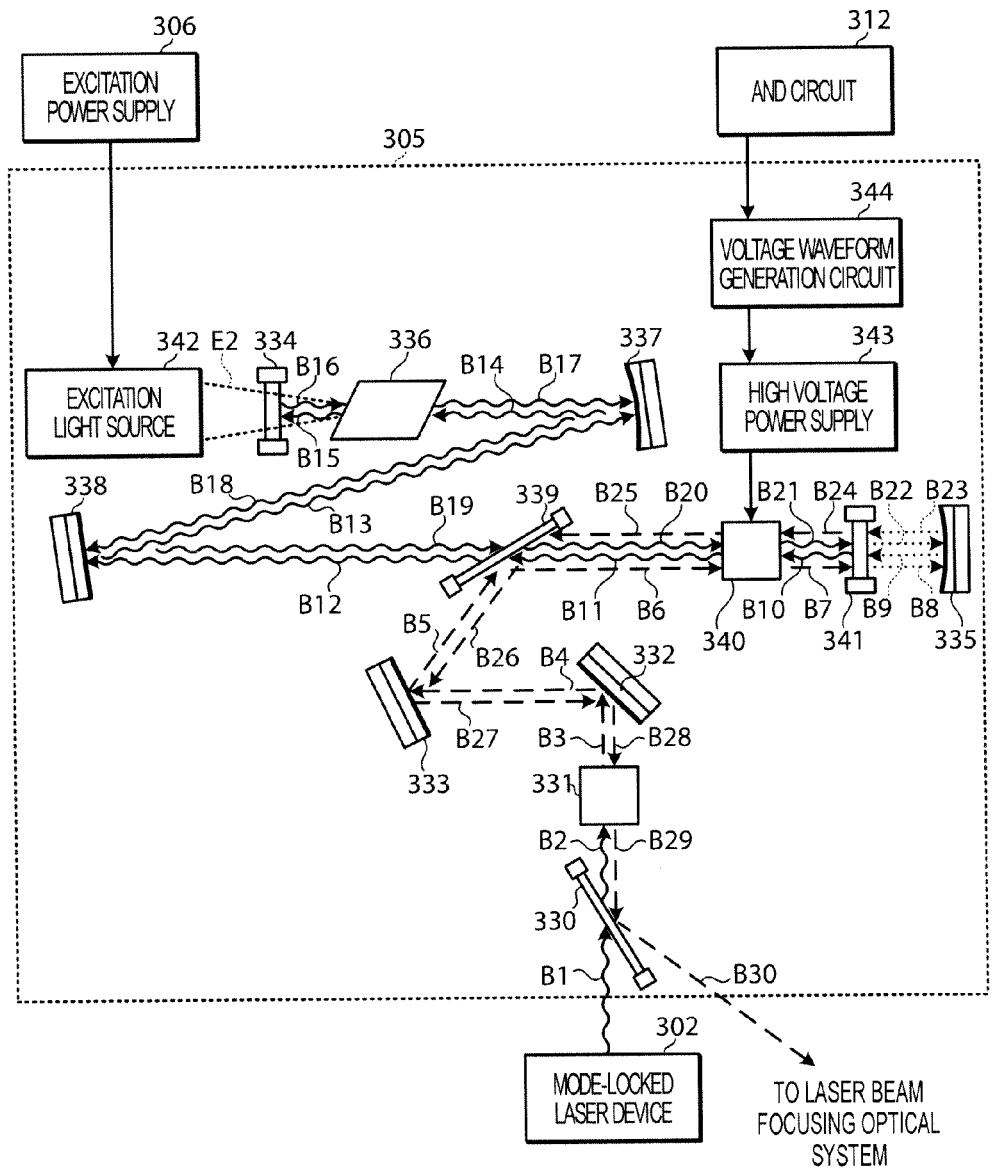
FIG. 48 schematically illustrates an exemplary configuration of a regenerative amplifier shown in FIG. 46.

FIG. 48 schematically illustrates an exemplary configuration of the regenerative amplifier shown in FIG. 46. The regenerative amplifier 305 may include a resonator formed by a flat mirror 334 and a concave mirror 335, and a laser crystal 336, a concave mirror 337, a flat mirror 338, a polarization beam splitter 339, a Pockels cell 340, and a quarter-wave plate 341 may be provided in this order from the side of the flat mirror 334 in a beam path in the resonator. The resonator length of the resonator in the regenerative amplifier 305 may be shorter than that of the resonator in the mode-locked laser device 302. Further, the regenerative amplifier 305 may include an excitation light source 342 configured to introduce excitation light E2 to the laser crystal 336 from the outside of the resonator. An electric power may be supplied to the excitation light source 342 from the excitation power supply 306. The excitation light source 342 may include a laser diode to generate the excitation light E2. Further, the regenerative amplifier 305 may include a polarization beam splitter 330, a Faraday optical isolator 331, and flat mirrors 332 and 333. The Faraday optical isolator 331 may include a Faraday rotator (not shown) and a quarter-wave plate (not shown).

The flat mirror 334 may be configured to transmit the excitation light E2 from the excitation light source 342 with high transmittance and reflect light emitted from the laser crystal 336 with high reflectance. The laser crystal 336 may be a laser medium excited by the excitation light E2, and may, for example, be a neodymium-doped yttrium aluminum garnet (Nd:YAG) crystal. Further, the laser crystal 336 may be arranged so that a laser beam is incident on the laser crystal 336 at a Brewster's angle. When a seed beam outputted from the mode-locked laser device 302 is incident on the laser crystal 336 excited by the excitation light E2, the seed beam may be amplified through stimulated emission.

15.4.3.1 When Voltage is not Applied to Pockels Cell

The beam splitter 330 may be provided in a beam path of a pulse laser beam B1 from the mode-locked laser device 302. The polarization beam splitter 330 may, for example, be arranged such that light receiving surfaces thereof are perpendicular to the paper plane. The polarization beam splitter 330 may be configured to transmit a polarization component parallel to the paper plane with high transmittance and reflect the other polarization component perpendicular to the paper plane with high reflectance.

The Faraday optical isolator 331 may be provided in a beam path of a pulse laser beam B2 transmitted through the polarization beam splitter 330. The Faraday optical isolator 331 may shift a phase difference between the two polarization components of the incident pulse laser beam B2 by 180 degrees and output as a pulse laser beam B3. That is, the Faraday optical isolator 331 may rotate the polarization direction of the incident linearly polarized laser beam B2 by 90 degrees. Further, the Faraday optical isolator 331 may transmit a pulse laser beam B28, which will be described later, toward the polarization beam splitter 330 without rotating the polarization direction thereof.

The flat mirror 322 may be provided in a beam path of the pulse laser beam B3 transmitted through the Faraday optical isolator 331. The flat mirror 332 may reflect the pulse laser beam B3 with high reflectance. The flat mirror 333 may reflect a pulse laser beam B4 reflected by the flat mirror 332 with high reflectance.

The polarization beam splitter 339 in the resonator may be provided in a beam path of a pulse laser beam B5 reflected by the flat mirror 333. The polarization beam splitter 339 may be provided such that the light receiving surfaces thereof are perpendicular to the paper plane, and the pulse laser beam B5 may be incident on a first surface of the polarization beam splitter 339. The polarization beam splitter 339 may reflect the linearly polarized pulse laser beam B5 polarized in a direction perpendicular to the paper plane with high reflectance to thereby guide into the resonator as a pulse laser beam B6.

A voltage may be applied to the Pockels cell 340 by a high-voltage power supply 343. However, when the voltage is not applied to the Pockels cell 340, the Pockels cell 340 may transmit the entering pulse laser beam B6 without shifting the phase difference between the two polarization components thereof.

The quarter-wave plate 341 may shift a phase difference between the two polarization components of a pulse laser beam B7 by 90 degrees. The concave mirror 335 may reflect a pulse laser beam B8 from the quarter-wave plate 341 with high reflectance. A pulse laser beam B9 reflected by the concave mirror 335 may be transmitted through the quarter-wave plate 341, and the phase difference between the two polarization components thereof may be shifted by 90 degrees. In this way, the pulse laser beam B9 may be transformed into a linearly polarized pulse laser beam B10 polarized in a direction parallel to the paper plane.

As stated above, when the voltage is not applied to the Pockels cell 340, the Pockels cell 340 may transmit the incident pulse laser beam without shifting the phase difference between the two polarization components. Accordingly, a pulse laser beam B11 transmitted through the Pockels cell 340 may be incident on the first surface of the polarization beam splitter 339 as a linearly polarized pulse laser beam polarized in a direction parallel to the paper plane and be transmitted through the polarization beam splitter 339 with high transmittance.

The flat mirror 338 may reflect a pulse laser beam B12 from the polarization beam splitter 339 with high reflectance. The concave mirror 337 may reflect a pulse laser beam B13 from the flat mirror 338 with high reflectance. A pulse laser beam B14 from the concave mirror 337 may then be incident on the laser crystal 336, and be amplified in the laser crystal 336.

The flat mirror 334 may reflect a pulse laser beam B15 from the laser crystal 336 with high reflectance back to the laser crystal 336 as a pulse laser beam B16. A pulse laser beam B17 amplified by the laser crystal 336 may be reflected by the concave mirror 337 as a pulse laser beam B18. The pulse laser beam B18 may then be reflected the flat mirror 338, and, as a pulse laser beam B19, transmitted through the polarization beam splitter 339. A pulse laser beam B20 from the beam splitter 339 may enter the Pockels cell 340, and be incident on the quarter-wave plate 341 as a pulse laser beam B21. The pulse laser beam B21 may be transmitted through the quarter-wave plate 341, and, as a pulse laser beam B22, reflected by the concave mirror 335. A pulse laser beam B23 may then be transmitted again through the quarter-wave plate 341, to thereby be converted into a linearly polarized pulse laser beam B24 polarized in a direction perpendicular to the paper plane. The pulse laser beam B24 may be transmitted through the Pockels cell 340, reflected, as a pulse laser beam B25, by the polarization beam splitter 339, and outputted as a pulse laser beam B26 to the outside of the resonator.

The pulse laser beam B26 may be reflected by the high-reflection mirror 333, and, as a pulse laser beam B27, reflected by the high-reflection mirror 332. Then, a pulse laser beam 28 from the high-reflection mirror 332 may enter the Faraday optical isolator 331. As stated above, the Faraday optical isolator 331 may transmit the linearly polarized pulse laser beam B28 as a linearly polarized pulse laser beam B29 without rotating the polarization direction thereof. The polarization beam splitter 330 may reflect the linearly polarized pulse laser beam B29 polarized in a direction perpendicular to the paper plane with high reflectance.

A pulse laser beam B30 reflected by the polarization beam splitter 330 may be guided to the plasma generation region PS through the laser beam focusing optical system 122 (see FIG. 38). Here, even when a droplet is irradiated with the pulse laser beam B30 outputted after making only one round trip in the resonator in the regenerative amplifier 305, the droplet may not be diffused. This pulse laser beam B30 may not have a beam intensity sufficient to turn the droplet into plasma.

15.4.3.2 When Voltage is Applied to Pockels Cell

The high-voltage power supply 343 may apply a voltage to Pockels cell 340 at a given timing prior to the pulse laser beam B20 entering the Pockels cell 340. When the voltage is applied to the Pockels cell 340, the Pockels cell 340 may shift the phase difference between the two polarization components of the entering pulse laser beam by 90 degrees.

Figure 49:
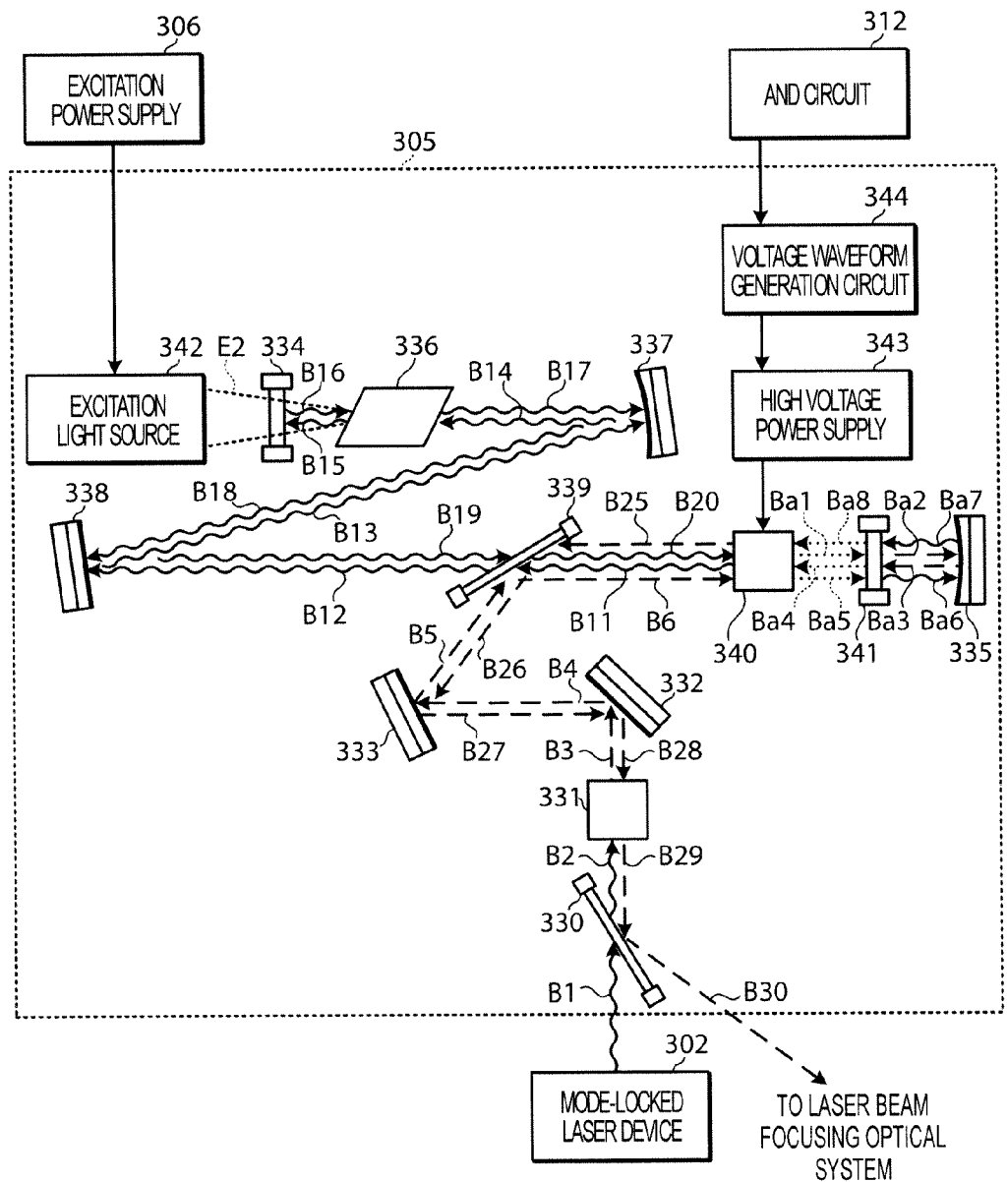
FIG. 49 schematically illustrates a beam path in the regenerative amplifier shown in FIG. 48, when a voltage is applied to a Pockels cell.

FIG. 49 schematically illustrates a beam path in the regenerative amplifier shown in FIG. 48 when a voltage is applied to the Pockels cell. Here, the pulse laser beam B20 may be transmitted through the Pockels cell 340 twice and the quarter-wave plate 341 twice, as indicated by pulse laser beams Ba1, Ba2, Ba3, and Ba4, and return as the pulse laser beam B11. The pulse laser beam B11 that has been transmitted through the quarter-wave plate 341 twice and transmitted through the Pockels cell 340 twice to which the voltage is applied may have its polarization direction oriented toward the same direction as that of the pulse laser beam B20. Accordingly, the pulse laser beam B11 may be transmitted through the polarization beam splitter 339 and be amplified by the laser crystal 336. While the voltage is applied to the Pockels cell 340, this amplification operation may be repeated.

After the amplification operation is repeated, the high-voltage power supply 343 may set the voltage applied to the Pockels cell 340 to OFF at a given timing prior to the pulse laser beam B20 entering the Pockels cell 340. As stated above, when the voltage is not applied to the Pockels cell 340 from the high-voltage power supply 343, the Pockels cell 340 may not shift the phase difference between the two polarization components of the entering pulse laser beam. Accordingly, the pulse laser beam B20 entering the Pockels cell 340 when the voltage is not applied thereto may have its polarization direction rotated only by 90 degrees as it is transmitted through the quarter-wave plate 341 twice (see the pulse laser beams B21, B22,B23, and B24 shown in FIG. 48). Thus, the pulse laser beam after the amplification operation is repeated may be incident on the first surface of the polarization beam splitter 339 as the linearly polarized pulse laser beam B25 polarized in a direction perpendicular to the paper plane and be outputted to the outside of the resonator.

While the voltage is applied to the Pockels cell 340 and the amplification operation is repeated (see FIG. 49), the pulse laser beam B1 newly outputted from the mode-locked laser device 302 may enter the Pockels cell 340 as the linearly polarized pulse laser beam B6 polarized in a direction perpendicular to the paper plane. While the voltage is applied to the Pockels cell 340, the pulse laser beam B6 may be transmitted through the quarter-wave plate 341 twice and the Pockels cell 340 twice (see pulse laser beams Ba5, Ba6, Ba7, and Ba8) and return as the pulse laser beam B25. Here, the pulse laser beam B25 may have its polarization direction oriented to the same direction as that of the pulse laser beam B6. Accordingly, the pulse laser beam B25 may be reflected by the first surface of the polarization beam splitter 339, and as a pulse laser beam B26, outputted to the outside of the resonator without being amplified even once.

A timing at which the high-voltage power supply 343 sets the voltage applied to the Pockels cell 340 to ON/OFF may be determined by the AND signal of the clock signal and the first timing signal described above. The AND signal may be supplied to the voltage waveform generation circuit 344 in the regenerative amplifier 305 from the AND circuit 312. The voltage waveform generation circuit 344 may generate a voltage waveform with the AND signal as a trigger, and supply this voltage waveform to the high-voltage power supply 343. The high-voltage power supply 343 may generate a pulse voltage in accordance with the voltage waveform and apply this pulse voltage to the Pockels cell 340. The first timing signal, the AND signal, and the voltage waveform by the voltage waveform generation circuit 344 will be described later with reference to FIGS. 50C through 50E.

15.4.4 Timing Control

Figure 50A:
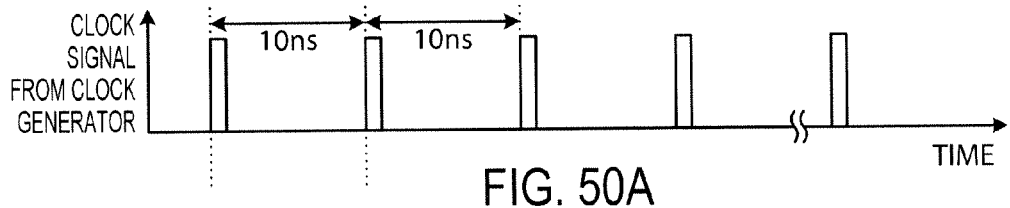
FIG. 50A is a timing chart of a clock signal in the pre-pulse laser apparatus shown in FIG. 46.

FIGS. 50A through 50E show timing charts of various signals in the pre-pulse laser apparatus shown in FIG. 46. FIG. 50A is a timing chart of the clock signal outputted from the clock generator. The clock generator 301 may, for example, be configured to output the clock signal at a repetition rate of 100 MHz. In this case, the interval of the pulses may be 10 ns.

Figure 50B:
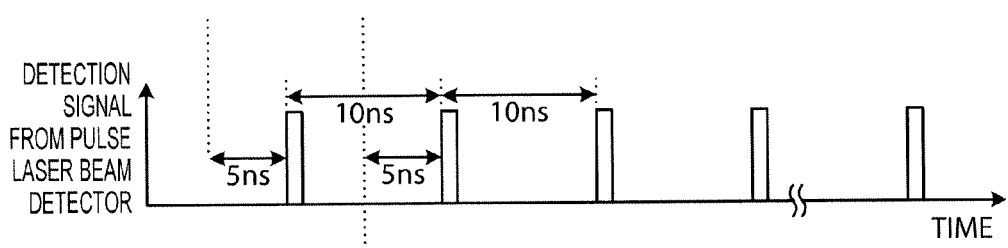
FIG. 50B is a timing chart of a detection signal in the pre-pulse laser apparatus shown in FIG. 46.

FIG. 50B is a timing chart of a detection signal outputted from the pulse laser beam detector. A repetition rate of the detection signal may depend on the repetition rate of the pulse laser beam outputted from the mode-locked laser device 302. The repetition rate of the pulse laser beam from the mode-locked laser device 302 may be adjusted by adjusting the resonator length of the mode-locked laser device 302. In this example, the repetition rate of the pulse laser beam may be approximately 100 MHz. By fine-tuning the repetition rate of the pulse laser beam, the phase difference from the clock signal shown in FIG. 50A may be adjusted. Thus, a feedback-control may be carried out on the mode-locked laser device 302 so that the detection signal of the pulse laser beam is in synchronization with the clock signal shown in FIG. 50A with the fourth delay time of, for example, 5 ns.

Figure 50C:
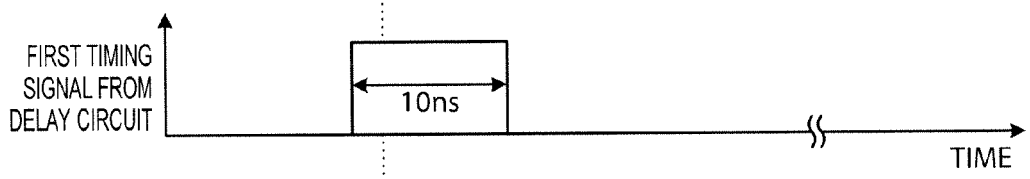
FIG. 50C is a timing chart of a first timing signal in the pre-pulse laser apparatus shown in FIG. 46.

FIG. 50C is a timing chart of the first timing signal outputted from the delay circuit. As stated above, the first timing signal from the delay circuit 153 may be a signal in which the first delay time is given to the target detection signal by the target sensor 104. A repetition rate of the first timing signal may depend on the repetition rate of the droplets outputted from the target supply unit 2. The droplets may, for example, be outputted from the target supply unit 2 at a repetition rate of approximately 100 kHz. The pulse duration of the first timing signal may be 10 ns.

Figure 50D:
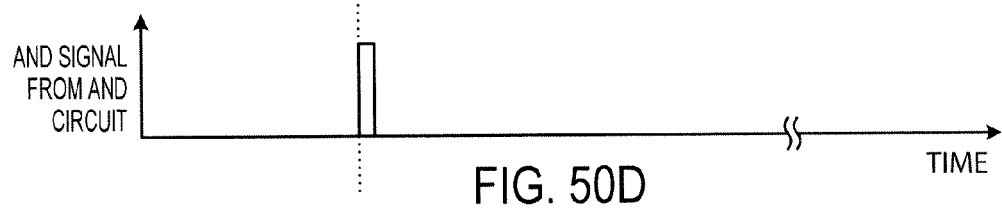
FIG. 50D is a timing chart of an AND signal in the pre-pulse laser apparatus shown in FIG. 46.

FIG. 50D is a timing chart of the AND signal outputted from the AND circuit. The AND signal from the AND circuit 312 may be a signal of a logical product of the clock signal and the first timing signal. When the pulse duration of the first timing signal is substantially the same as the interval of the clock signal, such as 10 ns, a single pulse of the AND signal may be generated for a single pulse of the first timing signal. The AND signal may be generated to be substantially in synchronization with a part of multiple pulses of the clock signal.

Figure 50E:
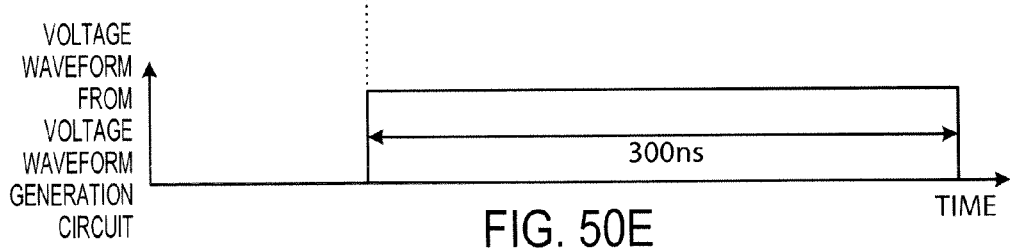
FIG. 50E is a timing chart of a voltage waveform in the pre-pulse laser apparatus shown in FIG. 46.

FIG. 50E is a timing chart of the voltage waveform outputted from the voltage waveform generation circuit. The voltage waveform from the voltage waveform generation circuit 344 may be generated at substantially the same time as the AND signal from the AND circuit 312. The voltage waveform may, for example, have a pulse duration of 300 ns. For example, when the resonator length of the regenerative amplifier 305 is 1 m, the pulse laser beam makes 50 round trips in the resonator in 300 ns at the speed of light of $3\times10^8$ m/s. By setting a pulse duration of the voltage waveform, the number of round trips the pulse laser beam makes in the resonator in the regenerative amplifier 305 may be set.

With the above timing control, the clock signal and the pulse laser beam from the mode-locked laser device 302 may be in synchronization with each other with the fourth delay time, and the AND signal may be in synchronization with a part of the pulses of the clock signal. Thus, while the pulse laser beam travels in a specific section of the resonator in the regenerative amplifier 305, the voltage applied to the Pockels cell 340 from the high-voltage power supply 343 may be set to ON/OFF. Accordingly, only a desired pulse in the pulse laser beam from the mode-locked laser device 302 may be amplified to a desired beam intensity, and outputted to strike a droplet.

Further, with the above-described timing control, the timing of a pulse from the regenerative amplifier 305 may be controlled with a resolving power in accordance with the interval of the pulses from the mode-locked laser device 302. For example, a droplet outputted from the target supply unit 2 and traveling inside the chamber 1 at a speed of 30 m/s to 60 m/s may move 0.3 μm to 0.6 μm in 10 ns, which is the interval of the pulses from the mode-locked laser device 302. When the diameter of the droplet is 20 μm, the resolving power of 10 ns is sufficient to irradiate the droplet with the pulse laser beam.

15.4.5 Examples of Laser Medium

In the above-described example, an $Nd:YVO_4$ crystal is used as the laser crystal 322 in the mode-locked laser device 302, and an Nd:YAG crystal is used as the laser crystal 336 in the regenerative amplifier 305. However, this disclosure is not limited to these crystals.

As one example, an Nd:YAG crystal may be used as a laser crystal in each of the mode-locked laser device 302 and the regenerative amplifier 305.

As another example, a Titanium-doped Sapphire (Ti:Sapphire) crystal may be used as a laser crystal in each of the mode-locked laser device 302 and the regenerative amplifier 305.

As yet another example, a ruby crystal may be used as a laser crystal in each of the mode-locked laser device 302 and the regenerative amplifier 305.

As yet another example, a dye cell may be used as a laser medium in each of the mode-locked laser device 302 and the regenerative amplifier 305.

As still another example, a triply ionized neodymium-doped glass ($Nd^{3+}$:glass) may be used as a laser medium in each of the mode-locked laser device 302 and the regenerative amplifier 305.

15.5 Main Pulse Laser Apparatus

Figure 51:
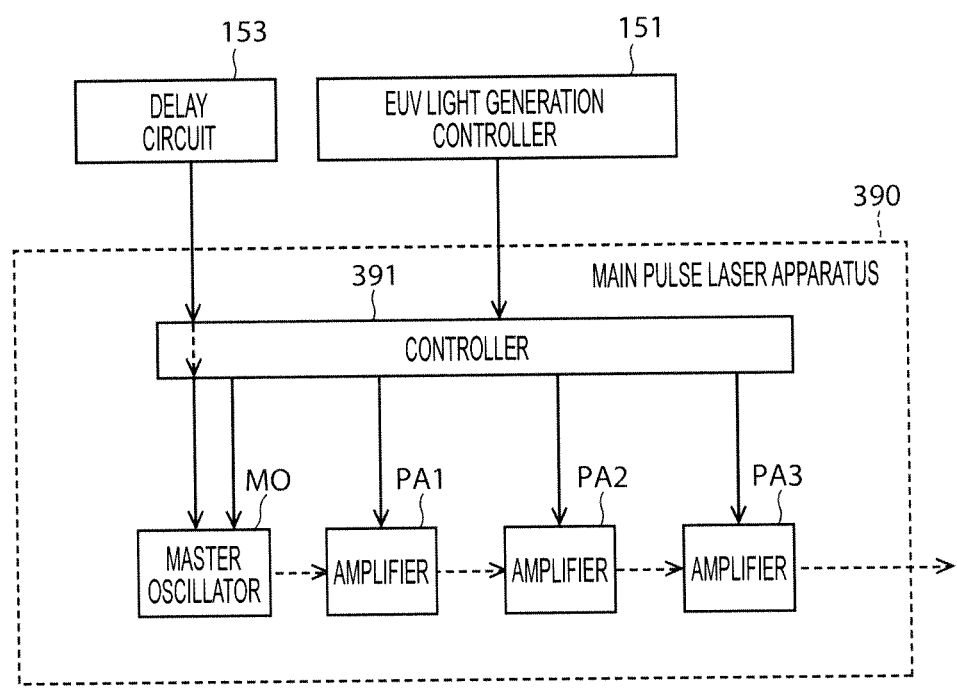
FIG. 51 schematically illustrates an exemplary configuration of a main pulse laser apparatus shown in FIG. 38.

FIG. 51 schematically illustrates an exemplary configuration of a main pulse laser apparatus shown in FIG. 38. The main pulse laser apparatus 390 may include a master oscillator MO, amplifiers PA1, PA2, and PA3, and a controller 391.

The master oscillator MO may be a $CO_2$ laser apparatus in which a $CO_2$ gas is used as a laser medium, or may be a quantum cascade laser apparatus configured to oscillate in a bandwidth of the $CO_2$ laser apparatus. The amplifiers PA1, PA2, and PA3 may be provided in series in a beam path of a pulse laser beam outputted from the master oscillator MO. Each of the amplifiers PA1, PA2, and PA3 may include a laser chamber (not shown) filled with a $CO_2$ gas serving as a laser medium, a pair of electrodes (not shown) provided inside the laser chamber, and a power supply (not shown) configured to apply a voltage between the pair of electrodes.

The controller 391 may be configured to control the master oscillator MO and the amplifiers PA1, PA2, and PA3 based on a control signal from the EUV light generation controller 151. The controller 391 may output the aforementioned second timing signal from the delay circuit 153 to the master oscillator MO. The master oscillator MO may output each pulse of the pulse laser beam in accordance with the second timing signal serving as triggers. The pulse laser beam may be amplified in the amplifiers PA1, PA2, and PA3. Thus, the main pulse laser apparatus 390 may output the main pulse laser beam in synchronization with the second timing signal from the delay circuit 153.

16. Eleventh Embodiment

Figure 52:
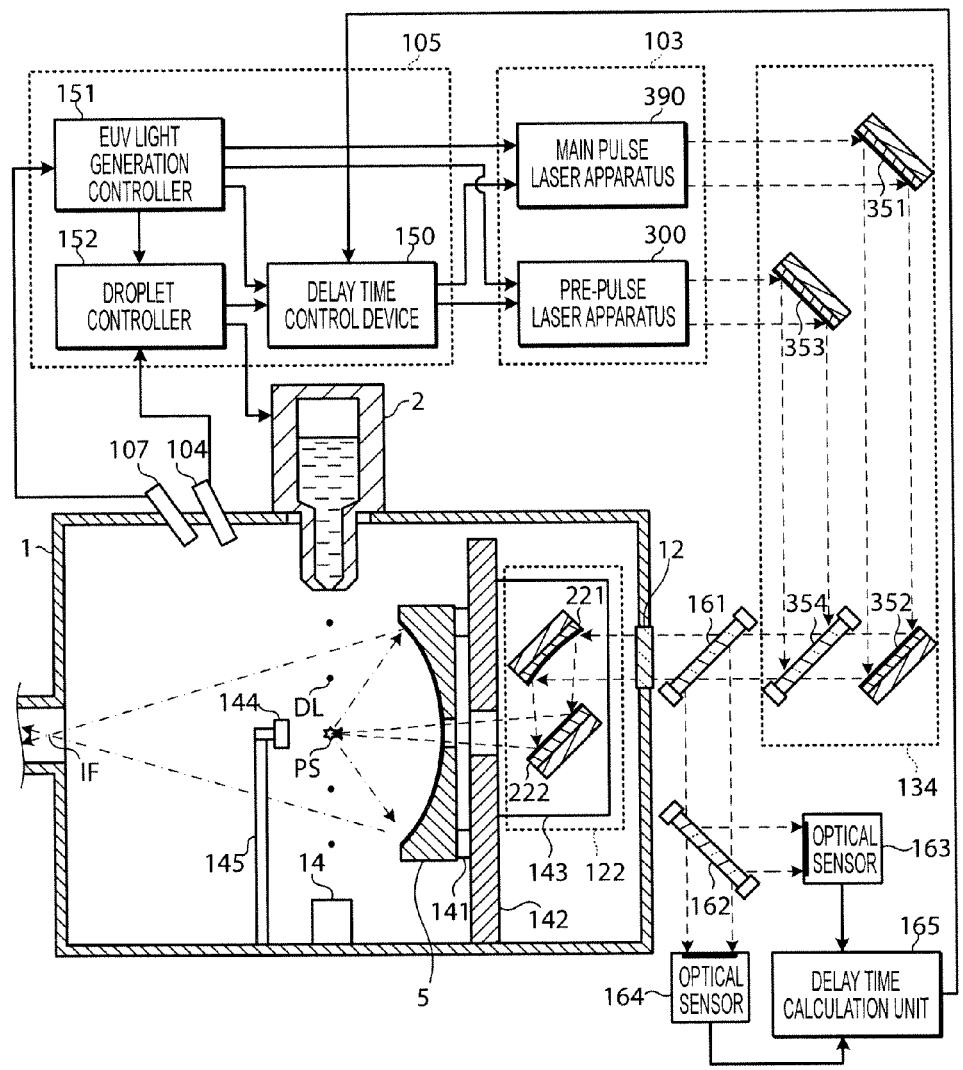
FIG. 52 is a partial sectional view schematically illustrating an exemplary configuration of an EUV light generation system according to an eleventh embodiment.

FIG. 52 is a partial sectional view schematically illustrating an exemplary configuration of an EUV light generation system according to an eleventh embodiment of this disclosure. The EUV light generation system according to the eleventh embodiment may include beam splitters 161 and 162, optical sensors 163 and 164, a delay time calculation unit 165, and a delay time control device 150. Other points may be similar to those of the tenth embodiment.

The beam splitter 161 may be provided in a beam path of the pre-pulse laser beam and the main pulse laser beam between the dichroic mirror 354 and the laser beam focusing optical system 122. The beam splitter 161 may be coated with a film configured to transmit the pre-pulse laser beam and the main pulse laser beam with high transmittance and reflect a part of the pre-pulse laser beam and the main pulse laser beam.

The beam splitter 162 may be provided in a beam path of the pre-pulse laser beam and the main pulse laser beam reflected by the beam splitter 161. The beam splitter 162 may be coated with a film configured to reflect the pre-pulse laser beam with high reflectance and transmit the main pulse laser beam with high transmittance.

The optical sensor 163 may be provided in a beam path of the pre-pulse laser beam reflected by the beam splitter 162. The optical sensor 164 may be provided in a beam path of the main pulse laser beam transmitted through the beam splitter 162. The optical sensors 163 and 164 may be provided such that the respective optical lengths from the beam splitter 162 are equal to each other. The optical sensor 163 may detect the pre-pulse laser beam and output a detection signal. The optical sensor 163 may include a fast-response photodiode configured to detect the pre-pulse laser beam at a wavelength of 1.06 μm. The optical sensor 164 may detect the main pulse laser beam and output a detection signal. The optical sensor 164 may include a fast-response thermoelectric element configured to detect the main pulse laser beam at a wavelength of 10.6 μm.

The delay time calculation unit 165 may be connected to the optical sensors 163 and 164 through respective signal lines. The delay time calculation unit 165 may receive detection signals from the respective optical sensors 163 and 164, and calculate a delay time δT from the detection of the pre-pulse laser beam to the detection of the main pulse laser beam based on the received detection signals. Here, the calculated delay time δT may be equivalent to the aforementioned third delay time, and thus this delay time δT will serve as the third delay time hereinafter. The delay time calculation unit 165 may output the calculated third delay time δT to the delay time control device 150.

Figure 53:
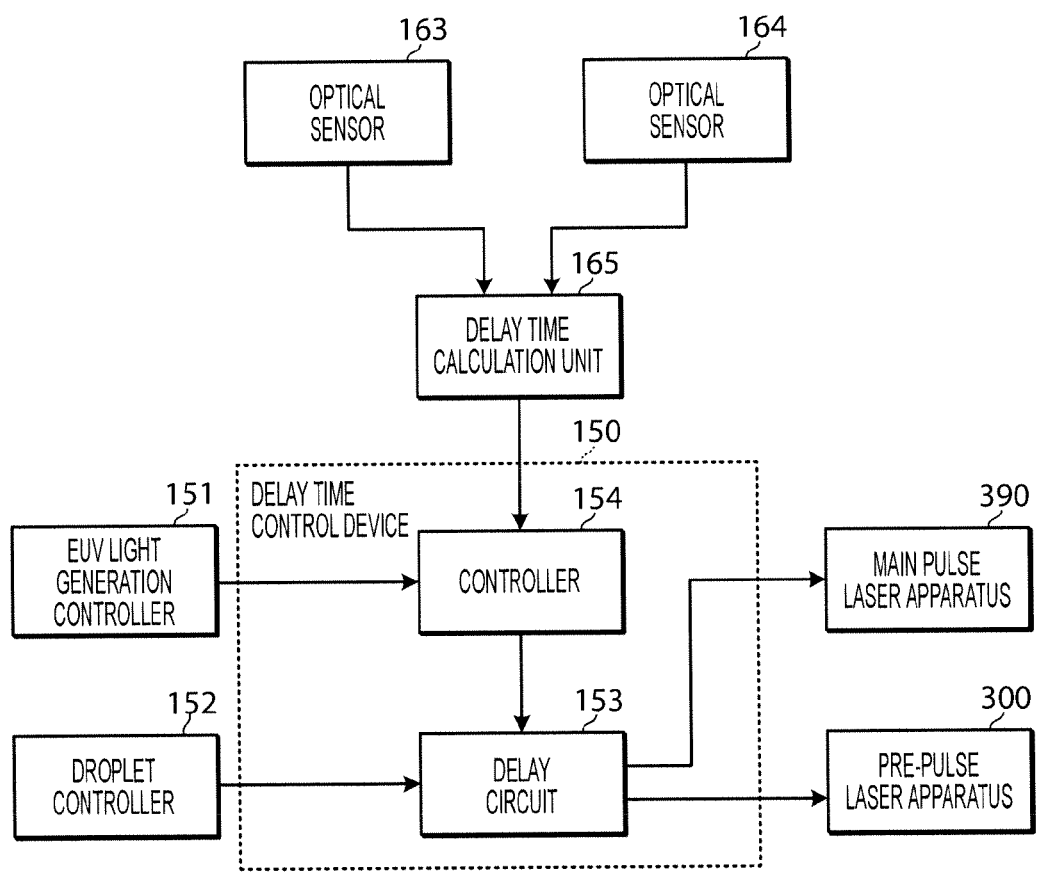
FIG. 53 schematically illustrates an exemplary configuration of a delay time control device shown in FIG. 52.

FIG. 53 schematically illustrates an exemplary configuration of a delay time control device shown in FIG. 52. The delay time control device 150 may include the delay circuit 153 and a controller 154. The delay circuit 153 may output to the pre-pulse laser apparatus 300 the first timing signal in which the first delay time is given to the target detection signal outputted from the droplet controller 152. Further, the delay circuit 153 may output to the main pulse laser apparatus 390 the second timing signal having the second delay time δTo from the first timing signal. The second delay time δTo may vary.

The controller 154 may receive a target value δTt of the third delay time from the EUV light generation controller 151. Further, the controller 154 may receive the calculated third delay time δT from the delay time calculation unit 165. The controller 154 may be configured to control the delay circuit 153 to modify the second delay time δTo based on a difference between the third delay time δT and the target value δTt.

Figure 54:
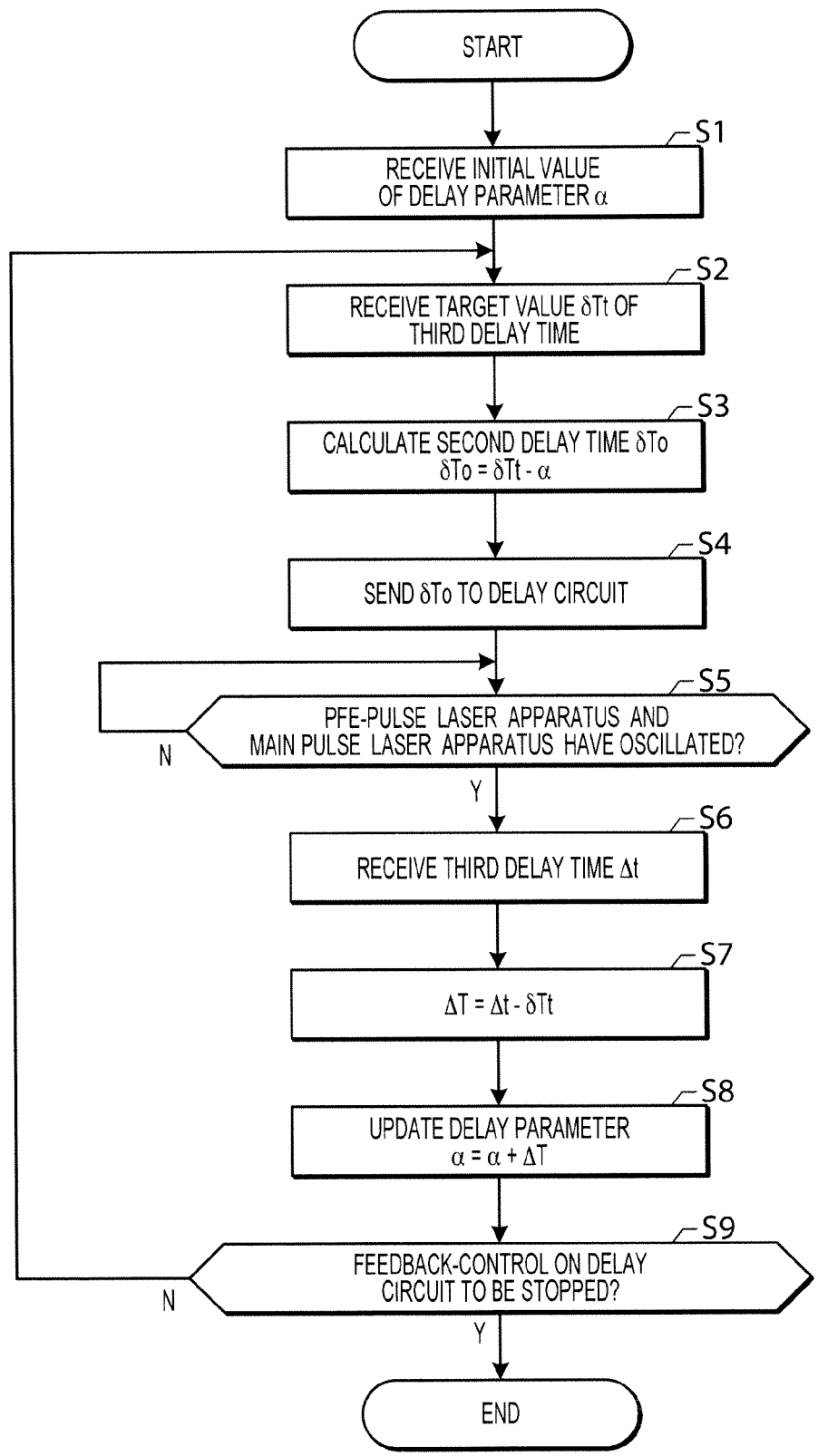
FIG. 54 is a flowchart showing an exemplary operation of a controller shown in FIG. 53.

FIG. 54 is a flowchart showing an exemplary operation of the controller shown in FIG. 53. The controller 154 may carry out a feedback-control on the delay circuit 153 based on the difference between the third delay time δT and the target value δTt.

The controller 154 may first receive an initial value of a delay parameter α from the EUV light generation controller 151 (Step S1). The initial value of the delay parameter α may be calculated from the following expression.

$$\alpha = (Lm - Lp)/c$$

Here, Lm may be a beam path length of the main pulse laser beam from the master oscillator MO (see FIG. 51) of the main pulse laser apparatus 390 to the plasma generation region PS, Lp may be a beam path length of the pre-pulse laser beam from the regenerative amplifier 305 (see FIG. 46) of the pre-pulse laser apparatus 300 to the plasma generation region PS, and c may be the speed of light ($3 \times 10^8$ m/s).

The main pulse laser apparatus 390 may include a larger number of amplifiers than the pre-pulse laser apparatus 300 in order to output the main pulse laser beam having a higher beam intensity than the pre-pulse laser beam. Accordingly, the beam path length Lm of the main pulse laser beam may be longer than the beam path length Lp of the pre-pulse laser beam, and thus the delay parameter α may be greater than 0.

Then, the controller 154 may receive a target value δTt of the third delay time from the EUV light generation controller 151 (Step S2). The controller 154 may then calculate the second delay time δTo by subtracting the delay parameter α from the target value δTt (Step S3). Subsequently, the controller 154 may send the calculated second delay time δTo to the delay circuit 153 (Step S4).

Thereafter, the controller 154 may determine whether or not the pre-pulse laser apparatus 300 and the main pulse laser apparatus 390 have oscillated (Step S5). When either of these laser apparatuses has not oscillated (Step S5; NO (N)), the controller 154 may stand by until these laser apparatuses oscillate. When both laser apparatuses have oscillated (Step S5; YES (Y)), the processing may proceed to Step S6.

Then, the controller 154 may receive the calculated third delay time δT from the delay time calculation unit 165 (Step S6). The controller 154 may then calculate a difference ΔT between the third delay time δT and the target value δTt through the following expression (Step S7).

$$\Delta T = \delta T - \delta T t$$

Subsequently, the controller 154 may update the delay parameter α by adding the difference ΔT between the third delay time δT and the target value δTt to the delay parameter α (Step S8). That is, when the third delay time δT is greater than the target value δTt (ΔT>0), the delay parameter α may be increased by ΔT so that the second delay time ΔTo becomes smaller.

Thereafter, the controller 154 may determine whether or not the feedback-control on the delay circuit 153 is to be stopped (Step S9). For example, when the output of the pulse laser beam is to be stopped based on a control signal from the EUV light generation controller 151, the feedback-control on the delay circuit 153 may be stopped. Alternatively, when the output energy of the EUV light reaches or exceeds a predetermined value as a result of repeating Steps S2 through S8 multiple times, the feedback-control on the delay circuit 153 may be stopped and the second delay time δTo may be fixed to generate the EUV light. When the feedback-control on the delay circuit 153 is not to be stopped (Step S9; NO), the processing may return to Step S2, and the controller 154 may receive the target value δTt of the third delay time and carry out the feedback-control on the delay circuit 153. When the feedback-control on the delay circuit 153 is to be stopped (Step S9; YES), the processing in this example may be terminated.

As described above, by carrying out the feedback-control on the delay circuit 153 based on the calculated third delay time δT, the third delay time δT may be stabilized with high precision. As a result, the diffused target may be irradiated with the main pulse laser beam at an optimal third delay time, and a CE may be improved. Further, even in a case where the third delay time δT varies for some reason although the second delay time δTo is fixed, the feedback-control may allow the third delay time δT to be stabilized.

In the eleventh embodiment, the feedback-control may be carried out on the delay circuit based on the calculated third delay time. However, this disclosure is not limited thereto, and the third delay time may not be calculated. For example, the second delay time δTo may be calculated from the initial value of the aforementioned delay parameter α and the aforementioned target value δTt, and the delay circuit 153 may be controlled based on this second delay time δTo.

The above-described embodiments and the modifications thereof are merely examples for implementing this disclosure, and this disclosure is not limited thereto. Making various modifications according to the specifications or the like is within the scope of this disclosure, and other various embodiments are possible within the scope of this disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:
1. A system comprising:
 a laser beam apparatus configured to generate a laser beam; and
 a target supply unit configured to supply a target material to be irradiated with the laser beam for generating extreme ultraviolet light, wherein the laser beam apparatus is configured to:
generate a first pre-pulse laser beam with which the target material is irradiated, the first pre-pulse laser beam having a pulse duration of less than 1 ns, so as to make the target be diffused in a dome shape,
generate a second pre-pulse laser beam with which the target material irradiated with the first pre-pulse laser beam is irradiated, and
generate a main pulse laser beam with which the target material irradiated with the second pre-pulse laser beam is irradiated.

2. The system according to claim 1, wherein the laser beam apparatus includes a $CO_2$ laser apparatus.

3. The system according to claim 1, wherein the laser beam apparatus comprises:
a first laser apparatus configured to generate the first pre-pulse laser beam with which the target material is irradiated; and
a second laser apparatus configured to generate the second pre-pulse laser beam with which the target material irradiated with the first pre-pulse laser beam is irradiated, and the main pulse laser beam with which the target material irradiated with the second pre-pulse laser beam is irradiated.

4. The system according to claim 3, wherein
the first laser apparatus is configured to generate a laser beam having a first wavelength, and
the second laser apparatus is configured to generate a laser beam having a second wavelength longer than the first wavelength.

5. The system according to claim 4, wherein
the first laser apparatus is a YAG laser apparatus; and
the second laser apparatus is a $CO_2$ laser apparatus.

6. The system according to claim 1, wherein the laser beam apparatus comprises:
a first laser apparatus configured to generate the first pre-pulse laser beam with which the target material is irradiated;
a second laser apparatus configured to generate the second pre-pulse laser beam with which the target material irradiated with the first pre-pulse laser beam is irradiated; and
a third laser apparatus configured to generate the main pulse laser beam with which the target material irradiated with the second pre-pulse laser beam is irradiated.

7. The system according to claim 6, wherein
the first and second laser apparatuses are configured to generate laser beams each having a first wavelength, and
the third laser apparatus is configured to generate a laser beam having a second wavelength longer than the first wavelength.

8. The system according to claim 7, wherein
the first laser apparatus is a first YAG laser apparatus;
the second laser apparatus is a second YAG laser apparatus; and
the third laser apparatus is a $CO_2$ laser apparatus.

9. The system according to claim 1, wherein the laser beam apparatus comprises:
a first laser apparatus configured to generate the first pre-pulse laser beam with which the target material is irradiated and the second pre-pulse laser beam with which the target material irradiated with the first pre-pulse laser beam is irradiated; and
a second laser apparatus configured to generate the main pulse laser beam with which the target material irradiated with the second pre-pulse laser beam is irradiated.

10. The system according to claim 9, wherein
the first laser apparatus is configured to generate a laser beam having a first wavelength, and
the second laser apparatus is configured to generate a laser beam having a second wavelength longer than the first wavelength.

11. The system according to claim 10, wherein
the first laser apparatus is a YAG laser apparatus; and
the second laser apparatus is a $CO_2$ laser apparatus.

12. The system according to claim 10, wherein
the first laser apparatus is a fiber laser apparatus; and
the second laser apparatus is a $CO_2$ laser apparatus.

13. The system according to claim 1, further comprising a laser controller for the laser beam apparatus to control an output timing of the main pulse laser beam.

14. The system according to claim 13, wherein the laser controller is configured to control the laser beam apparatus to output the main pulse laser beam in 0.3 µs to 3.0 µs after the target material is irradiated with the first pre-pulse laser beam.

15. The system according to claim 1, wherein the laser beam apparatus includes a mode-locked laser apparatus.

16. The system according to claim 15, wherein the mode-locked laser apparatus is a Ti:sapphire laser.

17. The system according to claim 15, wherein the mode-locked laser apparatus is a fiber laser.

* * * * *